United States Patent
Mori et al.

(10) Patent No.: US 7,810,040 B2
(45) Date of Patent: Oct. 5, 2010

(54) DOCUMENT PROCESSING APPARATUS, CONTROL METHOD THEREFOR, COMPUTER PROGRAM, AND COMPUTER-READABLE STORAGE MEDIUM

(75) Inventors: Yasuo Mori, Yokohama (JP); Koji Nakagiri, Kawasaki (JP); Makoto Tomita, Kawasaki (JP); Junko Sato, Kawasaki (JP); Wataru Kanaya, Chofu (JP); Michiko Kanaya, legal representative, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 11/105,519

(22) Filed: Apr. 14, 2005

(65) Prior Publication Data

US 2005/0246631 A1 Nov. 3, 2005

(30) Foreign Application Priority Data

Apr. 16, 2004 (JP) .............................. 2004-122287

(51) Int. Cl.
*G06F 3/048* (2006.01)
(52) U.S. Cl. ...................................... 715/769; 715/776
(58) Field of Classification Search ......... 715/201–205, 715/209–210, 769, 776
See application file for complete search history.

(56) References Cited

U.S. PATENT DOCUMENTS

| | | | | |
|---|---|---|---|---|
| 5,893,132 | A * | 4/1999 | Huffman et al. ............. | 715/532 |
| 6,931,592 | B1 * | 8/2005 | Ramaley et al. ............. | 715/530 |
| 7,188,311 | B2 * | 3/2007 | Tanaka et al. ............... | 715/522 |
| 7,299,413 | B2 | 11/2007 | Mori .......................... | 715/530 |
| 2002/0038322 | A1 * | 3/2002 | Iijima ......................... | 707/526 |
| 2002/0087602 | A1 * | 7/2002 | Masuda et al. .............. | 707/515 |
| 2002/0165882 | A1 * | 11/2002 | Zettel et al. ................. | 707/530 |
| 2003/0051208 | A1 * | 3/2003 | Todaka et al. .............. | 715/500 |
| 2003/0056176 | A1 * | 3/2003 | Tanaka et al. .............. | 715/522 |
| 2003/0056179 | A1 * | 3/2003 | Mori .......................... | 715/530 |

(Continued)

FOREIGN PATENT DOCUMENTS

JP 09-305599 A 11/1997

(Continued)

OTHER PUBLICATIONS

Sahlin, Doug, How to do Everything with Adobe Acrobat 6.0, McGraw Hill Osborone, 2003.*

(Continued)

*Primary Examiner*—William L Bashore
*Assistant Examiner*—Ashraf Zahr
(74) *Attorney, Agent, or Firm*—Fitzpatrick, Cella, Harper & Scinto

(57) ABSTRACT

This invention enables storing and managing one document of respective parts as electronic data created by a plurality of applications regardless of the type of application program which creates each part of one document. For this purpose, a plurality of shared folders are set on a network, and attributes in printing are set for the shared folders. A hot folder program supervises the shared folders. When a document image data file scanned by a multifunction apparatus is stored in one of the shared folders, the hot folder program causes an action program to perform a process complying with the attributes set for the shared folder which stores the file, and a bookbinding application to import the file.

8 Claims, 43 Drawing Sheets

U.S. PATENT DOCUMENTS

2004/0216057 A1* 10/2004 Wyle et al. .................. 715/810

FOREIGN PATENT DOCUMENTS

| JP | 10-254745      | 9/1998  |
| -- | -------------- | ------- |
| JP | 2001-84246     | 3/2001  |
| JP | 2003-162407    | 6/2003  |
| JP | 2003-162519    | 6/2003  |
| KR | 10-0238814 A   | 12/1997 |
| KR | 2000-0037837 A | 7/2000  |
| KR | 2002-0050295 A | 6/2002  |
| WO | WO 01/71549 A1 | 9/2001  |

OTHER PUBLICATIONS

"Adobe Acrobat 6.0 Professional—Product Overview"; Apr. 1, 2004, web.archive.org (Adobe XP-002417660); web.archive.org/web/20040401203127/adobe.com/products/acrobatpro/overview.html, (accessed Jan. 26, 2007).

"Adobe Acrobat 6.0 Professional—New Features"; Apr. 5, 2004, web.archive.org (Adobe XP-002418543; web.archive.org/web/20040405161526/.adobe.com/products/acrobatpro/newfeatures.html, (accessed Jan. 26, 2007).

"Adobe Acrobat—Resources"; 2004, Adobe (XP-002417661); acrobatusers.com/acrobat_resources/books_acrobat/books_others/pdf_hacks_100/samples/sample_062.php, (accessed Jan. 26, 2007).

"Quite Imposing—Product Features"; Apr. 1, 2004, web.archive.org (Quite Software XP-002417662); web.archive.org/web/20040411225744/.quite.com/imposing/features.htm (accessed Jan. 26, 2007).

Japanese Official Action dated Feb. 22, 2008, regarding Application No. 2004-122287.

* cited by examiner

F I G. 4A

| NO | ATTRIBUTE INFORMATION | | REMARKS |
|---|---|---|---|
| 1 | PRINTING METHOD | SINGLE-SIDED/ DOUBLE-SIDED/ BOOKBINDING PRINTING | |
| 2 | PAPER SIZE | DOCUMENT SIZE/ FIXED SIZE | · Z-FOLD IS DESIGNATED WHEN "A4+A3", "B4+B3", OR "LETTER+LEDGER (11x17)" IS DESIGNATED.<br>· DOCUMENT SIZE OF FIRST CHAPTER/PAGE IS AUTOMATICALLY SELECTED WHEN BOOKBINDING PRINTING OR N-up PRINTING IS DESIGNATED. |
| 3 | PAPER ORIENTATION | PORTRAIT/LANDSCAPE | · SELECTABLE ONLY FOR FIXED SIZE |
| 4 | BINDING MARGIN/ BINDING DIRECTION | | · SHIFT/ENLARGEMENT & REDUCTION CAN BE DESIGNATED. |
| 5 | N-up PRINTING | NUMBER OF PAGES/ LAYOUT ORDER/BORDER LINE/ LAYOUT POSITION, ETC. | · LAYOUT POSITION: NINE PATTERNS<br>· X1 PRINTING CAN BE DESIGNATED. |
| 6 | ENLARGEMENT/ REDUCTION | ON/OFF | ON/OFF CAN BE AUTOMATICALLY DESIGNATED WHEN PAPER SIZE IS FIXED SIZE OR N-up PRINTING IS SELECTED. |
| 7 | WATERMARK | | · WATERMARK CAN BE DESIGNATED INDIVIDUALLY IN LOGICAL OR PHYSICAL PAGES.<br>· ALL CHAPTERS/PAGES ARE TARGETED. |

FIG. 4B

| | | | |
|---|---|---|---|
| 8 | HEADER/FOOTER | | • HEADER/FOOTER CAN BE DESIGNATED INDIVIDUALLY IN LOGICAL OR PHYSICAL PAGES.<br>• ALL CHAPTERS/PAGES ARE TARGETED. |
| 9 | DELIVERY METHOD | STAPLING/PUNCH HOLE | • STAPLING/PUNCHING ONLY IN SINGLE-/DOUBLE-SIDED PRINTING<br>• STAPLING AT ONE/TWO PORTIONS |
| 10 | DETAILS OF BOOKBINDING | OPENING DIRECTION/SADDLE STITCH/ENLARGEMENT & REDUCTION DESIGNATION/ BINDING MARGIN/FASCICLE DESIGNATION, ETC. | • ONLY IN BOOKBINDING PRINTING |
| 11 | FRONT/BACK COVER | | • PRINTING IS DESIGNATED FOR 1/2 FRONT COVER OR 1/2 BACK COVER.<br>• FEED PORT (INCLUDING INSERTER) IS DESIGNATED. |
| 12 | INDEX PAPER | | • PRINTING OF CHARACTER STRING ON INDEX PORTION OR ANNOTATION ON INDEX PAPER CAN BE SET.<br>• BOOKBINDING PRINTING CANNOT BE DESIGNATED. |
| 13 | INSERTING PAPER | | • FEED PORT (INCLUDING INSERTER) IS DESIGNATED.<br>• DOCUMENT DATA CAN BE PRINTED ON INSERTED PAPER.<br>• BOOKBINDING PRINTING CANNOT BE DESIGNATED. |
| 14 | CHAPTER SEGMENTATION | "NONE"/"PAGE BREAK"/ "PAPER CHANGE" | • "PAPER CHANGE" IS FIXED WHEN INDEX PAPER OR INSERTING PAPER IS DESIGNATED.<br>• "PAPER CHANGE" IN SINGLE-SIDED PRINTING |

FIG. 5

| NO | ATTRIBUTE INFORMATION | | REMARKS |
|---|---|---|---|
| 1 | PAPER SIZE | DOCUMENT SIZE/FIXED SIZE | • "PAPER CHANGE" IS AUTOMATICALLY DESIGNATED WHEN FIXED SIZE IS SELECTED.<br>• WHEN A PLURALITY OF PAPER SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK. |
| 2 | PAPER ORIENTATION | PORTRAIT/LANDSCAPE | • SELECTABLE ONLY FOR FIXED SIZE |
| 3 | N-up PRINTING DESIGNATION | NUMBER OF PAGES/ LAYOUT ORDER/BORDER LINE /LAYOUT POSITION, ETC. | • LAYOUT POSITION: NINE PATTERNS<br>• X1 PRINTING CAN BE DESIGNATED. |
| 4 | ENLARGEMENT/ REDUCTION | ON / OFF | • ON/OFF CAN BE AUTOMATICALLY DESIGNATED WHEN PAPER SIZE IS FIXED SIZE OR N-up PRINTING IS SELECTED. |
| 5 | WATERMARK | DISPLAY/NON-DISPLAY | • WHETHER TO DISPLAY ALL WATERMARKS DESIGNATED BY BOOK IS DESIGNATED. |
| 6 | HEADER/FOOTER | DISPLAY/NON-DISPLAY | • WHETHER TO DISPLAY ALL HEADERS/FOOTERS DESIGNATED BY BOOK IS DESIGNATED. |
| 7 | DELIVERY METHOD | STAPLING | • STAPLING CAN BE SET OFF WHEN STAPLING IS DESIGNATED BY BOOK. DEFAULT VALUE IS "ON". |

FIG. 6

| NO | ATTRIBUTE INFORMATION | | REMARKS |
|---|---|---|---|
| 1 | PAGE ROTATION DESIGNATION | | · 0°/90°/180°/270° CAN BE DESIGNATED. |
| 2 | WATERMARK | DISPLAY/NON-DISPLAY | · WHETHER TO DISPLAY ALL WATERMARKS DESIGNATED BY BOOK IS DESIGNATED. |
| 3 | HEADER/FOOTER | DISPLAY/NON-DISPLAY | · WHETHER TO DISPLAY ALL HEADERS/FOOTERS DESIGNATED BY BOOK IS DESIGNATED. |
| 4 | ZOOM | 50% – 200% | · MAGNIFICATION RATIO RELATIVE TO SIZE WHICH IS FIT IN VIRTUAL LOGICAL PAGE REGION AND SET AS 100% IS DESIGNATED. |
| 5 | LAYOUT POSITION | | · NINE FIXED PATTERNS, ARBITRARY POSITION IS DESIGNATED. |
| 6 | ANNOTATION | | |
| 7 | VARIABLE ITEM | | |
| 8 | PAGE SEPARATION | | |

FIG. 14

BOOK

| PAGE SETUP | DECORATION | EDIT | PAPER SOURCE |

PAPER SIZE : [MATCH PAGE SIZE ▼]

☑ ZOOM FOR PAPER — 1401

ORIENTATION : [A] ● PORTRAIT  [A] ○ LANDSCAPE

PAGE LAYOUT : [1 PAGE PAR SHEET ▼]

ORDER : [NONE ▼]

BORDER LINE : [NONE ▼]

☐ ZOOM FOR AREA — 1402

ZOOM ARRANGE : [CANTER ▼]

[DEFAULT]

[OK] [CANCEL] [APPLY] [HELP]

CHAPTER

| PAGE SETUP | FINISHING | EDIT | PAPER SOURCE |

☑ FOLLOW BOOK ATTRIBUTE — 1501

PAPER SIZE : [ A  MATCH PAGE SIZE ▶ ]

☑ ZOOM FOR PAPER

ORIENTATION : [A] ● PORTRAIT  [A] ○ LANDSCAPE

☑ FOLLOW BOOK ATTRIBUTE — 1502

PAGE LAYOUT : [ ▢ 1 PAGE PAR SHEET ▶ ]

ORDER : [ NONE ▶ ]

BORDER LINE : [ NONE ▶ ]

☑ FOLLOW BOOK ATTRIBUTE — 1503

☐ ZOOM FOR AREA

ZOOM ARRANGE : [ ▢ CANTER ▶ ]

[ OK ]  [ CANCEL ]  [ APPLY ]  [ DEFAULT ]  [ HELP ]

```
# Canon addressBooK version:1
# CharSet:SJIS
# SubaddressBookName:

cn:iLaQ5pa8
cnread::zNi23sU=
url::g3qDWlNnlrw6XGF
path: c:¥test
username: user_name
pwd: user_password
accesscode: 0
protocol: smb
objectclass: top
objectclass: extensibleobject
objectclass: remotefilesystem
```

F I G. 34

| No | ATTRIBUTE INFORMATION | APPLICABLE TO CHAPTER? | INCONSISTENCY DETERMINATION | SETTING CHANGE METHOD |
|---|---|---|---|---|
| 1 | PRINTING METHOD | △ | ONLY SWITCHING BETWEEN SINGLE-SIDED PRINTING AND DOUBLE-SIDED PRINTING IS POSSIBLE. SWITCHING IS IMPOSSIBLE IN BOOKBINDING PRINTING. | WHEN BOOK HAS DOUBLE-SIDED SETTING, SINGLE-SIDED SETTING IS ADOPTED. FOR DOUBLE-SIDED SETTING WHEN BOOK HAS SINGLE-SIDED SETTING, BOOK IS CHANGED TO DOUBLE-SIDED SETTING, AND ALL EXISTING CHAPTERS ARE CHANGED TO SINGLE-SIDED SETTING. |
| 2 | PAPER SIZE | △ | APPLICATION TO CHAPTER IS IMPOSSIBLE IN BOOKBINDING PRINTING. | FOR MIXED PAPER SIZE SETTING, SETTING IS ROUNDED TO ONE OF PAPER SIZES. |
| 3 | BINDING MARGIN/ BINDING DIRECTION | × | | |
| 4 | N-up PRINTING | ○ | | |
| 5 | ENLARGEMENT/REDUCTION | ○ | | |
| 6 | WATERMARK | △ | CONTENTS CANNOT BE APPLIED, AND SETTING IS ROUNDED TO ON/OFF. | WHEN NO WATERMARK IS SET FOR BOOK, WATERMARK IS NOT APPLIED. WHEN BOOK HAS WATERMARK SETTING BUT TEMPLATE DOES NOT SET WATERMARK, WATERMARK IS SET OFF FOR CHAPTER. |
| 7 | HEADER/FOOTER | ○ | | ADD NEW KIND OF HEADER/FOOTER AND ASSIGN HEADER/FOOTER TO NEW CHAPTER. |
| 8 | DELIVERY METHOD | × | | |
| 9 | FRONT/BACK COVER | × | | |
| 10 | INDEX PAPER | × | | |
| 11 | INSERTING PAPER | × | | |
| 12 | CHAPTER SEGMENTATION | × | | |

○ : YES   × : NO   △ : PARTIALLY YES

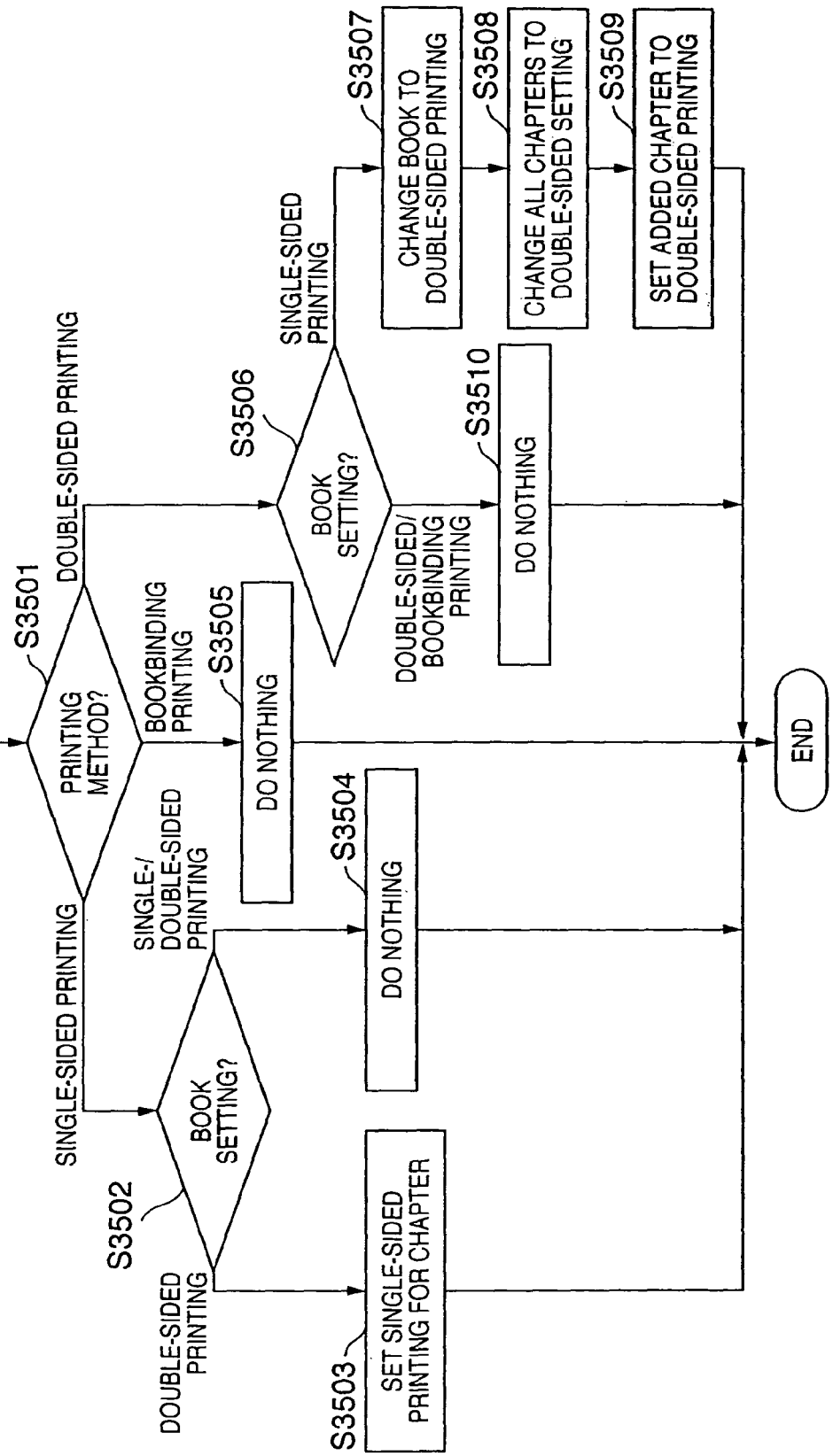

DOCUMENT PROCESSING APPARATUS, CONTROL METHOD THEREFOR, COMPUTER PROGRAM, AND COMPUTER-READABLE STORAGE MEDIUM

FIELD OF THE INVENTION

The present invention relates to a technique of combining output data generated by various application programs such as a document editing application and image editing application into one electronic document.

BACKGROUND OF THE INVENTION

As the performance of general-purpose information processing apparatuses such as a personal computer improves, texts, tables, images, and the like can be easily edited/created by various application programs.

In general, texts, simple tables, and the like are created by a document editing application program, images are created by an image editing application program, and tables with relatively complicated operation are created by a spreadsheet application program. In this manner, the user selectively uses an application in accordance with the purpose.

A document for one purpose is formed from only one type of data such as only a text, only a table with numerical operation, or only an image, but a situation in which a document containing different types of data is created is increasing.

To prepare a document formed from a plurality of types of data, each part of the document is created, edited, and printed by a corresponding application. Then, respective parts are rearranged in order and combined.

However, to assign page numbers to pages when the user creates one target document by combining printed materials generated by various applications, the user must print out all necessary data, combine them into a paper document as a printed result, and then determine page numbers to be assigned. Each application writes determined page numbers on respective pages (to be referred to as logical pages or document pages) of a document created by the application. Even if the application program has a function of assigning page numbers, the page numbers of discontinuous pages must be designated by the user. If the pages of the target document are rearranged, page numbers must be reassigned in accordance with the rearrangement. These pages must also be edited and printed again by a corresponding application when not data contents but merely the format is changed so that a plurality of document pages are combined into one page (to be referred to as a physical page or print page) as a print material, or single-sided printing is changed to double-sided printing.

Since an application which manages data changes depending on the type of data, the user must manually provide an interface between applications. This means that much labor is demanded of the user, decreasing the productivity. Especially creation of a document for one purpose by sharing respective parts between a plurality of users by using application programs on the PCs of the users is confusing, and readily causes errors owing to operations by many users.

To solve the above problems, the assignee of the present applicant has proposed a technique of forming one bookbinding application from various applications (e.g., Japanese Patent Laid-Open No. 2003-162407). The bookbinding application in this reference can manage a document by a hierarchical structure having a book, chapter, page, and the like, and can execute various settings and changes for each layer via a setting window or the like.

However, the bookbinding application cannot efficiently perform various settings and changes to any layer of a document having a hierarchical structure.

SUMMARY OF THE INVENTION

The present invention provides a technique which overcomes the above drawbacks.

In order to solve the above problems, a document processing apparatus according to the present invention comprises the following arrangement. That is, a document processing apparatus which creates a book file managed by a hierarchical structure and formed from document data comprises setting means for setting an attribute for a folder, detection means for detecting storage of data into the folder, and creation means for, when the detection means detects that data is stored into a first folder set by the setting means, creating document data based on a setting of the first folder on any layer of a book file which has already been created.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B are tables showing a list of book attributes;

FIG. 5 is a table showing a list of chapter attributes;

FIG. 6 is a table showing a list of page attributes;

FIG. 14 is a view showing an example of a dialog window for setting a whole document serving as the uppermost layer of the data structure;

FIG. 15 is a view showing an example of a dialog window for setting a chapter serving as the intermediate layer of the data structure;

FIG. 16 is a view showing an example of setting a unique attribute in the dialog window of FIG. 15;

FIG. 26 is a view showing an example of the description of address information;

FIG. 34 is a view showing an example of a table referred to when a book attribute is applied to a chapter;

FIG. 35 is a flowchart for explaining an example of a process when the printing method setting is applied;

DETAILED DESCRIPTION OF THE PREFERRED EMBODIMENTS

Preferred embodiments of the present invention will be described in detail below with reference to the accompanying drawings.

[Outline of Document Processing System According to First Embodiment]

The outline of a document processing system according to the first embodiment will be described with reference to FIGS. 1 to 13.

In the document processing system, a data file created by a general application is converted into an electronic document file by an electronic document writer to be described in the first embodiment. A bookbinding application according to the first embodiment provides a function of editing the electronic document file. In the first embodiment, a general application, electronic document writer, bookbinding application, and electronic document de-spooler are separately described for distinction between these functions. However, a package provided to the user is not limited to them, and an application or graphic engine as a combination of them may be provided, details of which will be described below.

<Example of Software Configuration of Document Processing System According to First Embodiment>

Figure 1:
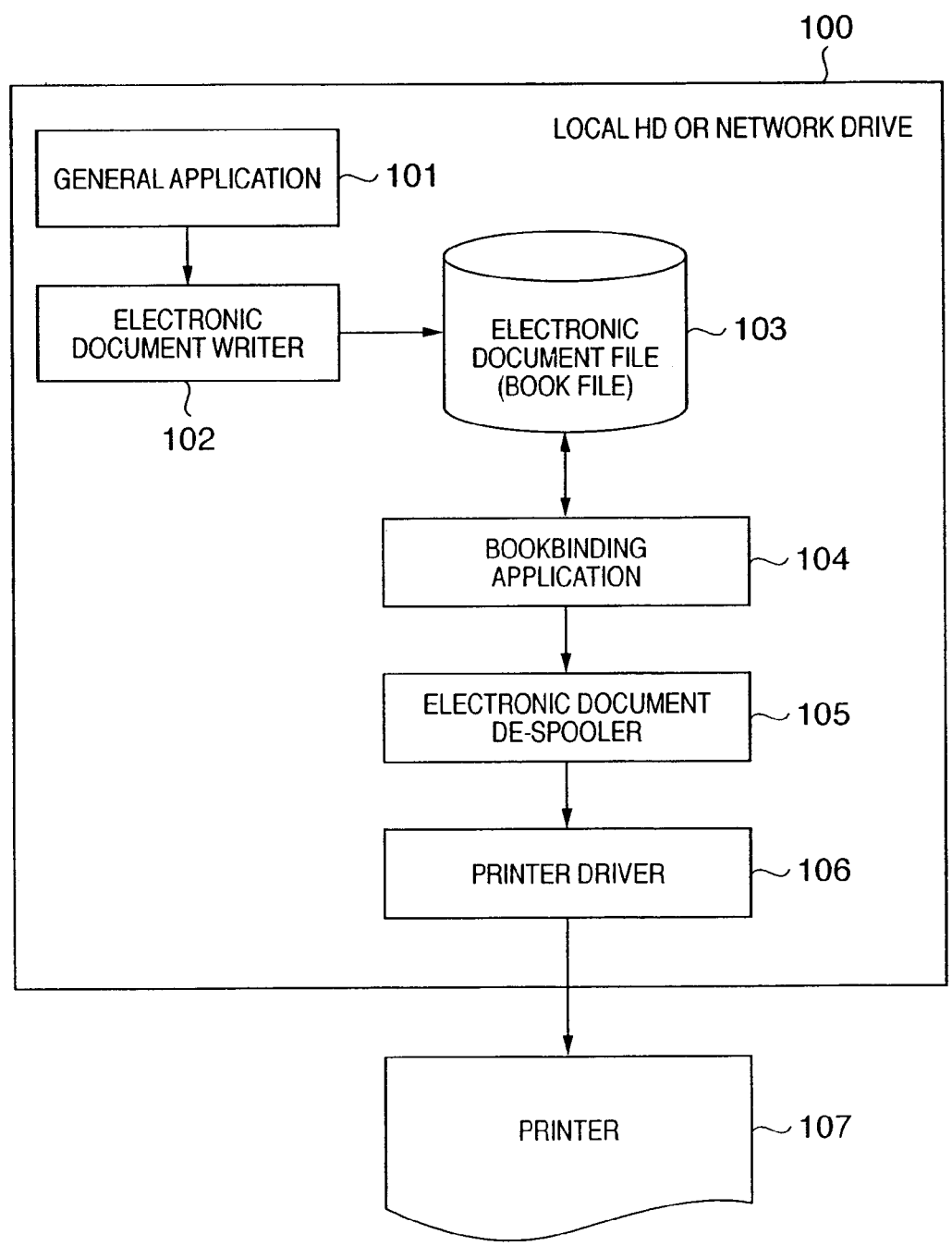
FIG. 1 is a block diagram showing an example of the software configuration of a stand-alone document processing system according to an embodiment.

FIG. 1 is a block diagram showing the software configuration of the document processing system according to the first embodiment.

The main part of the document processing system according to the first embodiment is implemented by a general-purpose information processing apparatus 100 such as a personal computer (to be also referred to as a PC or host computer hereafter). The type and manufacturer of a general application 101 do not matter as far as the application program provides any one function of wordprocessing, spreadsheet, photo-retouch, draw, paint, presentation, and text editing. In other words, any application can be adopted as far as it has a print instruction function to the OS.

Generally, when document data, image data, or the like created by an application is printed by the application, a predetermined interface (generally called GDI) provided by an OS (Operating System) is utilized. To print created data, the application 101 transmits an output command (called a GDI function) which is determined in advance for the output module of the OS providing the interface and has an OS-dependent format. A device driver receives the output command, converts the command into a format processible by an output device such as a printer, and outputs the converted command (called a DDI function). Since data converted by the device driver changes depending on the type of output device, the manufacturer, the model, or the like, a device driver is provided for each output device. The OS converts a command by using the device driver to generate print data, and combines the print data by JL (Job Language) to generate a print job. When the OS is Microsoft Windows®, the output module is a GDI (Graphical Device Interface) module.

An electronic document writer 102 according to the first embodiment is an improvement of the above-mentioned device drivers, and is a software module provided to implement the document processing system. The electronic document writer 102 does not target a specific output device, and converts an output command into a format processible by a bookbinding application 104 or printer driver 106 (to be described later). The format (to be referred to as an "electronic document format" hereinafter) converted by the electronic document writer 102 is not particularly limited as far as each document page can be expressed by a detailed format. Practical standard formats are, for example, the PDF format by Adobe Systems, and the SVG format.

When the application 101 utilizes the electronic document writer 102, the electronic document writer 102 is designated (selected) as a device driver used for output, and then caused to execute printing. The electronic document writer 102 and a general printer driver do not make any difference to the application 101. The electronic document writer 102 saves a result processed in the above-described manner as a file 103 in a proper folder (directory).

An electronic document file created by the electronic document writer 102 does not have a complete electronic document file format to be described in the first embodiment. For this reason, the electronic document writer 102 is designated as a device driver by the bookbinding application 104, and executes conversion of application data into an electronic document file under the management of the bookbinding application 104 (details of which will be described later). The bookbinding application 104 completes a new incomplete electronic document file generated by the electronic document writer 102 as an electronic document file having the following format. In case of necessity to definitely discriminate these files, a file created by the electronic document writer 102 will be called an electronic document file, and an electronic document file given a structure by the bookbinding application will be called a book file. If these files need not be particularly discriminated, a document file generated by an application, an electronic document file, and a book file are called document files (or document data).

As described above, the electronic document writer 102 is designated as a device driver, and the general application 101 prints the data. Application data is converted into an electronic document format in pages (to be referred to as "logical pages" or "document pages" hereinafter) defined by the application 101. The converted data is stored as the electronic document file 103 in a storage medium such as a hard disk.

It should be noted that the electronic document writer according to the first embodiment does not make any difference from a printer driver prepared by a general printer manufacturer to the application, as described above. More specifically, a data file of a format processable by the bookbinding application to be described in the first embodiment can be obtained via the electronic document writer 102 according to the first embodiment as far as the application has a printout function regardless of an existing application program or an unknown application which will come into the market in the future.

The bookbinding application 104 according to the first embodiment provides the user with a function of reading and editing the electronic document file or book file 103. The editing function of the bookbinding application 104 according to the first embodiment is not a detailed function of, e.g., editing a text, unlike a wordprocessor, but a function of editing a chapter or book structure (to be described later) made up of pages as a minimum unit. Detailed editing such as a change of a font in a text or insertion of a character can be performed again by an original accustomed application.

To print the book file 103 edited by the bookbinding application 104, the bookbinding application 104 activates an electronic document de-spooler 105. The electronic document de-spooler 105 is a program module which is installed in the computer together with the bookbinding application. The electronic document de-spooler 105 is used to output drawing data to a printer driver in printing a document (book file) used by the bookbinding application. The electronic document de-spooler 105 reads out a designated book file from the hard disk. To print each page in a format described in the book file, the electronic document de-spooler 105 generates an output command complying with the output module of the OS described above, and outputs the command to the output module (not shown). At this time, the driver 106 of a printer 107 used as an output device is designated as a device driver.

The output module converts the output command received using the designated printer driver 106 of the printer 107 into a device command interpretable by the printer 107. The device command is transmitted to the printer 107, which prints an image corresponding to the command.

<Example of Hardware Configuration of Document Processing System According to First Embodiment>

Figure 2:
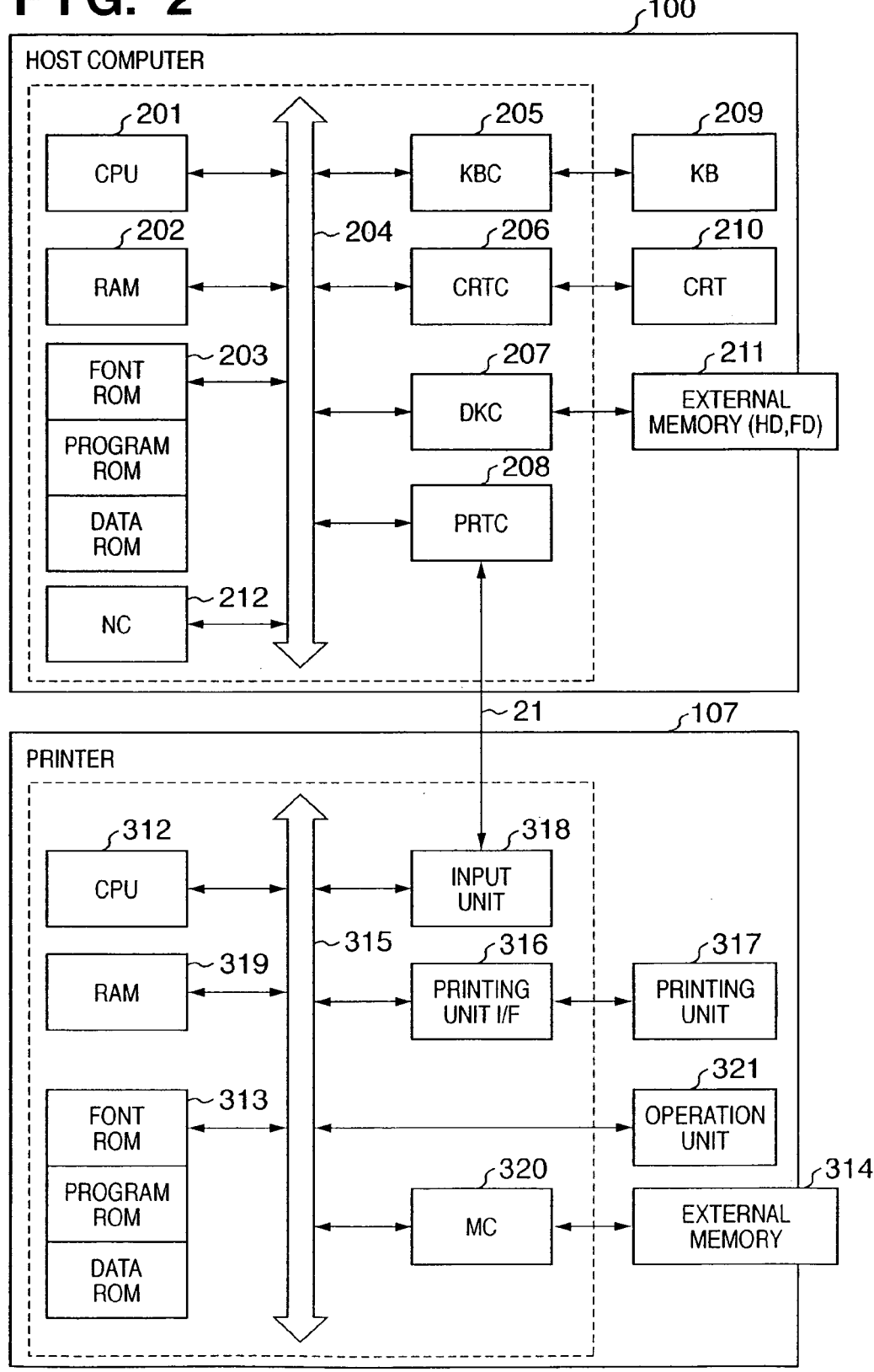
FIG. 2 is a block diagram showing an example of a hardware configuration which implements the document processing system according to the embodiment.

FIG. 2 is a block diagrams showing the hardware configuration of the document processing system according to the first embodiment.

In FIG. 2, the PC 100 comprises a CPU 201 which controls elements connected to a system bus 204 and controls the overall apparatus. The CPU 201 executes a document processing program and various applications for figures, images, characters, and tables (including spreadsheets and the like). A ROM 203 stores a BIOS, boot program, basic font data, and various data. An external memory 211 (hard disk device or the like) stores an OS, various programs (general application program 101, electronic document writer 102, bookbinding application 104, electronic document de-spooler 105, and printer driver 106 shown in FIG. 1) to be described in the first embodiment, font data, and data files created by various applications. A RAM 202 functions as a main memory, work area, or the like for the CPU 201. When the apparatus is powered on, the CPU 201 imports an OS from the external memory 211 to the RAM 202 in accordance with a boot program in the ROM 203, then imports various applications and programs to be described in the first embodiment, and functions as an information processing apparatus.

A keyboard controller (KBC) 205 controls a key input from a keyboard 209 or a pointing device (not shown). A CRT controller (CRTC) 206 controls the display of a CRT display (CRT) 210. A disk controller (DKC) 207 controls access to the external memory 211 which stores a boot program, various applications, font data, user files, edited files, a printer control command generation program (to be referred to as a printer driver hereinafter), and the like. A printer controller (PRTC) 208 is connected to the printer 107 via a bidirectional interface (interface) 21, and executes a communication control process with the printer 107. An NC (Network Controller) 212 communicates with a network, and executes a communication control process with another device connected to the network.

The CPU 201 executes, e.g., an outline font rasterization process to a display information RAM set in the RAM 202, and enables WYSIWYG on the CRT 210. The CPU 201 opens various registered windows and executes various data processes on the basis of commands designated on the CRT 210 with a Mouse® cursor (not shown) or the like. When the user executes printing, he/she opens a print setting window, and can perform setting of a printer and setting of a printing process method to the printer driver that includes selection of a print mode.

The printer 107 comprises a CPU 312 which controls the entire printer. The CPU 312 outputs an image signal as output information to a printing unit (printer engine) 317 connected to a system bus 315 on the basis of a control program stored in a program ROM within a ROM 313 or a control program stored in an external memory 314. The program ROM within the ROM 313 stores, e.g., the control program of the CPU 312. A font ROM within the ROM 313 stores, e.g., font data used to generate the output information. A data ROM within the ROM 313 stores, e.g., information used in the host computer for a printer having no external memory 314 such as a hard disk.

The CPU 312 can communicate with the host computer via an input unit 318, and notify the host computer 100 of internal printer information or the like. A RAM 319 functions as a main memory, work area, or the like for the CPU 312, and the memory capacity can be expanded by an optional RAM connected to an expansion port (not shown). The RAM 319 is used as an output information mapping area, environment data storage area, NVRAM, or the like. Access to the external memory 314 such as a hard disk (HD) or IC card is controlled by a memory controller (MC) 320. The external memory 314 is connected as an option, and stores font data, emulation programs, form data, and the like. Reference numeral 321 denotes an operation panel described above which is equipped with operation switches, an LED display, and the like.

The number of external memories 314 is not limited to one, and a plurality of external memories 314 may be arranged. A plurality of external memories which store an option card and a program for interpreting the printer control languages of different language systems in addition to built-in fonts may be connected. Further, an NVRAM (not shown) may be adopted to store printer mode setting information from the operation unit 321.

<Example of Format of Electronic Document Data>

Before referring to details of the bookbinding application 104, the data format of a book file will be explained. The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined. The lower layer is a "page", and corresponds to each page defined by an application program. As for each page, its attributes can be defined. One book may contain a plurality of chapters, and one chapter may contain a plurality of pages.

Figure 3:
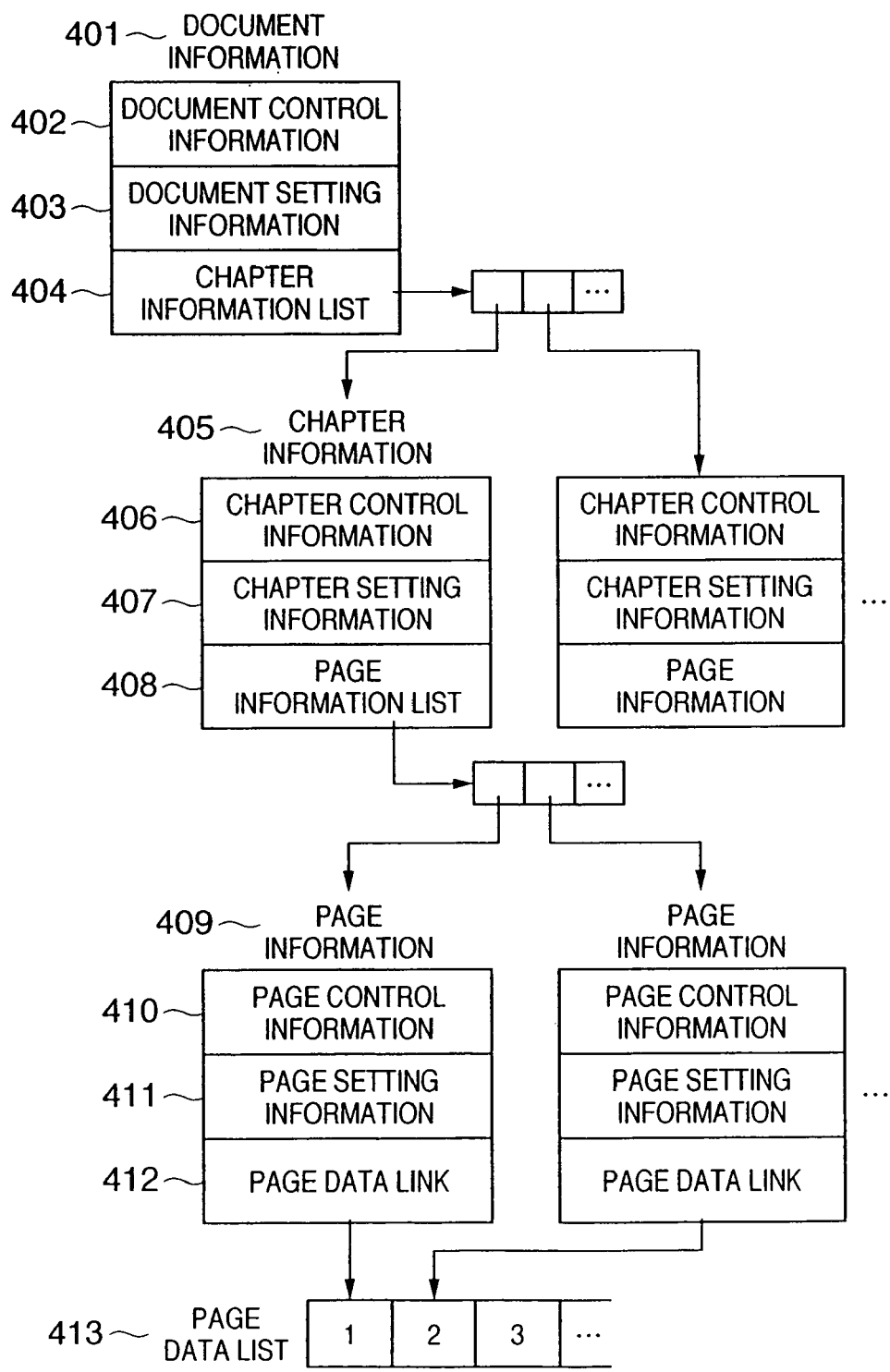
FIG. 3 is a view showing an example of a book file structure.

FIG. 3 is a view schematically showing an example of the book file format. A book, chapter, and page in the book file of this example are represented by corresponding nodes. One book file contains one book. The book and chapter are a concept for defining a book structure, and contain, as entities, defined attribute values and links to lower layers. The page has, as entities, data of each page output from an application program. The page contains a document page entity (document page data) and a link to each document page data in addition to an attribute value. Note that a print page to be output to a paper medium may contain a plurality of document pages. This structure is displayed not by a link, but by attributes in book, chapter, and page layers.

The book file shown in FIG. 3 need not be one completed book, but can be repetitively edited. Thus, "book" is generalized as a "document" in FIG. 3.

Document information 401 is defined at the top. The document information 401 can be roughly divided into three parts 402 to 404. The document control information 402 holds information such as the path name in the file system of a document file. The document setting information 403 holds layout information such as the page layout, and function setting information of a printing apparatus such as stapling, and corresponds to book attributes. The chapter information list 404 holds as a list a set of chapters which form a document. The list holds chapter information 405.

The chapter information 405 can also be roughly divided into three parts 406 to 408. The chapter control information 406 holds information such as the chapter name. The chapter setting information 407 holds information on the page layout and stapling unique to the chapter, and corresponds to chapter attributes. By holding setting information for each chapter, a document having a complicated layout can be created so that the first chapter has a 2UP layout and the remaining chapters have a 4UP layout. The page information list 408 holds as a list a set of document pages which form each chapter. The page information list 408 designates page information data 409. Note that "2UP" means a layout of two pages created by a general application on one page created by the bookbinding application 104 according to the first embodiment. "4UP" means a state in which 4-page data created by a general application are laid out in 2×2 on one page created by the bookbinding application. "Nup" means a state in which n logical pages are laid out on one print sheet.

In FIG. 3, one logical page subjected to printing via the electronic document writer 102 by the application program corresponds to one page by the bookbinding application 104. For example, for 4UP, a page data link 412 stores link information of four logical pages.

The page information data 409 is also roughly divided into three parts 410 to 412. The page control information 410 holds information such as a page number displayed at the tree. The page setting information 411 holds information such as the page rotation angle and page layout position information, and corresponds to document page attributes. The page link information 412 is document data corresponding to a page. In this example, the page information 409 does not directly have document data, but has only the link information 412. Actual document data is held by a page data list 413.

FIGS. 4A and 4B show an item list of settable book attributes (document setting information 403). In general, as for an item which can be defined repetitively on lower and upper layers, the attribute value of the lower layer is preferentially adopted. In other words, setting items on the upper layer are reflected in items whose attributes are not particularly set on the lower layer. As for an item which is set effective only for a book attribute, a value defined in the book attribute is effective throughout the book. In this example, when an attribute item has different settings on lower and upper layers, which of the settings is given priority can be selected (to be described later). Each item shown in FIGS. 4A and 4B does not correspond to one concrete item, but may contain a plurality of relevant items.

Items unique to the book attribute are six items: printing method, details of bookbinding, front/back cover, index paper, inserting paper, and chapter segmentation. These items are defined throughout the book. As the printing method attribute, three values, i.e., single-sided printing, double-sided printing, and bookbinding printing can be designated. Bookbinding printing is a method of printing in a format which allows bookbinding by bundling a separately designated number of paper sheets, folding the bundle into two, and binding the bundle. As the detailed bookbinding attribute, the opening direction and the number of paper sheets to be bundled can be designated when bookbinding printing is designated.

The front/back cover attribute includes designation of adding paper sheets serving as front and back covers when an electronic document file combined as a book is printed, and designation of contents to be printed on the added paper sheets. The index paper attribute includes designation of inserting tabbed index paper separately prepared in a printing apparatus for chapter segmentation, and designation of contents to be printed on the index (tabbed) portion. This attribute becomes effective when a printing apparatus for use is equipped with an inserter having an inserting function of inserting a paper sheet prepared separately from a print sheet into a desired position, or when a plurality of sheet cassettes can be used. This also applies to the inserting paper attribute.

The inserting paper attribute includes designation of inserting a paper sheet fed from an inserter or sheet feed cassette for chapter segmentation, and designation of a sheet feed source when inserting paper is inserted.

The chapter segmentation attribute includes designation of whether to use a new paper sheet, use a new print page, or do nothing particular at a chapter break. In single-sided printing, the use of a new paper sheet and the use of a new print page are the same. In double-sided printing, successive chapters are not printed on one paper sheet if "the use of a new paper sheet" is designated, but may be printed on the obverse and reverse of one paper sheet if "the use of a new print page" is designated.

FIG. 5 shows a list which can be set by the chapter attribute (chapter setting information 407), and FIG. 6 shows a list which can be set by the page attribute (page setting information 411). The relationship between the chapter attribute and the page attribute is the same as that between the book attribute and the lower layer attribute.

As for the chapter attribute, there is no item unique to the chapter, and all items overlap those of the book attribute. In general, if the definition of the chapter attribute is different from that of the book attribute, a value defined by the chapter attribute precedes. In this example, however, whether to preferentially adopt the attribute value of a lower layer can be selected (to be described later).

Items common to only the book and chapter attributes are five items: paper size, paper orientation, Nup printing designation, enlargement/reduction, and delivery method. As described above, the Nup printing designation attribute is an item for designating the number of document pages contained in one print page. Layouts which can be designated are 1×1, 1×2, 2×2, 3×3, 4×4, and the like. The delivery method attribute is an item for designating whether to staple discharged paper sheets. The effectiveness of this attribute depends on whether a printing apparatus for use has a stapling function.

Items unique to the page attribute are a page rotation attribute, zoom (or resizing), layout designation, annotation, and page separation. The page rotation attribute is an item for designating the rotation angle when a document page is laid out on a print page. The zoom attribute is an item for designating the resizing ratio of a document page. The resizing ratio is designated based on a virtual logical page region size=100%. The virtual logical page region is a region occupied by one document page when document pages are laid out in accordance with Nup designation or the like. For example, the virtual logical page region is a region corresponding to one print page for 1×1, and a region obtained by reducing each side of one print page to about 70% for 1×2.

Attributes common to the book, chapter, and page are a watermark attribute and header/footer attribute. The watermark is a separately designated image or character string printed over data created by an application. The header/footer is a watermark printed at the upper or lower margin of each page. For the header/footer, items such as a page number, and date and time which can be designated by variables are prepared. Contents which can be designated by the watermark attribute and header/footer attribute are common between the chapter and the page, but are different from those of the book. The book can set the watermark and header/footer contents, and designate how to print a watermark or header/footer throughout the book. To the contrary, the chapter and page can only designate whether to print a watermark or header/footer set by the book on the chapter or page.

The configuration as a premise for the first embodiment, and the book file structure created by the bookbinding application have been described. The bookbinding application according to the first embodiment will be explained in more detail.

<Example of Operation Sequence of Document Processing System According to First Embodiment>

A sequence of creating a book file by the bookbinding application 104 and electronic document writer 102 will be explained. Creation of a book file is realized as part of book file editing operation by the bookbinding application 104.

Figure 7:
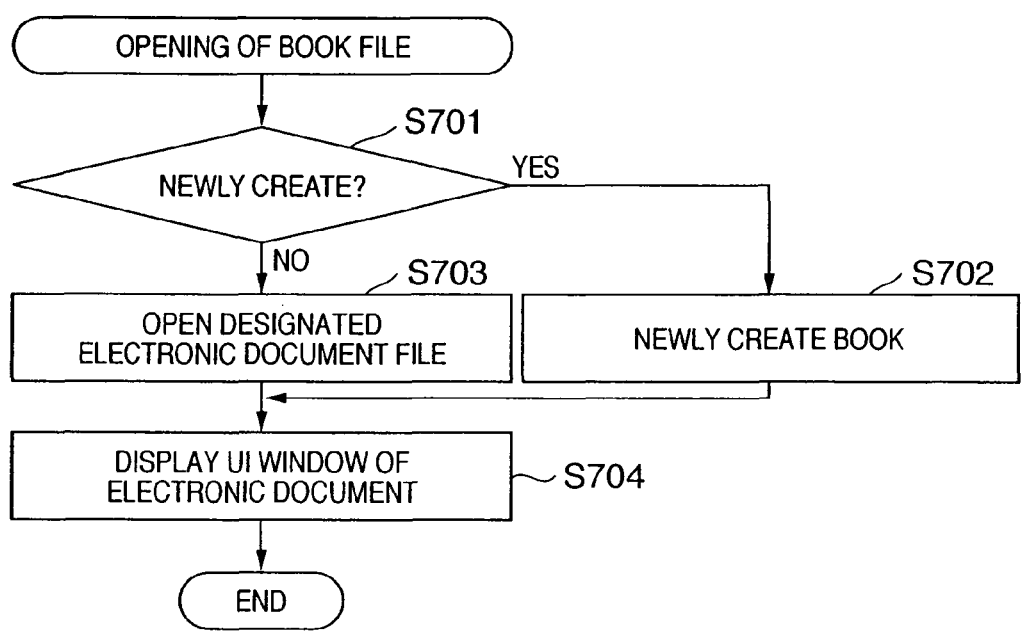
FIG. 7 is a flowchart showing an example of a sequence of opening a book file.

FIG. 7 is a flowchart showing a sequence when the bookbinding application 104 opens a book file.

Figure 8:
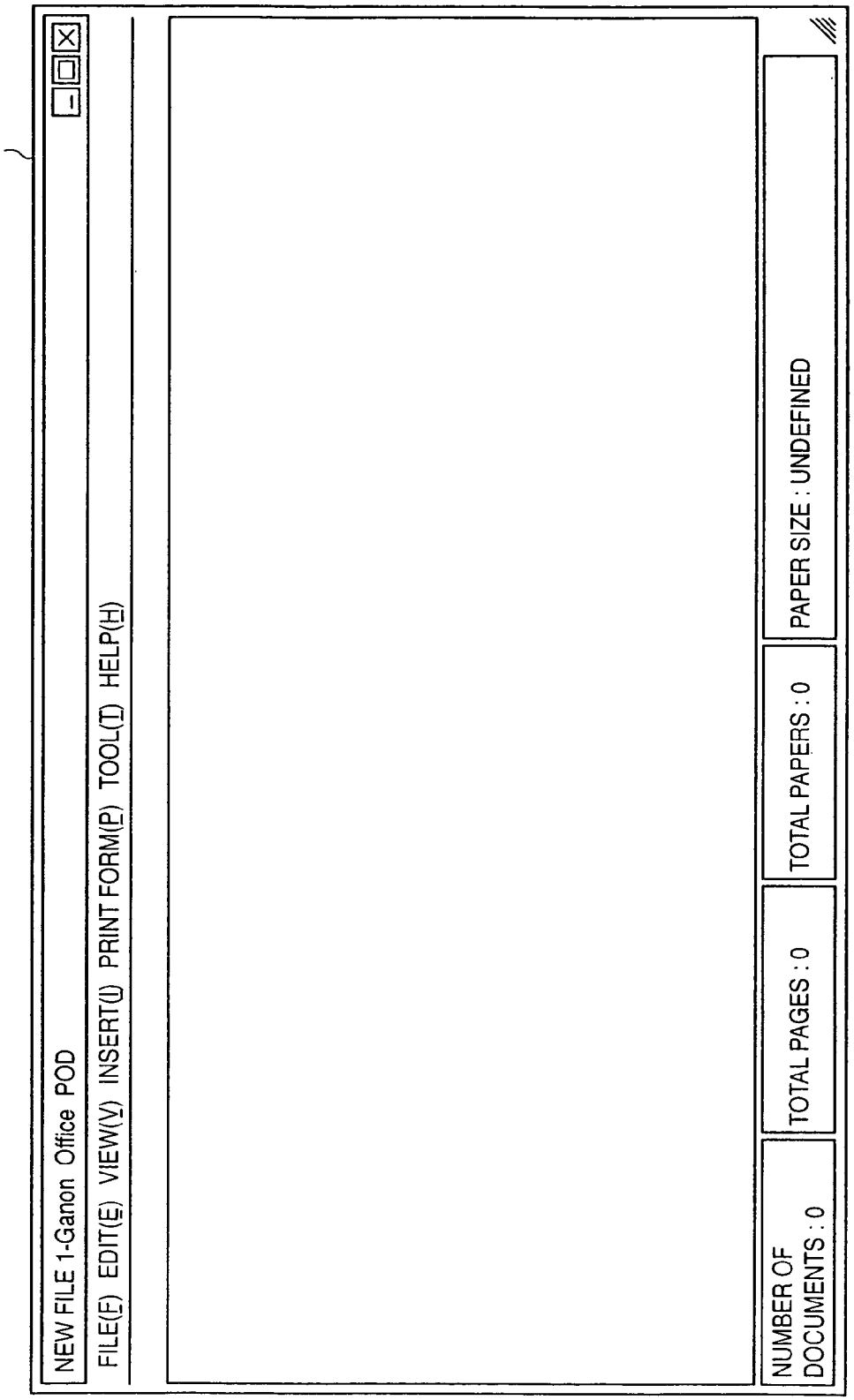
FIG. 8 is a view showing an example of a user interface window when a new book file is opened.

Whether a book file to be opened is one to be newly created or an existing one is determined (step S701). If the book file is one to be newly created, a book file containing no chapter is newly created (step S702). In the example shown in FIG. 3, the newly created book file has only a book node 301 which does not have any link to a chapter node. The book attribute is set by the user according to need, but default settings are applied to a new document. A UI (User Interface) window for editing the new book file is displayed (step S704). FIG. 8 shows an example of a UI window when a book file is newly created. In this case, the book file does not have any substantial content, and a UI window 800 does not display anything.

Figure 9:
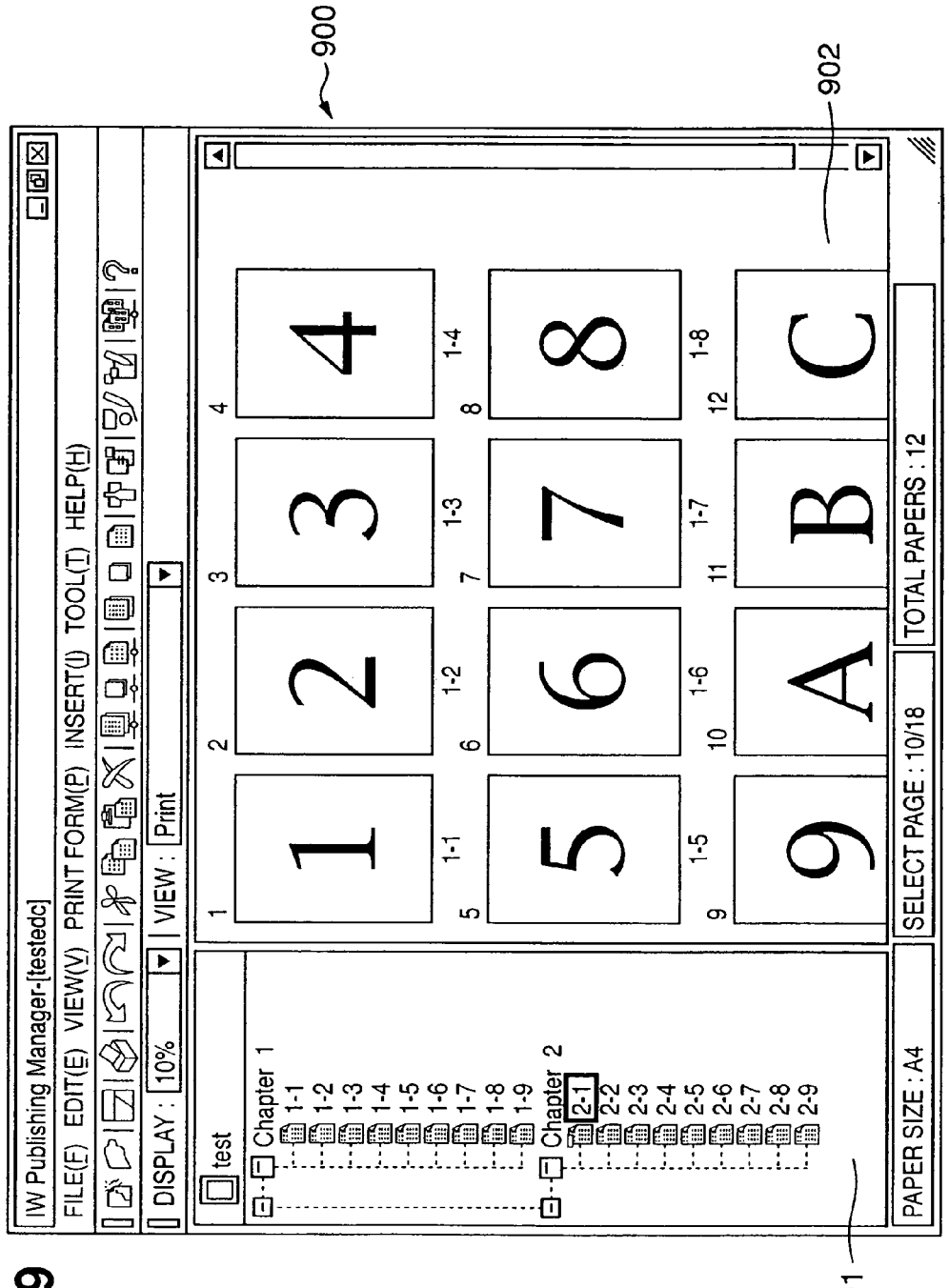
FIG. 9 is a view showing an example of a user interface window when an existing book file is opened.

If the book file is an existing one, the user designates the book file. Upon designation, the book file is opened (step S703), and a UI (User Interface) window is displayed in accordance with the structure, attributes, and contents of the book file. FIG. 9 shows an example of the UI window. A UI window 900 has a tree portion 901 representing a book structure, and a preview portion 902 displaying a state to be printed. The tree portion 901 displays chapters contained in the book and pages contained in each chapter so as to present a tree structure as shown in FIG. 3. Pages displayed at the tree portion 901 are document pages. The preview portion 902 displays reduced print page contents. The display order reflects the book structure.

Application data converted into an electronic document file by the electronic document writer 102 can be added as a new chapter to the open book file (also including a newly created book file). This function is called an electronic document import function. The electronic document is imported to the book file newly created by the sequence of FIG. 7, giving an entity to the book file. This function is activated by dragging and dropping a desired application data file onto the window of FIG. 8 or 9 by using a GUI prepared by an OS.

The type of file to be dragged and dropped does not matter as far as the file is a data file created by a general application program. The application which creates the data file is assumed to be installed in the PC 100. When the structure (format) of a file to be dragged and dropped is laid open to the public, for example, the file is a general-purpose data file with an extension "jpg", "bmp", "tiff", "pdf", or the like, the file can be interpreted by the bookbinding application 104 of the first embodiment, and the application which creates the file is not always necessary. The general-purpose file is limited to a file having a data structure supported by the bookbinding application 104. For a data file having another structure, an application which creates and edits the data file must be installed.

Figure 10:
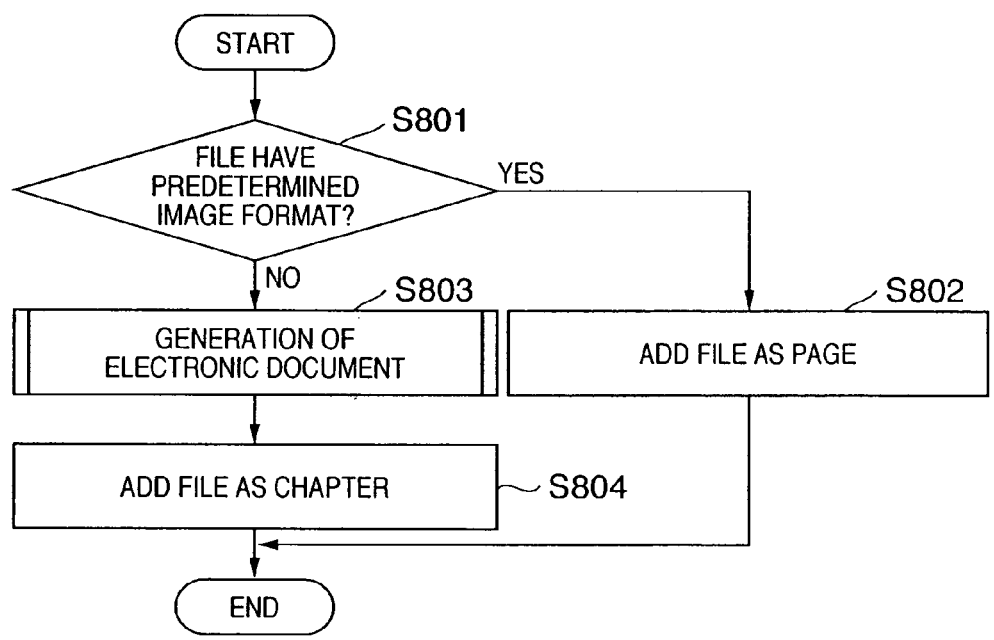
FIG. 10 is a flowchart showing an example of a sequence of importing an electronic document file to a book file.

FIG. 10 is a flowchart showing an example of an electronic document import sequence.

In step S801, it is determined whether the dragged/dropped file is a predetermined general-purpose image file as described above, i.e., a file which can be directly interpreted by the bookbinding application according to the first embodiment.

If the file is determined to be an image file interpretable by the bookbinding application, the process advances to step S802 to add the file as a page to a book during editing by the bookbinding application.

Since no chapter exists while the bookbinding application creates a new book file, a new chapter is created, and the file is added as a page belonging to the chapter. As for page attributes in adding the file, attributes common to the attributes of an upper layer are given the attribute values of the upper layer, and attributes which are defined in application data and inherited to an electronic document file are given values defined in the application data. For example, when Nup designation is defined in application data, the page inherits this attribute value.

If it is determined in step S801 that the data file cannot be directly interpreted by the bookbinding application, for example, if the data file is determined to have been created by a wordprocessing application, spreadsheet application, or unknown application, the process advances to step S803 to create an electronic document file.

More specifically, an application program which creates the dragged/dropped data file is activated, the electronic document writer 102 is designated as a printout device driver, and the application data is printed out. As a result, an electronic document file is generated, as shown in FIG. 1.

The process then advances to step S804 to add the generated electronic document file as a chapter to a book opened by the bookbinding application according to the first embodiment.

In this way, a new book file is created, or a new chapter or page is added. In this example, however, whether to preferentially adopt the attribute value of a lower layer can be selected (to be described later).

Figure 11:
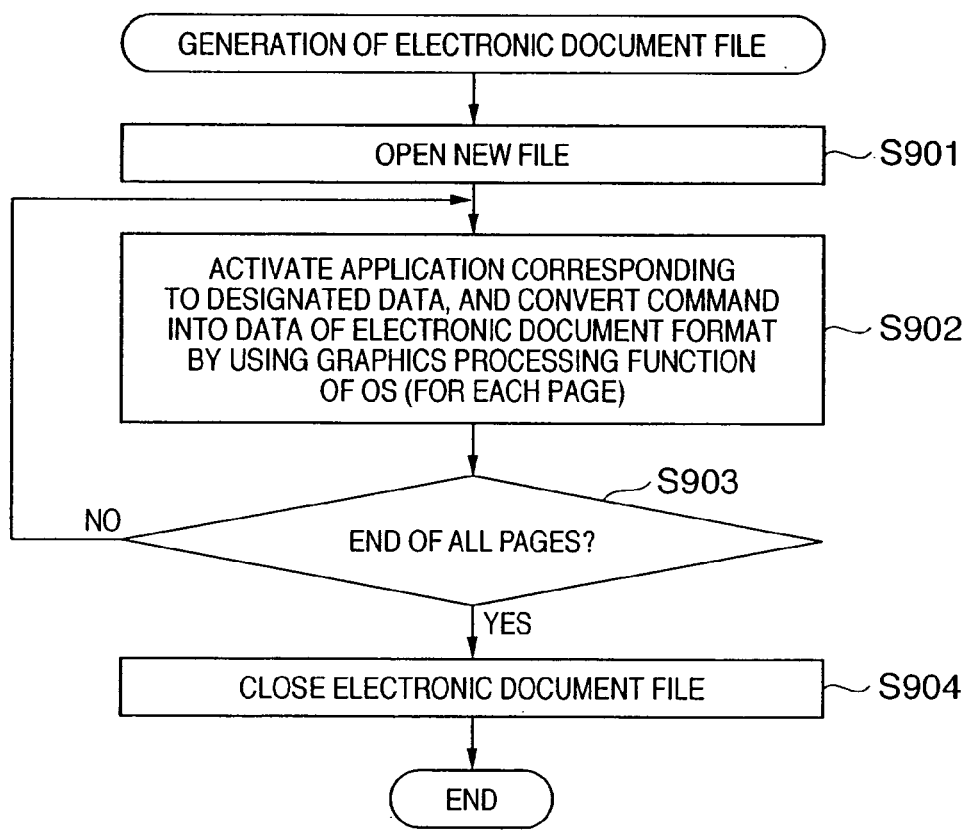
FIG. 11 is a flowchart showing an example of a sequence of converting application data into an electronic document file in step S801 of FIG. 10.

FIG. 11 is a flowchart showing the process in step S803 of FIG. 10, i.e., a sequence of generating an electronic document file by the electronic document writer 102 from the dragged/dropped application data file.

In order to save a new electronic document file, an empty file is created in the external memory 211 and opened (step S901). An application corresponding to a designated application data file is activated, and the electronic document writer 102 is set as a device driver to transmit an output command to an OS output module. When the OS is Microsoft Windows®, an application program which creates the data file can be specified from, e.g., the extension of the dragged/dropped data file by searching the registry file.

The output module converts the received output command into data of an electronic document format by the electronic document writer 102, and outputs the converted data (step S902). The output destination is the electronic document file opened in step S901. Whether all designated data have been converted is determined (step S903), and if YES in step S903, the electronic document file is closed (step S904). The electronic document file generated by the electronic document writer 102 is a file containing document page data entities shown in FIG. 3, and has a format interpretable by the bookbinding application according to the first embodiment.

For example, when a data file for a wordprocessing application is converted into an electronic document file by drag & drop, one chapter containing a plurality of pages is created in the electronic document file. When an unnecessary page exists in the created chapter, the bookbinding application issues an instruction to delete the page, leaving only necessary pages.

By repeating the above process for necessary application data files, a chapter is created for each imported file, and a page is created below the chapter. From this, it is understood that a book containing pages created by different applications can be created.

<Example of Editing Book File>

As described above, a book file can be created from application data. Chapters and pages in the generated book file can be edited as follows.
(1) New document
(2) Delete
(3) Copy
(4) Cut
(5) Paste
(6) Move
(7) Change chapter name
(8) Reassign page number/name
(9) Insert cover
(10) Insert inserting paper
(11) Insert index paper
(12) Page layout of each document page In addition, an operation of canceling executed editing operation, and an operation of restoring canceled operation can be performed. These editing functions enable editing operations such as consolidation of a plurality of book files, rearrangement of chapters and pages within a book file, delete of chapters and pages within a book file, layout change (to 2UP or the like) of a document page, and insertion of inserting paper and index paper. By these operations, operation results are reflected in attributes shown in FIGS. 4 to 6 or in the structures of the book file. For example, a blank page is inserted to a designated portion by an operation of newly adding a blank page. The blank page is processed as a document page. If the layout of a document page is changed, the change contents are reflected in attributes such as the printing method, Nup printing, front/back cover, index paper, inserting paper, and chapter segmentation. Also, a page in a given chapter can be moved to another chapter (page is dragged and dropped to another chapter).

A display and operation example in editing will be described in detail below.

<Example of Output of Book File>

The ultimate goal of a book file created and edited in the above manner is to print out the file. If the user selects a file menu from the UI window 900 of the bookbinding application shown in FIG. 9 and selects printing from this menu, the book file is then printed out by a designated output device. At this time, the bookbinding application 104 creates a job ticket from a currently open book file, and transfers the job ticket to the electronic document de-spooler 105. The electronic document de-spooler 105 converts the job ticket into an OS output command, e.g., a Windows® GDI command, and transmits the command to an output module, e.g., GDI. The output module generates a command complying with a device by the designated printer driver 106, and transmits the command to the device.

The graphic engine of the output module (not shown) imports the printer driver 106 prepared for each printing apparatus from the external memory 211 to the RAM 202, and sets the output to the printer driver 106. The output module converts the received GDI (Graphic Device Interface) function into a DDI (Device Driver Interface) function, and outputs the DDI function to the printer driver 106. The printer driver 106 converts the received output into a control command such as a PDL (Page Description Language) command recognizable by the printer on the basis of the DDI function received from the output module. The converted printer control command passes through a system spooler imported by the OS to the RAM 202, and is output as print data to the printer 107 via the interface 21.

The job ticket is data having a structure whose minimum unit is a document page. The structure of the job ticket defines the layout of a document page on a paper sheet. One job ticket is issued for one print job. The document node is set at the top of the structure, and defines the attribute of the whole document such as double-sided printing/single-sided printing. This node is accompanied with a paper node containing attributes such as the identifier of paper for use and designation of a feed port in the printer. Each paper node is accompanied with a sheet node which is printed on the paper. One sheet corresponds to one paper sheet. A print page (physical page) belongs to each sheet. One physical page belongs to one sheet in single-sided printing, and two physical pages belong to one sheet in double-sided printing. A document page to be laid out on a physical page belongs to the physical page. The physical page attribute contains a document page layout.

Figure 12:
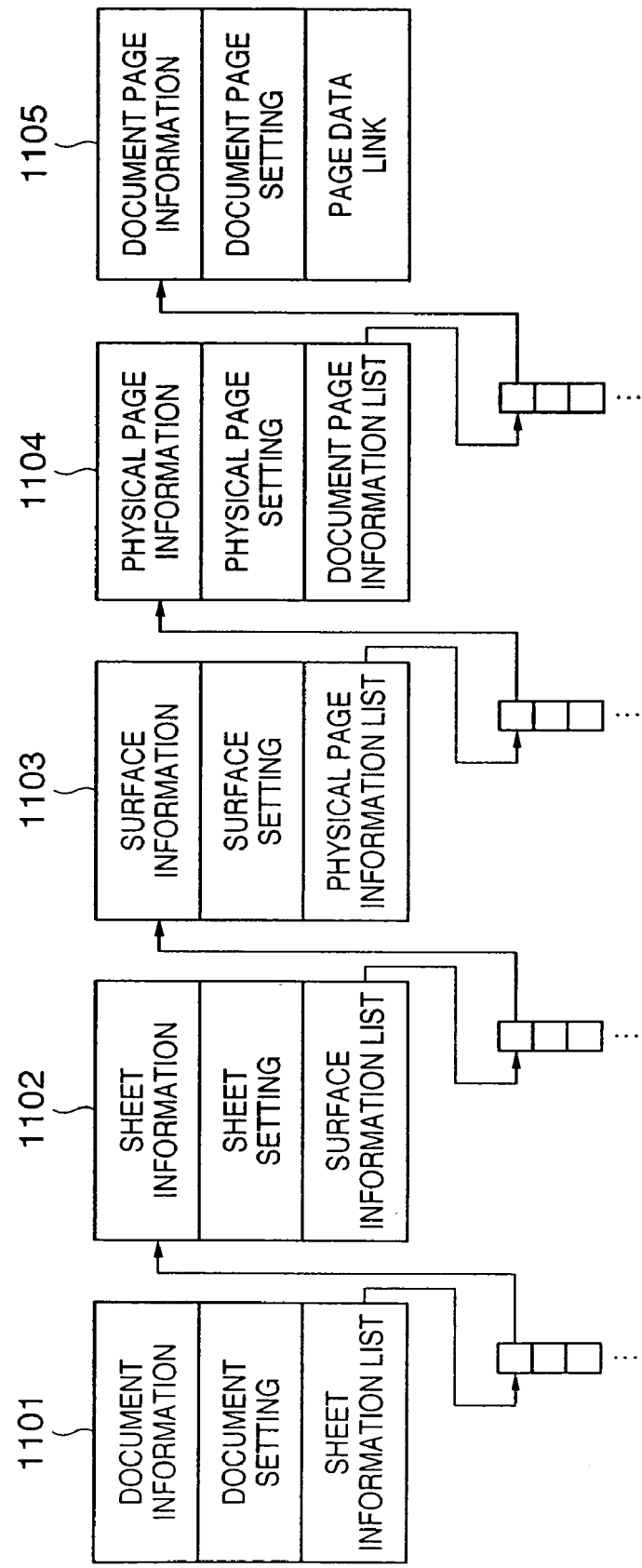
FIG. 12 is a view showing an example of a data structure used for printing and display.

FIG. 12 shows an example of the data structure of a job ticket. In print data, a document is formed from a set of sheets, and each sheet is formed from two, upper and lower surfaces. Each surface has a region (physical page) for laying out a document, and each physical page is formed from a set of document pages serving as minimum units. Reference numeral 1101 denotes data corresponding to a document. The data 1101 is made up of data on a whole document and a list of sheet information forming the document. Sheet information 1102 is formed from information on a sheet such as a sheet size, and a list of surface information laid out on the sheet. Surface information 1103 is formed from data unique to a surface, and a list of physical pages laid out on the surface. Physical page information 1104 and 1105 are formed from information such as the size and header/footer of a physical page, and a list of document pages which form the physical page.

The electronic document de-spooler 105 converts the job ticket into an output command to an output module.

<Example of Preview Display Contents>

As described above, when a book file is opened by the bookbinding application, the user interface window 900 shown in FIG. 9 is displayed. The tree portion 901 displays a tree representing the structure of the open book (to be referred to as a "book of interest" hereinafter). At the preview portion according to the first embodiment, three display methods are prepared in accordance with designation by the user. The first method is a mode called a document view which directly displays document pages. In the document view mode, the contents of document pages belonging to the book of interest are reduced and displayed. The display of the preview portion does not reflect any layout. The second method is a printing view mode. In the printing view mode, the preview portion 902 displays document pages in a format which reflects the layout of them. The third method is a simple printing view mode. In the simple printing view mode, the contents of document pages are not reflected in the display of the preview portion, but only the layout is reflected. Switching between these display modes can be designated from a pull-down menu displayed by clicking "view" on the menu bar of the bookbinding application.

<Another Example of Configuration of Document Processing System>

The document processing system according to the first embodiment is of a stand-alone type. A server-client system as an extension of the stand-alone system also creates and edits a book file by almost the same configuration and sequence. A book file and printing process are managed by the server.

Figure 13:
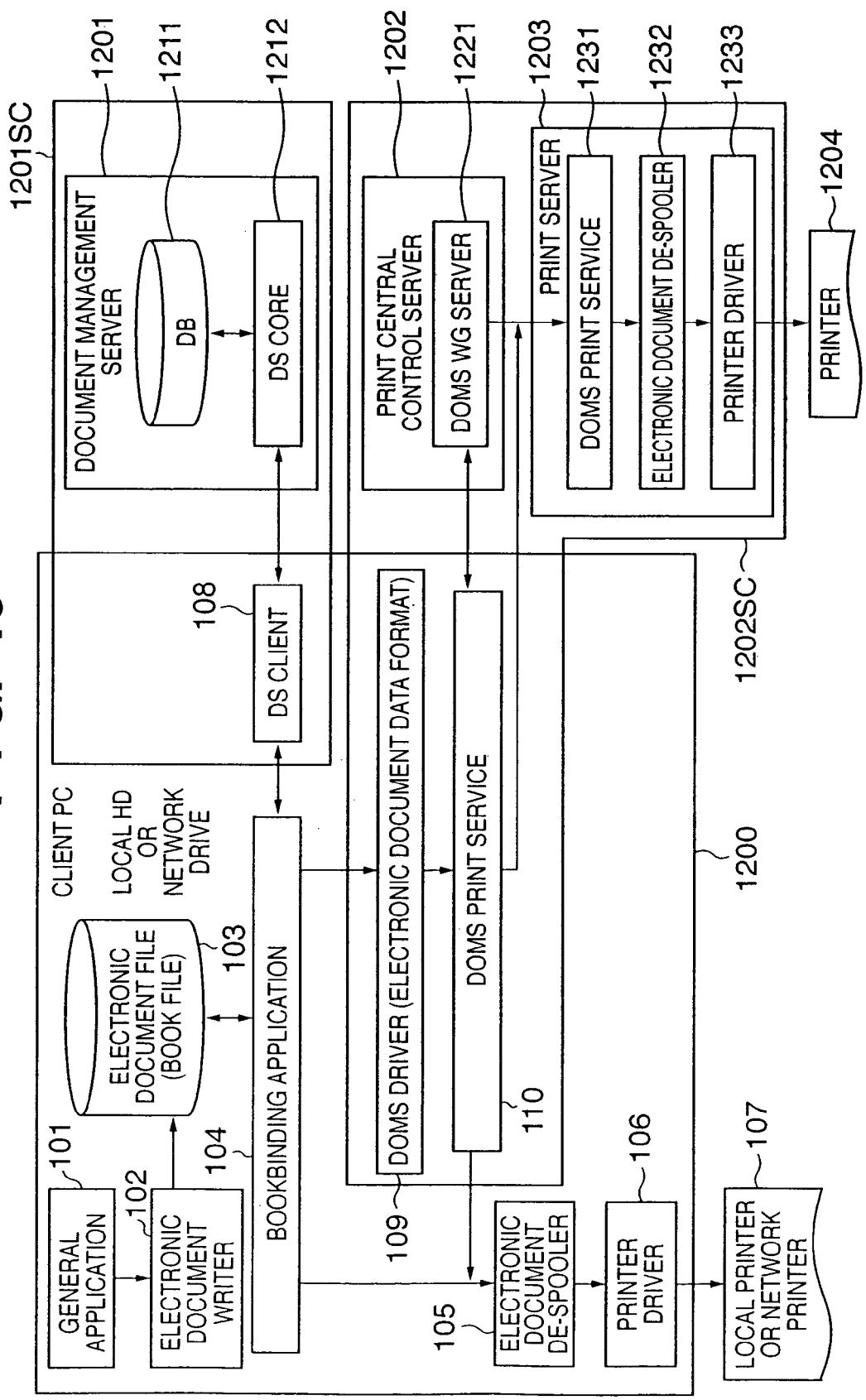
FIG. 13 is a block diagram showing an example of the software configuration of a client-server document processing system.

FIG. 13 is a block diagram showing the configuration of a server-client document processing system.

The client document processing system is constituted by adding to the stand-alone system a DOMS (Document Output Management Service) driver 109 serving as a client module, a DOMS print service module 110, and a DS (Document Service) client module 108. A client document processing system 1200 is connected to a document management server 1201, print central control server 1202, and print server 1203. These servers are generally connected to the client document processing system via a network. When the servers also function as clients, they are connected by interprocess communication which simulates communication between networks. The document management server 1201 and print central control server 1202 are connected to the client in FIG. 13, but only either one may exist on the network. If the connected server is the document management server, a document management server-client system 1201SC including a client module is added to the stand-alone document management system. If the connected server is the print central control server 1202, a printing management server-client system 1202SC including a client module is added.

The document management server 1201 stores a book file created and edited by the bookbinding application 104. To manage a book file by the document management server 1201, the book file is saved in a database 1211 of the document management server 1201 instead of or in addition to the local HD of a client PC. Save and read of a book file between the bookbinding application 104 and the document management server 1201 are done via the DS client 108 and a DS core 1212.

The print central control server 1202 manages printing of a book file stored in the client document management system 1200 or document management server 1202. A print request from the client is transmitted to a DOMS WG server module 1221 of the print central control server 1202 via the DOMS driver 109 and DOMS print service module 110. To print by the printer of the client, the print central control server 1202 transfers electronic document data to the electronic document de-spooler 105 via the DOMS print service module 110 of the client. To print using the printer 1204 of the print server 1203, the print central control server 1202 transmits electronic document data to a DOMS print service module 1231 of the print server 1203, whereby the document data is printed via a spooler 1232 and a driver 1233. For example, the print central control server executes security check on the qualification of a user who has issued a print request for a saved book file, or saves the printing process log. In this fashion, the document processing system can be implemented as both a stand-along system and a client-server system.

<Example of Editing Operation of Document Processing System According to First Embodiment>

FIG. 9 shows the operation window of the bookbinding application 104. The bookbinding application can set the function of a printing apparatus such as stapling, in addition to editing such as a change of the page order of a document, copying, and delete. The bookbinding application can cause a designated printing apparatus to print. A tree view representing a document structure is displayed in the left region of FIG. 9. A document is formed from a set of chapters, and each chapter is formed from a set of document pages. The print preview of each page is displayed in the right region of FIG. 9.

<Example of Attribute Setting of Document Processing System According to First Embodiment>

FIG. 14 shows a "Detailed Setting for Document" window 1400 of the bookbinding application 104. The setting window of FIG. 14 exists for each of folders shown in FIG. 41 (to be described later), enables settings for each folder, and can also be used to change the settings of a given folder. By changing the settings of a folder, folders before and after change can be utilized as different folders.

This window allows displaying/setting the "document setting information 403". This window is activated from the "Detailed Setting for Document" menu of a Print Form menu in the application operation window of FIG. 9 or a "Detailed Setting for Document" button on the tool bar. The "Detailed Setting for Document" window is a window for setting attributes which influence a whole document. This window is formed from four sheets Page Setup, Decoration, Edit, and Paper Source. FIG. 14 shows a state in which the Page Setup sheet is displayed. In the Page Setup sheet, settings mainly concerning the layout can be done. Settings such as the paper size, orientation, and N-page printing can be designated. This window has check box controls 1401 and 1402 for the zoom. The zoom means the resizing ratio of a document page, as described above.

FIG. 15 shows a "Detailed Setting for Chapter" window 1500 of the bookbinding application 104. The setting window of FIG. 15 is used to change the settings of a chapter generated by the bookbinding application.

Figure 16:
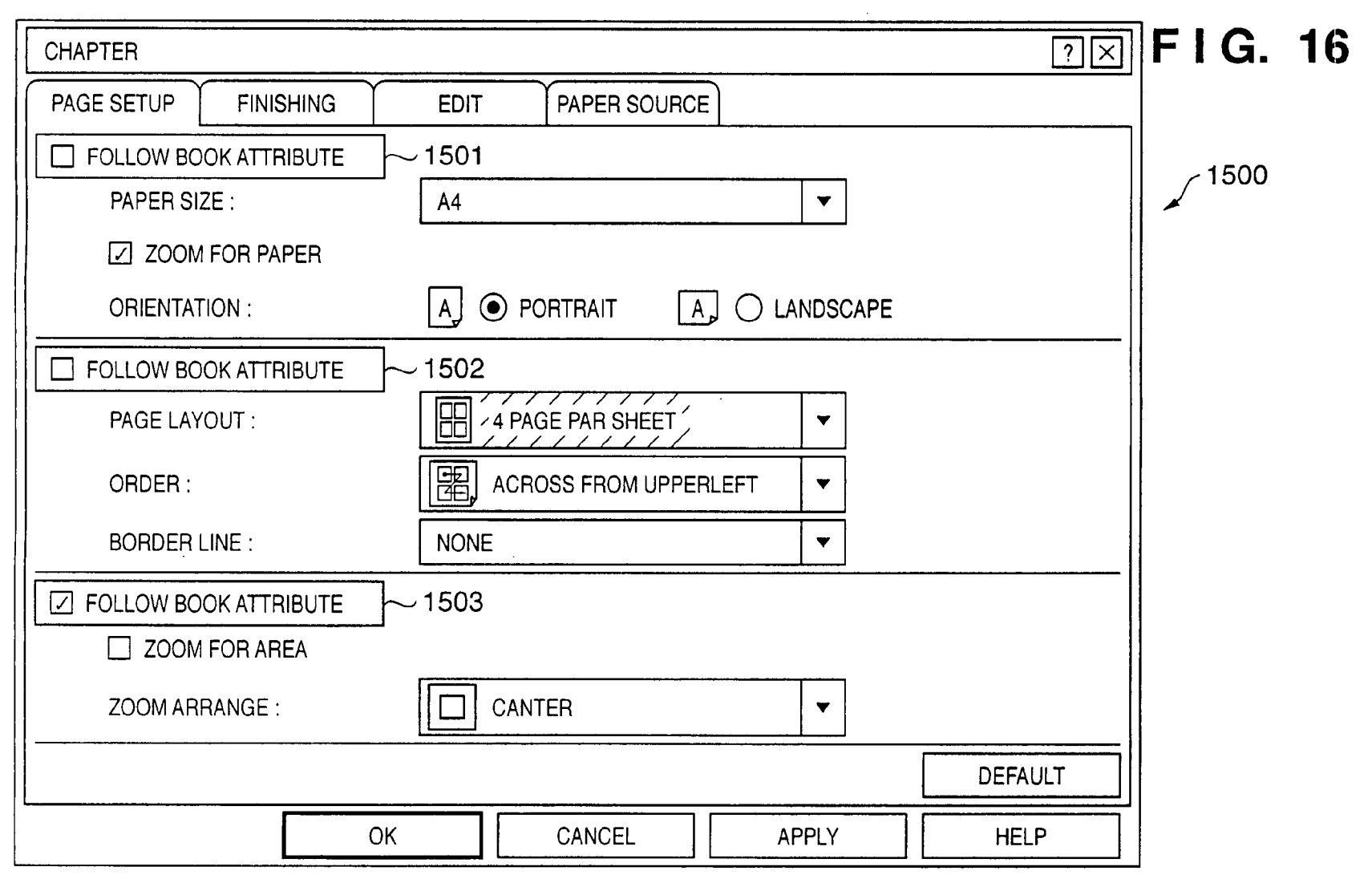

This window allows displaying/setting the "chapter setting information 407" in FIG. 3. This window is activated from the "Detailed Setting for Chapter" menu of a Print Form menu in the application operation window of FIG. 9 or a "Detailed Setting for Chapter" button on the tool bar. The "Detailed Setting for Chapter" window is a window for setting attributes unique to a chapter. This window is formed from four sheets Page Setup, Decoration, Edit, and Paper Source. FIG. 15 shows a state in which the Page Setup sheet is displayed. In the Page Setup sheet, settings mainly concerning a layout unique to each chapter can be done. Settings such as the paper size, orientation, and Nup page printing can be designated. "Follow Book Attribute" check box controls 1501, 1502, and 1503 are arranged for repetitive setting items between "Detailed Setting for Document" and "Detailed Setting for Chapter". For an item group whose check box is checked, the setting values of the document (book) are applied to the chapter. FIG. 16 shows a case in which the check box is not checked. Settings unique to a chapter can be classified into two types: setting items held by only a chapter, and setting items whose setting values different from those of the document in the upper layer are held in the chapter layer.

FIG. 16 shows a state in which the check box controls 1501 and 1502 of "Detailed Setting for Chapter" in FIG. 15 are not checked. In this case, even if the whole document uses A3 paper, pages which constitute this chapter use A4 paper. As for the layout, even if the document designates 1 page per sheet, the chapter designates a layout of 4 pages per sheet (4UP). "MS Arrange" is checked, and the setting values of the document in the upper layer are employed as those of the chapter.

Figure 17:
FIG. 17 is a view showing an example of a dialog window for setting a page serving as the lowermost layer of the data structure.

FIG. 17 shows a "Detailed Setting for Page" window 1700 of the bookbinding application 104.

Figure 18:
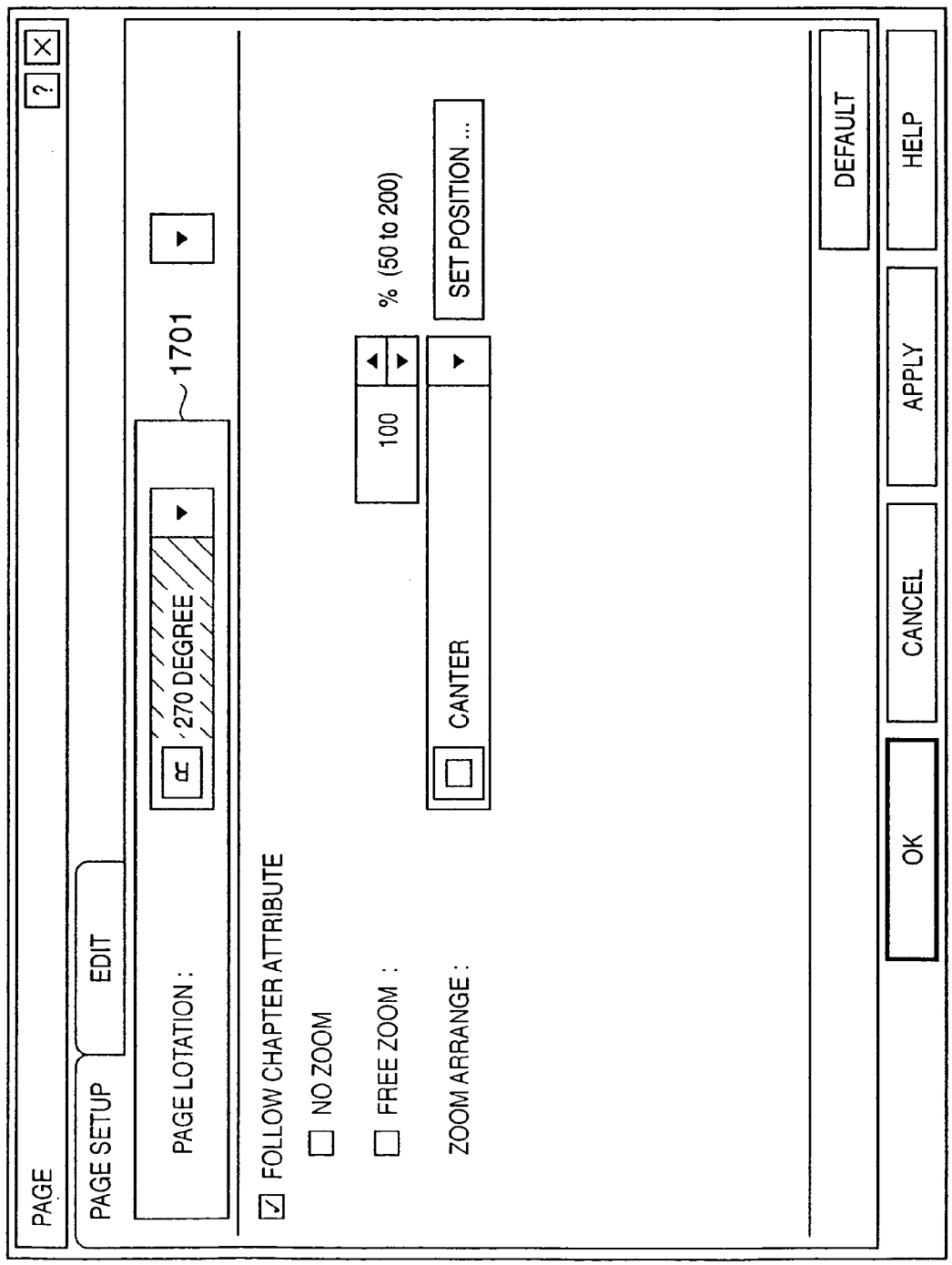
FIG. 18 is a view showing an example of changing a setting value in the dialog window of FIG. 17.

This window allows displaying/setting the "page setting information 411". This window is activated from the "Detailed Setting for Page" menu of the Print Form menu in the application operation window of FIG. 9 or a "Detailed Setting for Page" button on the tool bar. The "Detailed Setting for Page" window is a window for setting attributes unique to each page. This window is formed from two sheets Page Setup and Edit. FIG. 17 shows a state in which the Page Setup sheet is displayed. In the Page Setup sheet, settings mainly concerning a layout unique to each page can be done, and settings such as the rotation angle and enlargement/reduction ratio in laying out a document page can be designated. A "Follow Chapter Attribute" check box control 1701 is arranged for repetitive setting items between "Detailed Setting for Chapter" and "Detailed Setting for Page". For an item whose check box is checked, the setting value of the chapter is applied to the page. FIG. 18 shows a case in which the check box is not checked.

FIG. 18 shows a state in which Page Rotation setting is changed in "Detailed Setting for Page" of FIG. 17. The control 1701 exhibits a setting of rotating and arranging a document page with the upper portion of the page oriented left in laying out the document page. Since this item is not provided with any "Follow Chapter Attribute" check box and is not a repetitive setting item in the chapter and document, the setting displayed in this window is always adopted as the setting value of the page. When the control 1701 is set, for example, the "Arrange" item is a repetitive setting item in the chapter, and the setting value of the chapter is used as that of the page. When "Follow Book Attribute" is checked in the "Arrange" item of the chapter, the setting value of the document in the upper layer is used as that of the chapter, and thus the setting value of the document is used as that of the page. When the "Arrange" item is not checked in the chapter, the chapter has a unique setting value, and the setting value unique to the chapter is used as the setting value of the page.

Check box control information set in the setting window may be held in a dedicated region, but is desirably held as one attribute in the setting information shown in FIG. 3. In this case, regions for holding check box control information are added to the lists of FIGS. 5 and 6.

<Example of Document Editing Display of Document Processing System According to First Embodiment>

Figure 19:
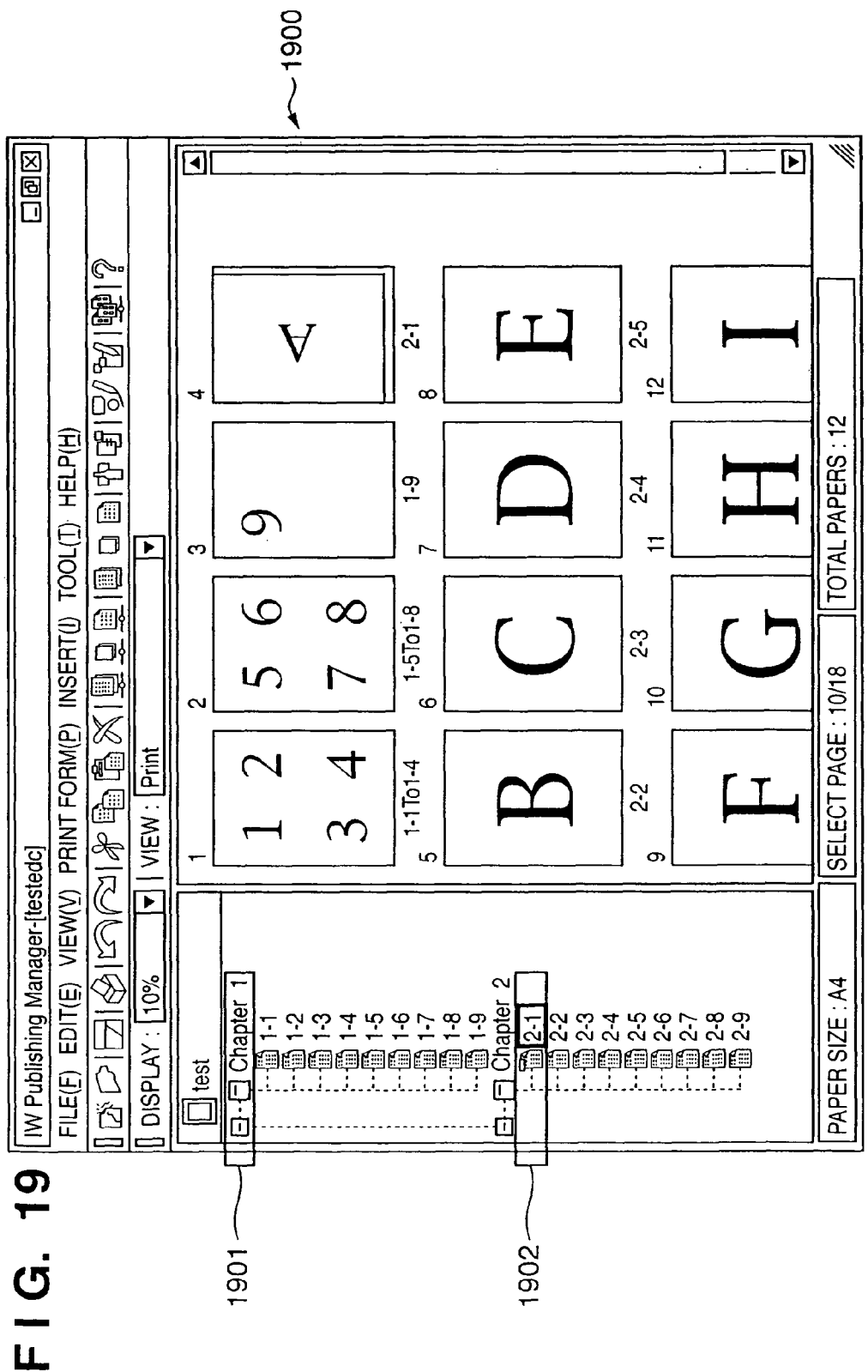
FIG. 19 is a view showing an example of display when settings unique to a chapter and page are done.

FIG. 19 shows an example of the window 1900 of the display format of the application when a setting item which is repeated in an upper layer does not use a setting value in the upper layer, i.e., when the check box control 1501 or 1701 is not checked.

In the example of FIG. 19, a document is formed from two chapters, and each chapter has document data of nine pages. FIG. 19 shows a display example when the layout of the first chapter is 4UP (to be also referred to as 4in1 hereinafter) and rotation is designated for the first page of the second chapter (10th page of the whole document). In the right preview, four document pages are laid out on each of the first to third pages. On the fourth page, a character "A" is rotated. A display format for settings unique to a chapter and page at a tree view will be explained. An icon 1901 corresponding to the first chapter changes to exhibit that this chapter has a unique setting. An icon 1902 corresponding to the first page of the second chapter also changes to exhibit that this page has a special setting.

It should be noted that pages in each chapter, e.g., four logical pages contained in a 4UP page do not care the type of application such as a wordprocessing application or spreadsheet application. In other words, each page which forms a document in the first embodiment may be created by any application, and pages formed by different applications may coexist.

As described above, the first embodiment prepares a program having the configuration as shown in FIG. 1. A document in which pages based on files created by respective applications coexist can be created, and the layout and the like can be freely changed regardless of the type and manufacturer of an application program which creates each page forming a "document" described in the first embodiment. This can simplify work such as reassignment of page numbers in printing.

In the above configuration, however, various application data files which form a "document" must be stored in the external memory 211. Also, when one "document" is formed from two chapters, the first chapter is made up of pages created by a wordprocessing application, and the second chapter is made up of pages created by a spreadsheet application, these two applications must be installed in the PC 100.

In some cases, pages which form one book may be created by a plurality of users with their PCs. For example, only a wordprocessing application is installed in a PC (to be referred to as a PC-A) used by a user who takes charge of the first chapter, whereas only a spreadsheet application is installed in a PC (to be referred to as a PC-B) used by a user who takes charges of the second chapter. It is difficult for the first embodiment to cope with this situation. Installation of the same application program in all PCs requires a high licensing fee. The first embodiment also solves this problem, and the solution will be explained below.

<Automatic Process Upon Storing Image Data to Object>

Figure 40:
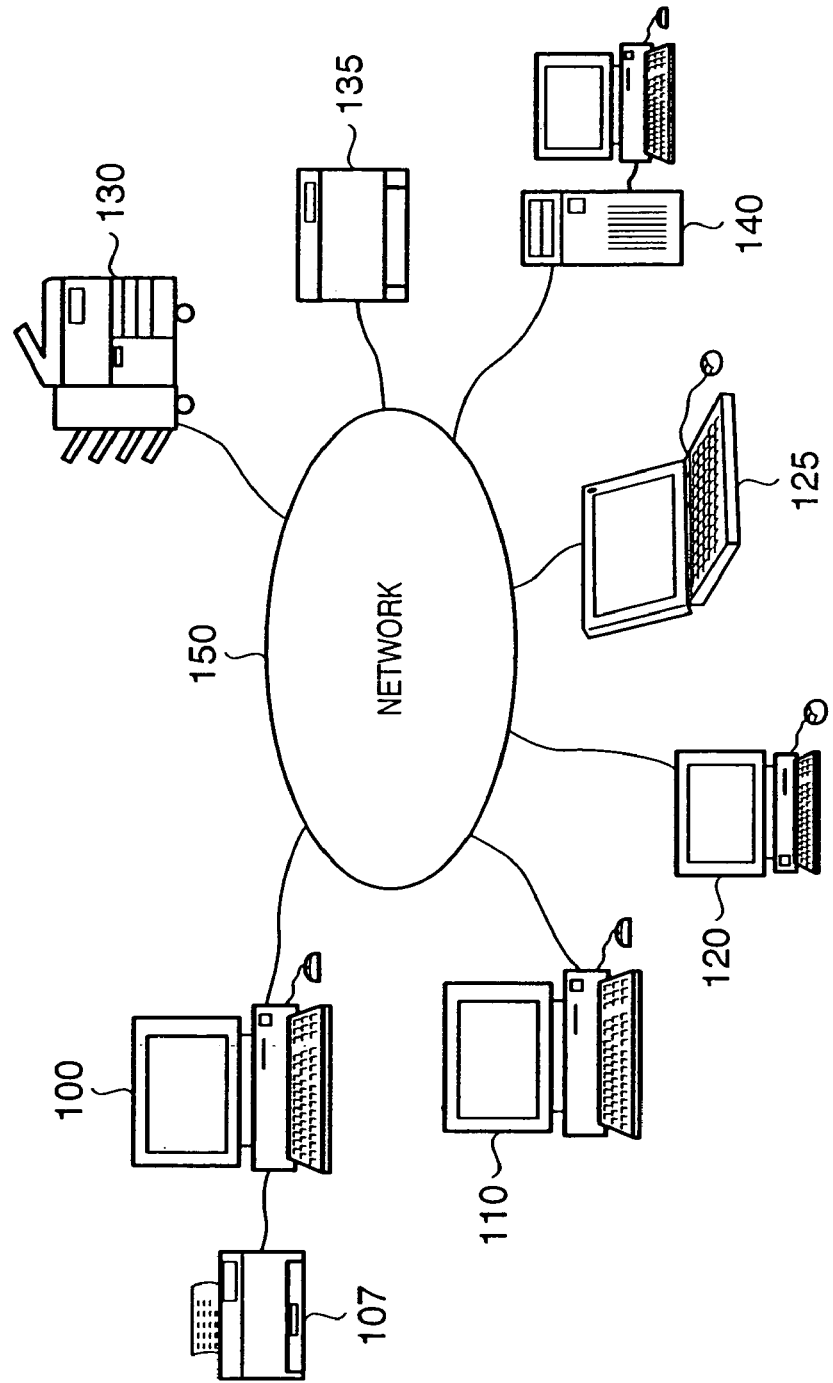
FIG. 40 is a view showing a network configuration.

The following description assumes that the PC 100 according to the first embodiment is connected to a network and the network system has a configuration as shown in FIG. 40.

FIG. 40 is a view showing the network configuration according to the first embodiment. In FIG. 40, reference numerals 110, 120, and 125 denote general-purpose information processing apparatuses such as personal computers (to be simply referred to as PCs hereinafter) which have the same arrangement as that of the PC 100 described in the first embodiment. Reference numeral 130 denotes a multifunction apparatus having a copying function, network scan function, and network printer function. Reference numeral 140 denotes a file server; and 135, a network printer. These apparatuses are connected to a network 150 serving as a communication line, and can communicate with each other. FIG. 40 shows an example, the numbers of PCs, multifunction apparatuses, printers, and file servers are not limited, and other devices may exist on the network.

Since the multifunction apparatus 130 has the network scanner function, as described above, the apparatus 130 has a function of, when a document is scanned and a desired destination on the network (resource address on the network) is designated, converting the scanned image into a file of a predetermined format (PDF, MTIFF, or the like) and transmitting the file. The multifunction apparatus 130 is well known, and for example, iR series products are available from Canon. A document scanned by the multifunction apparatus 130 can be provided as a printout by the printers 107 and 135 and the multifunction apparatus 130 in accordance with a print instruction from a general application executed in the PCs 100, 110, 120, and 125, and the like.

Advantages of the first embodiment will be further explained on the basis of the above configuration of the network system.

In the following description, the PC 100 will be exemplified. The network must be equipped with one or more shared folders, but for convenience, a plurality of shared folders are set in the external memory 211 of the PC 100. That is, the PC 100 also functions as a file server. In the following description, a shared folder will be exemplified, but the embodiment is applicable to an object to which imported data can be stored, and is not limited to the shared folder.

Further, a program which supervises storage of data into (one or more) shared folders runs in the PC 100. When the file configuration is determined to have changed, particularly when a file is determined to be newly stored, a process set for each shared folder is executed to import the file into the bookbinding application.

That is, a shared folder in a general filer server merely receives, saves, and transmits a file in accordance with a request from a network. To the contrary, the PC 100 according to the first embodiment automatically executes an additional process for a file stored in the shared folder. This folder is called a hot folder in the first embodiment in order to discriminate it from a general shared folder. The hot folder is a shared folder which executes a predetermined process when a data file is stored in the folder. The shared folder itself suffices to function as a file server, which is well known. In addition to this, the hot folder must comprise a function of periodically checking the state of a data folder in the shared folder, and performing a process corresponding to a state change. This supervisory program will be called a hot folder program. The hot folder program is provided as a partial program which forms the bookbinding application 104. Various conditions set in the hot folder are stored and held in the external memory 211.

Figure 41:
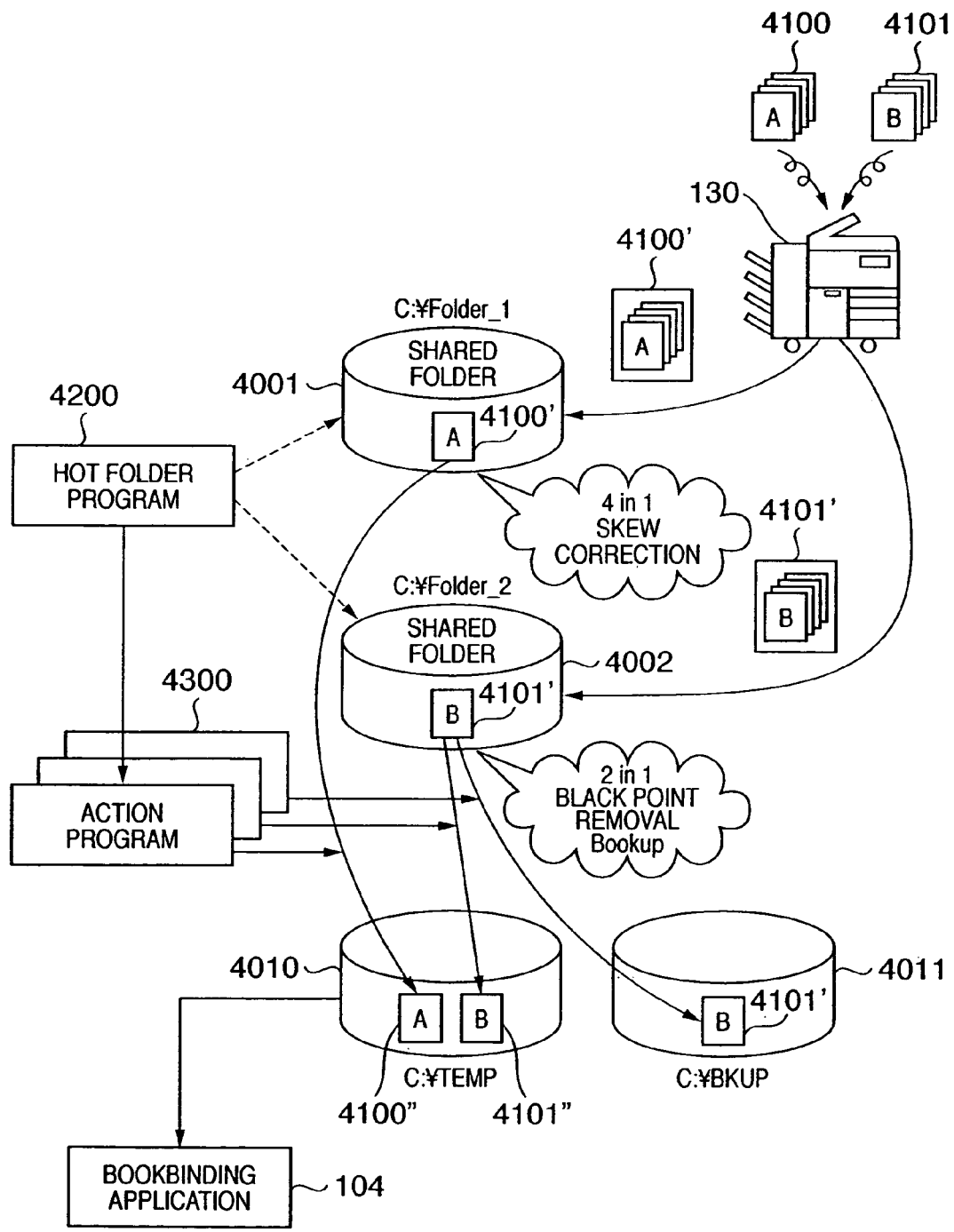
FIG. 41 is a view for explaining the function of the hot folder according to the embodiment.

FIG. 41 is a view schematically showing the flow of a data file and the role of each program when a hot folder according to the first embodiment is adopted.

In FIG. 41, reference numerals 4001 and 4002 denote hot folders; 4010, a temporary folder used to transfer a file to the bookbinding application 104; and 4011, a backup folder. These folders are ensured in the external memory 211 of the PC 100. The hot folders 4001 and 4002 can be set via the setting window shown in FIG. 14, and a plurality of folders (first folder, second folder, . . . ) having different settings are discriminated and displayed.

The number of set hot folders is not limited and can be assigned different attributes, details of which will be apparent from the following description. In FIG. 41, the hot folder 4001 is set so that pages in a stored file are laid out in 4in1 (4UP) and skew correction is performed. The hot folder 4002 is set so that 2in1, black point removal, creation of a backup, and the like are performed. Note that skew correction is rotation correction when document feeding is abnormal in scanning a document, and a document is skewed and scanned. Black point removal is a process of removing an isolated black dot appearing as noise in a scanned image.

In FIG. 41, a document bundle 4100 is set on the multifunction apparatus 130 on the network and scanned by designating the hot folder 4001 as a transfer destination, and an image format of a multi-page type (including a plurality of pages) such as PDF or MTiFF is designated as the data format. The image of each page of the scanned document bundle 4100 is stored as one file 4100' in the hot folder 4001. Similarly, when a document bundle 4101 is set and scanned by designating the hot folder 4002 as a transfer destination, the image of each page is stored as a file 4101' in the hot folder 4002.

A hot folder program 4200 supervises whether new files are stored in the hot folders 4001 and 4002. If the hot folder program 4200 determines that new files are stored, the hot folder program 4200 executes an action program 4300 in order to perform processes set in the hot folders 4001 and 4002, and stores, in the temporary folder 4010, data files 4100" and 4101" interpretable by the bookbinding application 104. For example, 4in1 (4UP), skew correction, and the like are set in the hot folder 4001. After skew correction is done, the 4in1 attribute is generated, and the result is stored in the temporary folder 4010. Also, 2in1, black point removal, and backup are set in the hot folder 4002, and a copy of the file 4101' stored in the hot folder 4002 is stored in the backup folder 4011. Then, the black point removal process is performed, and the 2in1 (2UP) attribute is generated and stored in the temporary folder 4010.

As a result, the temporary directory stores a file importable to the bookbinding application 104, and the bookbinding application 104 adds the image of each page in the file as a new book, or a chapter containing a page or a page to an existing book.

Attributes set in the hot folder include the above-mentioned attributes which can be set in a book, chapter, and page. The above attributes are merely an example. The action program is executed on the basis of attributes set in a hot folder, and settable attributes are given priorities in advance. For this reason, for example, the skew correction process is performed for the hot folder 4001 in FIG. 41 prior to the 4in1 process.

When a file is stored in a hot folder, the attributes of the file are converted into ones set in the hot folder, and then the file can be imported to the bookbinding application. This can eliminate the labor of setting the attributes of a book, chapter, and page by the bookbinding application.

The outline of the process using the hot folder according to the first embodiment has been described, and details of the process will be explained below.

<Description of Hot Folder Program>

Figure 20:
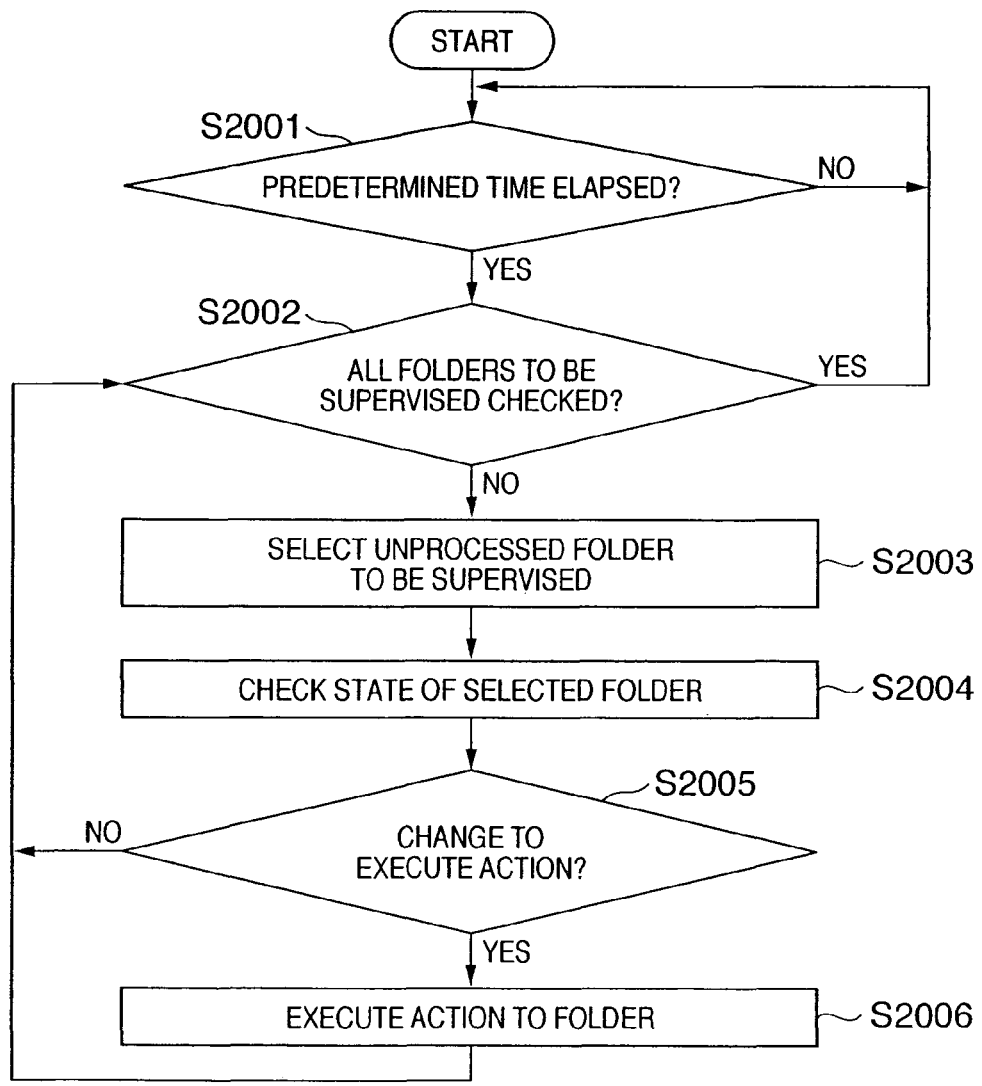
FIG. 20 is a flowchart showing the process sequence of an entire hot folder program according to the embodiment.

FIG. 20 is a flowchart showing the process sequence of the hot folder program 4200.

In step S2001, it is determined whether a predetermined period has elapsed. If the hot folder program 4200 can receive from the OS a notification that the state of the folder has changed, determination may be based on the notification instead of the predetermined period. If the OS is Microsoft Windows®, it is popular that the system issues a timer and the hot folder program 4200 receives a timer event from the OS at a predetermined time interval. In the first embodiment, the folder is supervised using the timer. The supervisory time interval can be set by the user, and suffices to be several minutes.

If no predetermined period has elapsed in step S2001, the process just waits until the predetermined time elapses. In other words, the hot folder-program 4200 transfers control to the system until the program 4200 receives the next timer event. If the predetermined period has elapsed in step S2001, i.e., the hot folder program 4200 receives a timer event, the process advances to step S2002. Step S2002 and subsequent steps form a loop for performing a process for all folders to be supervised. If the number of folders to be supervised is one, step S2002 is unnecessary. In the system of the first embodiment, however, many hot folders can be created, and the states of all hot folders are checked using the loop. It is possible to activate a thread and process for each hot folder to be supervised, and independently supervise hot folders. Such variation is not greatly different from the process of FIG. 20 in principle.

In step S2002, it is checked whether all folders to be supervised have been processed, and if a folder to be processed remains, the process advances to step S2003. If all folders to be supervised have been processed, the process returns to step S2001 to wait for the next timer event.

In step S2003, one of unprocessed folders to be supervised is selected. When the user can set the priority of the process to a folder, or priority is internally held, one folder is selected from a list of folders to be supervised in accordance with the priority. When no priority is set, a folder is selected simply from the top of a list of folders to be supervised.

The process advances to step S2004 to check a state change of the folder selected in step S2003. Information on the number of files of the selected folder, the file name, a change of the file size, a change of the file configuration, and the like is acquired using the service function of the OS. The acquired information on the folder state is examined to determine whether a change which takes an action has occurred. When an action is taken upon a change of the file configuration, information on the number of files in the folder, the size of each file, the update date and time, and the access authority which have been examined in response to the previous timer event is held and compared with the currently acquired information.

The process advances to step S2005 to determine whether a change which takes an action has occurred as a result of examination in step S2004, more specifically, whether a new file has been stored. If no change which takes an action has occurred in step S2005, the process returns to step S2002 and advances to the loop for the next folder to be supervised. If a change which takes an action is determined in step S2005 to have occurred, the process advances to step S2006 to execute an action designated for the folder. After the action is executed, the process returns to step S2002 to repeat the loop for the next folder.

<Process Entity of Hot Folder>

In order to execute the above-described hot folder program, an application for receiving a timer event must be executed. Because of easy control, the first embodiment installs the hot folder program as a resident application in addition to the bookbinding application 104. Needless to say, the resident application may be contained in the bookbinding application 104.

Activation methods for the resident application are classified into a type in which the resident application is incorporated as a service of the system and runs at the same time as activation of the OS, a type in which the resident application is automatically activated when the user logs in to the system, and a type in which the user explicitly executes a process. In the first embodiment, the resident application is automatically activated when the user logs in. In Windows®, the hot folder application is automatically activated when the user logs in, by registering the hot folder application in the user's start-up menu. In this case, it is easy to limit access in accordance with the user authority and acquire system information because the application runs in accordance with not the system authority but the authority of each login user.

Figure 21:
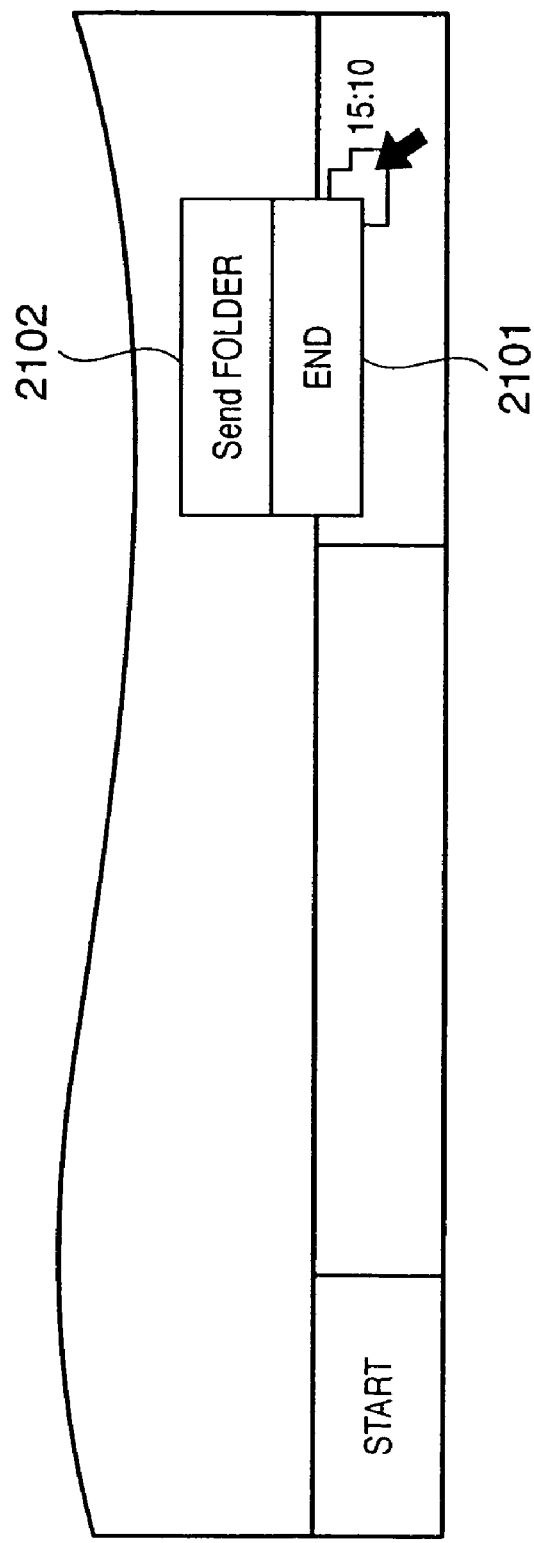
FIG. 21 is a view showing an example of a task bar while the hot folder program runs.

FIG. 21 is a view showing an example of a task bar which is prepared by the OS and displayed on the display window upon executing the resident hot folder program. Reference numeral 2101 in the tray of the task bar denotes an icon representing that the hot folder program according to the first embodiment is in progress. The Mouse® cursor is moved to the icon 2101, the mouse is right-clicked, and then a menu 2102 is displayed. FIG. 21 illustrates a right-clicked state. When "setting of Send folder" in the menu is selected, a GUI (window) for setting an action upon a state change of the folder is opened. When "end" is selected, the resident application ends. After the end, no hot folder program is executed, and the hot folder cannot be supervised. That is, even if the folder state changes, no action occurs. However, the user can also manually activate the resident application.

<Setting of Automatic Import of File by Hot Folder>

Setting of the automatic import function for a file by a hot folder will be explained. In automatic import, it is supervised whether a file has been added to the hot folder. If a file has been added, an action of importing the file to the bookbinding application 104 is taken.

Figure 22:
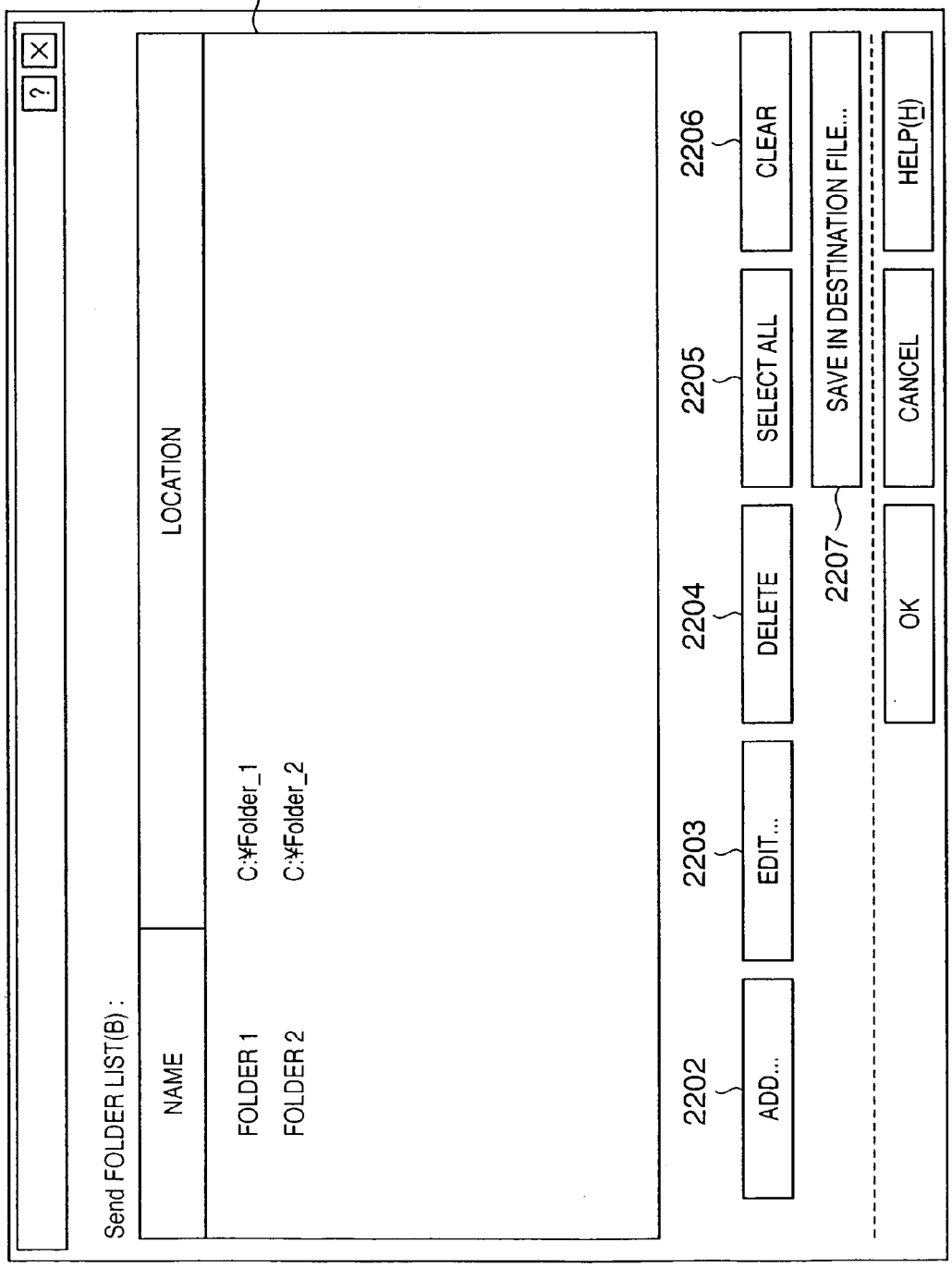
FIG. 22 is a view showing an example of an automatic import setting GUI.

FIG. 22 is a view showing an example of an automatic import setting GUI for a plurality of hot folders. This GUI is displayed when "setting of Send folder" is selected from the right-click menu of the task bar shown in FIG. 21.

A list box 2201 displays a list of folders to be supervised. A folder to be supervised can be given a name of an arbitrary character string in order to facilitate identification.

A button 2202 is used to add a folder to be supervised. When this button is clicked, a GUI for setting a folder name, folder path, and the like is displayed to allow the user to input necessary information. The folder path can be arbitrarily set by the user.

A button 2203 is used to change setting information of a folder selected in the list box 2201. When this button is clicked, a GUI for changing folder settings is displayed.

A button 2204 is used to exclude a folder selected in the list box 2201 from folders to be supervised. When this button is clicked, a currently selected folder is deleted from the list box 2201. The folder is merely excluded from folders to be supervised, and is not deleted from the file system.

A button 2205 is used to select all folders to be supervised which are displayed in the list box 2201.

A button 2206 is used to cancel selection of a folder in the list box 2201. When this button is clicked, selection of all folders is canceled.

As described above, the multifunction apparatus 130 can transmit a scanned document image to a desired network resource. Since it is cumbersome to input characters which form an address one by one through the multifunction apparatus 130, the PC 100 can register a resource (shared folder) subjected to transmission in the multifunction apparatus 130. The multifunction apparatus 130 can determine a transmission destination by only selecting a network resource registered from each PC.

A button 2207 in FIG. 22 is used to register and save information on a selected folder in the multifunction apparatus 130. When this button is clicked, a dialog box for designating a file name is opened, information on a folder selected in the list box 2201 is processed into a data file of a destination information format (format importable by the multifunction apparatus), and the data file is saved with a file name designated by the user.

Figure 23:
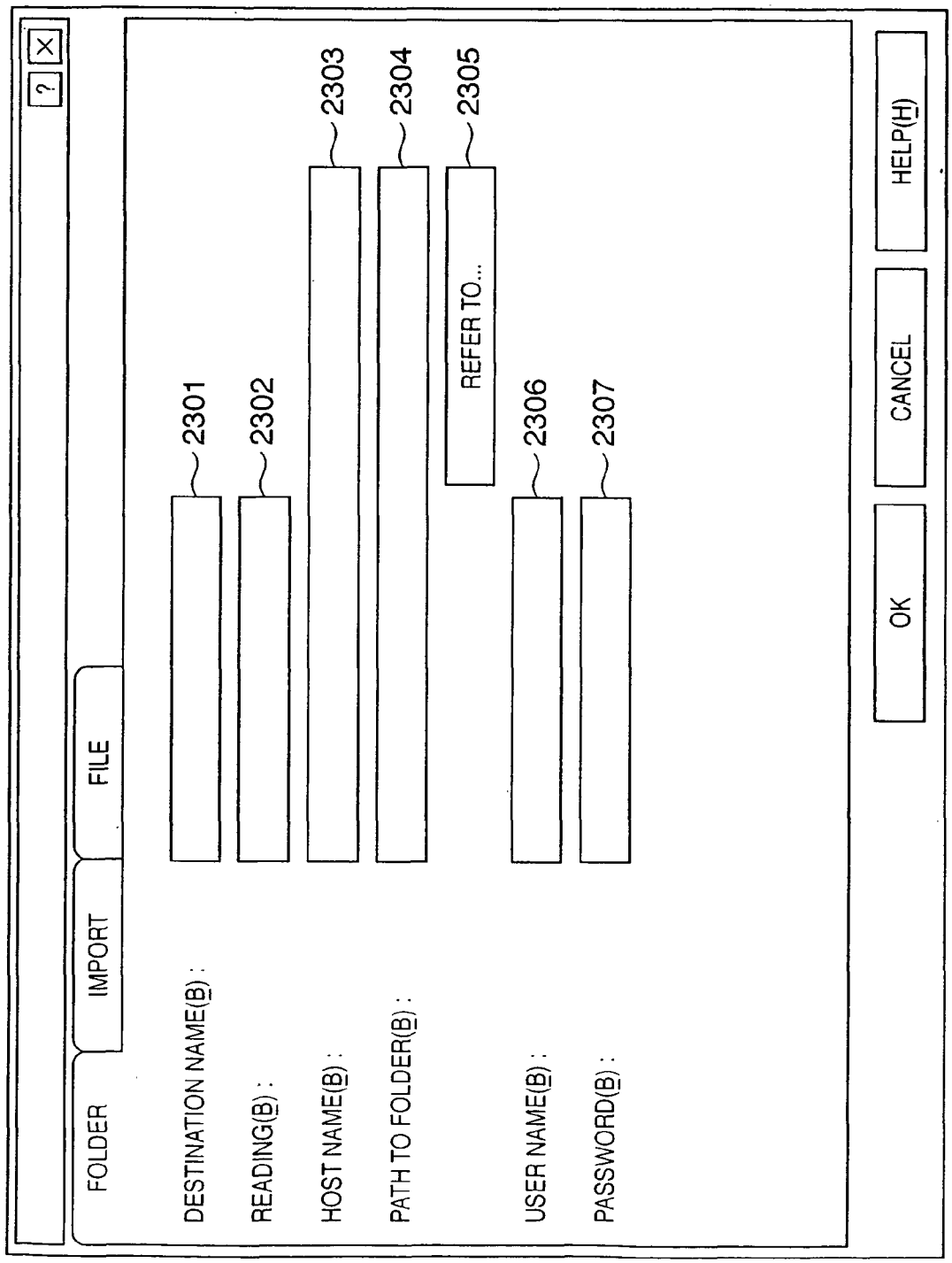
FIG. 23 is a view showing a GUI displayed when a folder to be supervised is added and edited.
Figure 24:
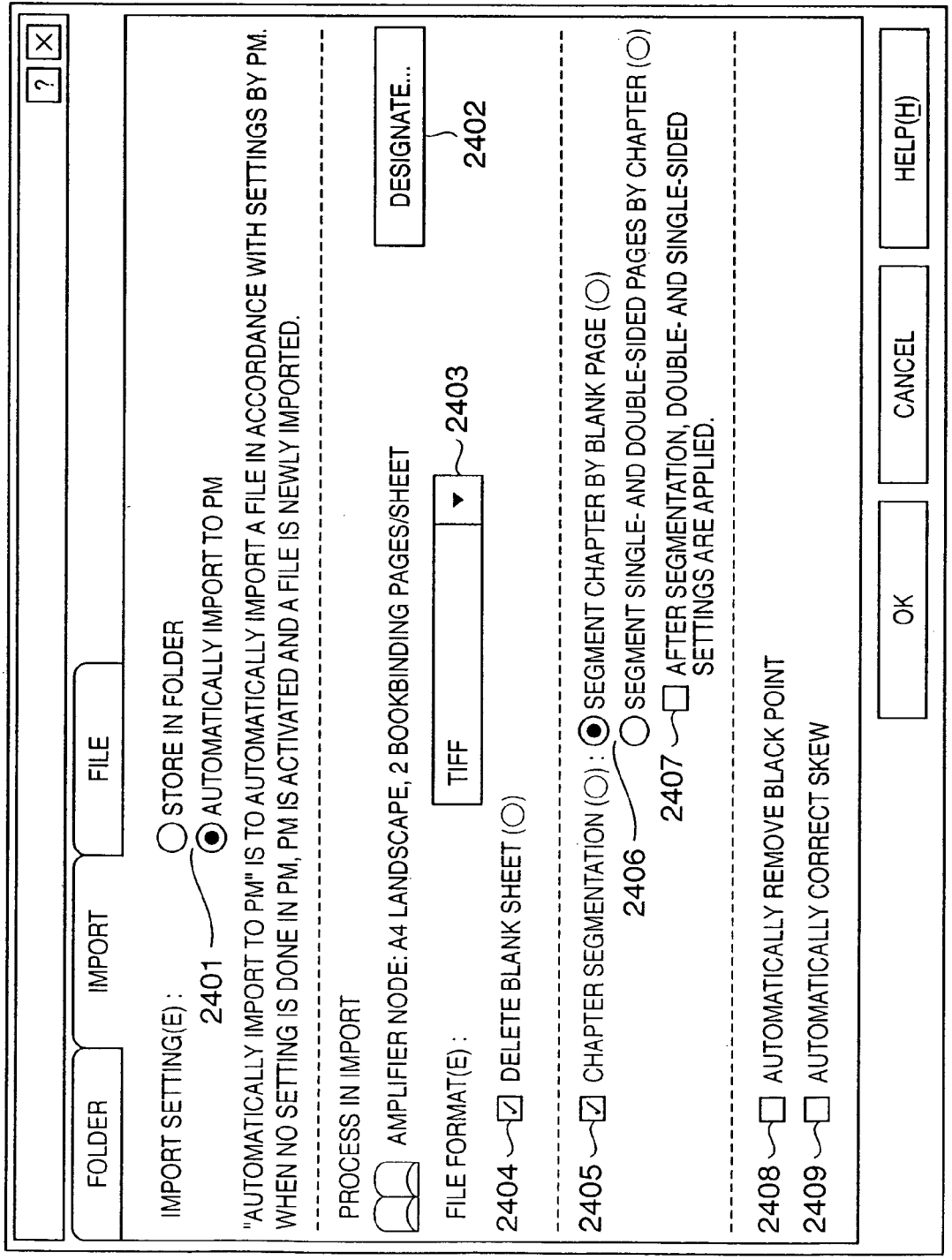
FIG. 24 is a view showing a GUI for designating an action taken by the hot folder program when a file is added to the folder to be supervised.
Figure 25:
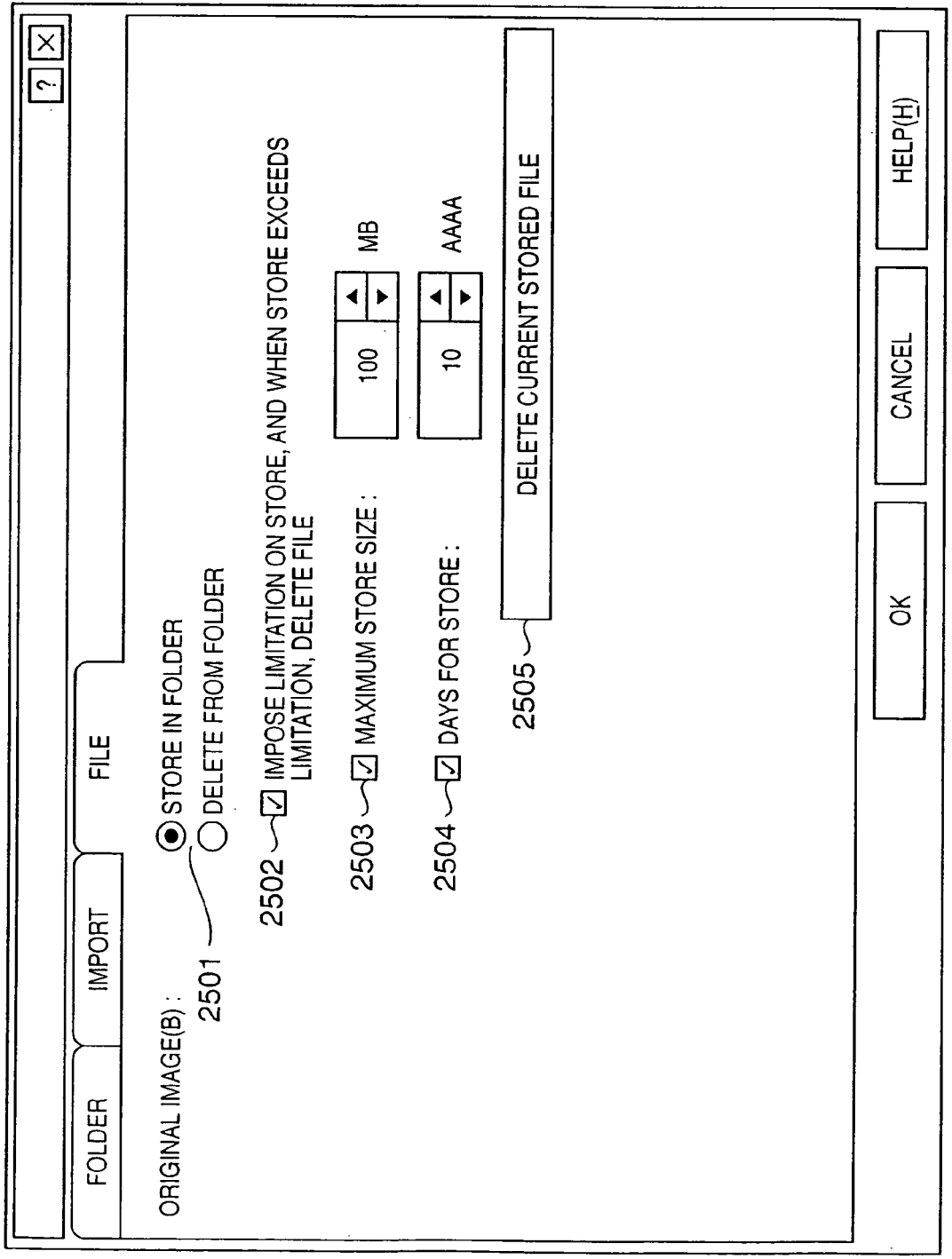
FIG. 25 is a view showing a GUI for designating an action taken by the hot folder program when a file is added to the folder to be supervised.

FIGS. 23 to 25 show examples of GUIs displayed in adding and editing a folder to be supervised. As shown in FIGS. 23 to 25, these GUIs are displayed with tabs, and one of the GUIs in FIGS. 23 to 25 is displayed by selecting a desired tab. The GUI is displayed when the button 2202 or 2203 in FIG. 22 is clicked.

FIG. 23 shows an example of a GUI which allows both setting of a folder to be supervised and input of destination information. Designation of a folder to be supervised requires only the folder path. However, the PC has a function of exporting destination information in order to register the location of a hot folder in the multifunction apparatus (which may be a network scanner), as described above. For this purpose, necessary items must be set in destination information together with the folder path.

Before a detailed description of FIG. 23, an example of the format of destination information is shown in FIG. 26.

The first three lines provide a comment. Items are listed subsequently to one blank line. The left side of a colon represents an item name, and the right side represents an item value.

In FIG. 26, cn represents a destination name; cnread, the reading of the destination; and url, a host PC name (the name of the PC 100 on the network). These three items are subjected to BASE64 encoding. In FIG. 26, path represents the name of a shared folder which stores scanned data; username, the name of a user who is given write authority to the host PC; and pwd, the password of the user. The user name and password are used to obtain access authority to the PC 100 in transmitting scanned data to a PC folder. In FIG. 26, protocol represents a protocol used to transfer a file, and ftp and smb can be selected; and accesscode and obectclass, pieces of reserved information which are determined in accordance with the protocol.

Referring back to FIG. 23, a text box 2301 is a control box for inputting the destination name cn. The destination name is also used as the folder name of the list box 2201 in FIG. 22.

A text box 2302 is a control box for inputting the destination reading cnread. The destination reading cnread is not necessary to supervise a file, but is information necessary to create destination information. A text box 2303 is a control box for inputting the host name url. A text box 2304 is a control box for inputting the name "path" of a path to the folder. A button 2305 is used to open a file dialog. A path designated on the file dialog can be input as a path name in the text box 2304. An existing path need not always be designated because the PC has a function of creating a new folder in the file dialog and a function of creating a path input in the text box 2304.

Text boxes 2306 and 2307 are control boxes for inputting a user name and password. The text boxes 2306 and 2307 are used to log in to the PC 100 from the multifunction apparatus 130. The scanner may fail to write a file unless an authentic user is designated.

When SMB is used as a protocol, a folder must be set as a shared folder and accessible outside the host PC. The system described in the first embodiment has a function of automatically setting a folder to be shared when the folder is newly added and when a designated path name is not set to be shared in changing the path name. When the system runs in the Windows® system, a path designated in the text box 2304 is set to be shared by using the Win32API function. For "shared" setting, all users are given access authority, but if a security problem arises, only a user designated in the text box 2306 may be permitted to share a folder.

FIGS. 24 and 25 show examples of GUIs which designate an action taken by a resident application when a file is added to a folder to be supervised. FIG. 25 illustrates a GUI for settings associated with backup of imported data. FIG. 24 illustrates a GUI for other settings.

Items settable on the GUI in FIG. 24 will be explained. In the first embodiment, settings are classified into four groups, and the GUI is also divided by lines into four categories: from the top, setting of whether to create a new book file or additionally read a file into an existing book file, designation of attributes for an imported file or chapter and the data format of a page which is imported into a document, setting of a function of recognizing a blank and automatically editing a chapter structure, and setting of image correction.

A radio button 2401 is a control button for selecting whether to create a new book file or add a file to an existing file when a file is added to a hot folder. Note that "PM" in FIG. 24 means the bookbinding application 104.

When the scanner is set to create not one file of pages but one file of one page in scanning a plurality of pages, one book file is created from scanned data of a plurality of pages in place of creating one file for one page upon recognizing a scan job. Details of this process will be described later.

A button 2402 is a control button for designating a template to be applied to imported data. The template is data prepared by grouping setting values for a document. The template packs up a plurality of settings for a document such as A4 paper, 2UP, double-sided printing, and staple On. By applying a template, a plurality of settings can be changed with a touch without setting attributes one by one.

For example, a template which sets 2UP, bookbinding printing, and the like can be designated. When another template is selected, 1UP, double-sided printing, stapling, and the like are set. The hot folders 4001 and 4002 in FIG. 41 described above are set in this manner.

In the first embodiment, an attribute value can also be applied as a setting for a chapter in additional read. Details of this process will be described later.

A drop-down list 2403 designates the format of imported data, especially that of a document upon importing image data. The drop-down list 2403 allows selecting TIFF, JPEG, and BMP formats. When no format is particularly designated, data is imported by a method which hardly degrades the image quality in accordance with the image data format, and thus the file size becomes large. If only monochrome text data is scanned, TIFF can be selected to decrease the file size without degrading the image quality by MMR compression. Even for color data, JPEG can be selected to decrease the file size as far as the data is not text or graphic data but photographic data.

A check box 2404 designates whether to delete a blank page. For example, for a double-sided document having only an odd number of pages, the lower surface of the final paper sheet is blank, but the image of the lower surface exists as scanned data. When this check box is set ON, and image data is checked and determined to be blank, the blank document page is deleted and is not imported into a book file.

A check box 2405 is a switch for determining whether to recognize a blank sheet and perform a chapter editing process. By setting this check box ON, a radio button 2406 and check box 2407 can be used.

The radio button 2406 is a switch for a process of simply segmenting a chapter at a portion where a blank page appears, and a process of, when blank pages alternately appear like read of a single-sided document in double-sided printing, grouping a part alternately containing blank pages and creating a chapter. When a single-sided chapter is recognized, whether to designate single-/double-sided printing for a chapter can be designated with the check box 2407.

A check box 2408 designates whether to execute a black point removal process in importing image data.

A check box 2409 designates whether to execute a skew correction process in importing image data.

FIG. 25 illustrates an example of a GUI for settings associated with backup of an imported file.

A radio button 2501 designates whether to delete or back up an imported file.

A check box 2502 is a switch for whether to leave a backed-up file without any limit (copying a file in the backup folder 4011 shown in FIG. 41) or imposing a limit. A check box 2503 is a switch for validating a limit by the file size. When this check box is ON, the maximum of the total file capacity for backup can be designated. If the backup capacity exceeds the maximum, files are deleted in an order from an older file.

A check box 2504 sets the number of days for which a backup file is kept. When this switch is ON, how many days a file is kept for can be designated. The date when a backup file was created and the current date are compared, and when the number of days exceeds the date limit, the file is deleted.

A button 2505 is used to delete all current backup files. When this button is clicked, all backup files in the backup folder 4011 are deleted even if the file size or the number of days has not reached the limit.

In the first embodiment, FIGS. 23 to 25 show tab control operations on one dialog for one hot folder, and a different action can be designated for each hot folder.

Figure 27:
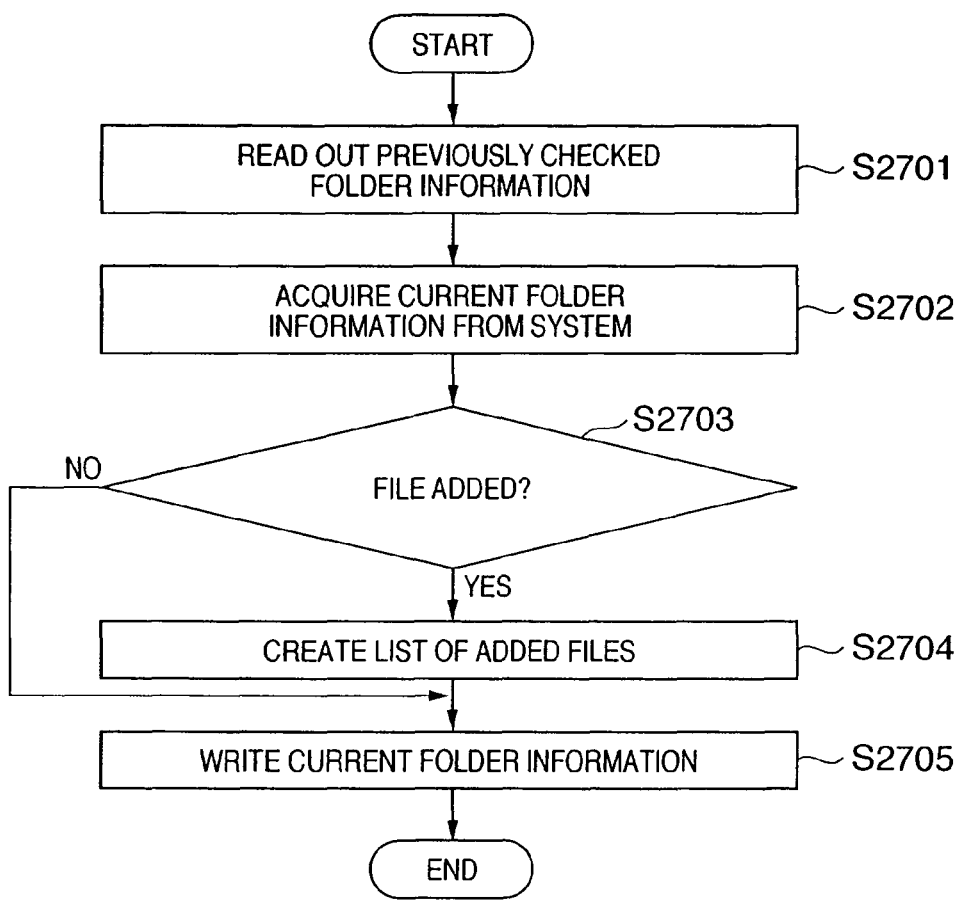
FIG. 27 is a flowchart for explaining details of step S2004 in FIG. 20.

FIG. 27 is a flowchart for explaining details of step S2004 in FIG. 20.

In step S2701, information upon examination in response to the previous timer event is read out. This information may be stored in a RAM or the like.

In step S2702, information on the number of files of a folder to be processed, the file name, and the update date and time is read out from the OS.

In step S2703, the information obtained in step S2701 and the information obtained in step S2702 are compared to determine whether the file configuration in the folder has changed. More specifically, it is checked whether each file in the folder has existed in previous examination, and when a file of the same name has existed, whether the update date and time are later than the previous examination date and time.

If the folder configuration is determined in step S2703 to have changed from the previously examined one, the process advances to step S2704 to create a list of files which have not existed in previous examination and files which have been updated after previous examination. If the file configuration is determined in step S2703 to have not changed, the process advances to step S2705.

In step S2705, the information acquired in step S2702 is written. This information serves as information to be read out in step S2701 in the next examination.

When a file is deleted after import in a file backup process, or a file is moved to another folder, the previously processed file has already been moved or deleted from the folder to be processed, and thus all files in the folder to be processed are simply added to the import file list. In this case, steps S2701 and S2705 are unnecessary.

Note that the import file list means a queue which is registered in correspondence with storage of one or more import files and executes an action in step S2006. One or more files registered in the queue correspond to files whose presence/absence is determined in step S2903 (to be described later).

The import file contains image files of various formats and also image data which is not converted into a file.

Figure 28:
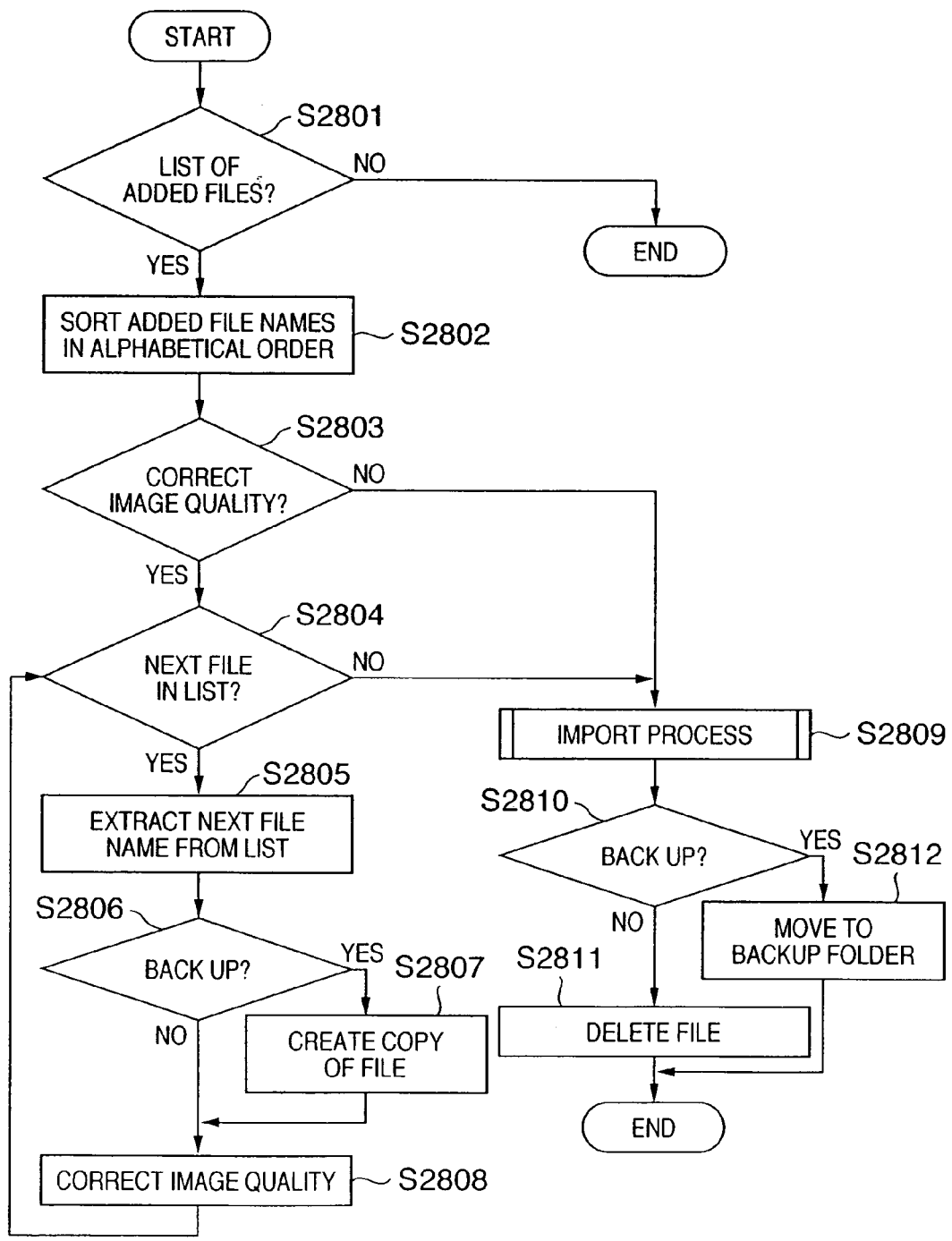
FIG. 28 is a flowchart for explaining details of the determination process in step S2005 of FIG. 20 and the pre-process of an action to a folder in step S2006.

FIG. 28 is a flowchart for explaining details of the determination process in step S2005 of FIG. 20 and the pre-process of an action to a folder in step S2006. A description of step S2006 is long, and thus step S2006 will be explained in two processes: a file process before import and an editing process after import.

In step S2801, it is determined whether a file list created in step S2704 of FIG. 27 is blank. If the file list is blank, the process ends. If the file list is not blank, the process advances to step S2802 to sort files in the list in an order of file name.

In step S2803, it is checked whether image quality correction in import has been set for a hot folder of interest. This equals determination of whether the check box 2408 or 2409 shown in FIG. 24 is checked. To correct the image quality, the process advances to step S2804 to copy each file registered in the file list to the temporary folder of the file and perform the image quality correction process for the copy. If the image quality need not be corrected, the process advances to step S2809 to perform an import process.

Steps S2804 to S2808 describe a loop process of correcting the image quality of each file in the file list.

In step S2804, it is determined whether an unprocessed file remains by advancing the process sequentially from the top of the list. If the image quality correction process has ended for all files in the file list, the process advances to step S2809; if a file which has not undergone the image quality correction process remains, to step S2805.

In step S2805, the names of unprocessed files are extracted sequentially from the top of the file list, and subjected to processes in step S2806 and subsequent steps.

In step S2806, it is determined whether file backup has been set. Backup is set when the user selects "store in folder" with the radio button 2501. In this case, since scanned data is lost by correcting the image quality, the file must be copied before the image quality correction process.

If it is determined in step S2806 that backup has been set, the process advances to step S2807 to copy the data file before image quality correction in the backup folder 4011. If it is determined that no backup has been set, the process advances to step S2808.

In step S2808, the image quality is corrected in accordance with the checks in the check boxes 2408 and 2409, and file is created. In this case, processes such as rotation correction when a document is skewed and scanned, and removal of an isolated black point are performed. Skew scanning is determined by detecting the edge of a document and calculating the inclination of a straight line represented by the document edge. When the inclination shifts by a predetermined angle or more, a rotation process is executed to make the edge line coincide with the nearest horizontal or vertical line. A black point is removed by, when the number of black pixels is equal to or smaller than a predetermined number, black pixels are concentrated in a predetermined area, and no other black pixel exists in a predetermined range, determining a black pixel as noise and replacing it with a white pixel.

The page control information 410 (see FIG. 3) of a corresponding page holds the presence of a backup page, the path name of the backup folder 4011, and the file name of a copy in the backup folder 4011. When a page of interest exists in a multi-page file, a page number in the chapter and a page number in the multi-page file coincide with each other because multiple pages are imported as one chapter in the initial stage. Hence, information on a page number in the chapter is also written in the page control information 410 in creating page information.

Step S2809 is an import process. Details of this process will be explained with reference to FIG. 29.

In step S2810, it is determined whether to back up the file after import. If the user sets delete of a file with the radio button 2501, the process advances to step S2811; if NO, to step S2812.

In step S2811, all files in the file list are deleted from the hot folder.

In step S2812, files in the file list are backed up to the backup folder 4011. The process in step S2812 is not performed in the mediacy of the process in step S2807. In the first embodiment, the location of the backup folder 4011 serving as a moving destination is a folder determined in advance by a program, but may be designated by the user. When the user designates the location of the backup folder 4011, the correspondence between a file and its moving destination must be recoded in the setting of the hot folder or the book file for a restore process.

Figure 29:
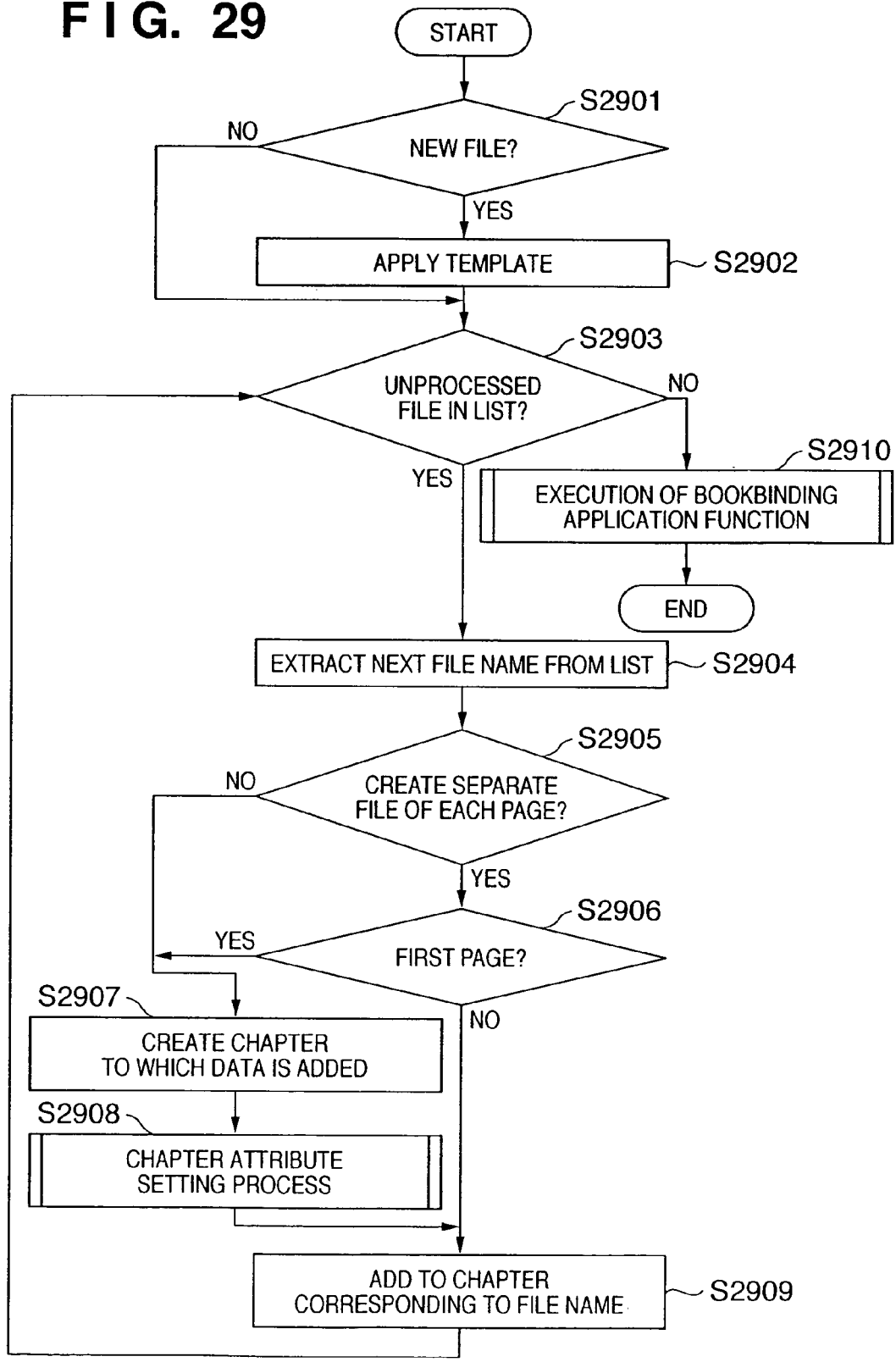
FIG. 29 is a flowchart for explaining details of the post-process of an action to a folder in step S2006 of FIG. 20.

FIG. 29 is a flowchart for explaining details of the post-process of an action to a folder in step S2006 of FIG. 20. This process is executed when storage of an import file (data) into a folder set via the GUIs of FIG. 14 and the like is detected by the PC 100 which creates a book file managed by a hierarchical structure on the basis of the flowchart of FIG. 20. Folders to be detected are assumed to be a plurality of hot folders shown in FIG. 41, and a plurality of hot folders are assumed to have different settings via the setting window of FIG. 14.

Also assume that the bookbinding application subjected to import is activated, and receives an import file list and an action in import.

In step S2901, it is determined whether to add a file to an existing file or form a new file from only import files. If no bookbinding application is activated, or the bookbinding application is activated but no file is opened at present, it is determined to create a new file. If it is determined to create a new file, the process advances to step S2902 to apply a template. The applied template is a template designated with the button 2402 in FIG. 24 in folder settings. The settings of this template are used as the attribute settings of a new book.

If it is determined in step S2901 not to create a new file, the process advances to step S2903.

In step S2903, it is determined whether to end a loop for processing each file in the import file list. If all files in the import file list have been processed, the process advances to step S2910; if an unprocessed file remains, to step S2904. YES in step S2903 corresponds to a case in which an additional import file is stored into any one of folders. Step S2903 is applied also when a new chapter is input via any folder to a book file which has already been created, and when data is input to any folder to a book file newly created in step S2902 and a chapter which reflects the settings of the folder is added.

In step S2904, the names of files to be processed are extracted sequentially from the top of the import file list.

In step S2905, the scanning method of a data file from the multifunction apparatus 130 is determined from the file name extracted in step S2904. As a file creating method in scanning a document of pages, two methods can be selected: scanned data are saved as one file of multi-page PDF or multi-page TIFF (MTIFF), or a separate file (file of a single page) is formed for each page to create files by the number of document pages. When data of pages are created as one file in the multifunction apparatus 130, one file is created with a file name of a format "'year, month, day, hours, minutes, seconds'.'extension'". When a plurality of pages are created, a plurality of files are created with a format "'year, month, day, hours, minutes, seconds'_'page number'.'extension'".

For example, when a 2-page document is scanned with the TIFF format just at 1:11, Jan. 1, 2000, a file "20000101011100.tiff" is created for designation of creating one file, and two files "20000101011100_00001.tiff" and "20000101011100_00002.tiff" are created for designation of creating a plurality of files. If a file name subjected to process has the latter format, it is determined that a document is scanned with a setting of creating a file for each page, and the process advances to step S2906; if NO in step S2905, to step S2907. Accordingly, when document data to be stored into a folder are a plurality of single-page files, these single-page files can be created as one new chapter.

In step S2906, it is determined whether a character string representing "page number" immediately before the extension of the file name is "00001". For "00001", the page is the first page in creating a plurality of pages, and the process advances to step S2907.

In step S2907, a chapter for storing a document page is created. When one scanned data is formed from one file, a file to be imported is not image data transmitted from the scanner, or one scanned data is formed from a plurality of files, a chapter for storing page data is created.

The process advances to step S2908 to execute an attribute setting process for the new chapter created in step S2907. The attribute setting process will be explained in detail.

If the page is determined in step S2906 not to be the first page, a chapter for storing data has already been created in processing the first page, and the process advances to step S2909.

In step S2909, page data are sequentially added to the chapter created in step S2907. The process then returns to step S2903 to execute chapter creation and the page addition process sequentially up to the end of the list.

At this time, information complying with the setting conditions of a hot folder which receives a page to be added is set in the page setting information 411 of the page to be added. For example, to add a page stored in a hot folder having 4UP setting, the page setting information 411 holds 4UP, and the page data link 412 holds information linked to four document images. Other attributes set in the hot folder are also similarly set, and chapter control information, chapter setting information, a page information list, page control information, page setting information, and a page data link shown in FIG. 3 are created. On this stage, a document (book) to which the page belongs has not been set yet.

If chapter creation and the page addition process end for all files in the import file list, the process advances to step S2910 to execute the function of the bookbinding application.

On the GUI in FIG. 24, blank paper deletion and a chapter segmentation process which are designated with the radio button 2406 can be selected as the function of the bookbinding application.

In the first embodiment, processes after the end of data addition are only blank page removal and the chapter segmentation process, but an arbitrary function of the bookbinding application can be executed.

<Creation of New File and Addition to Existing File>

The process of determining whether to add a file to an existing file in step S2901 will be described in detail. The first embodiment will describe not a method of designating a file name but a method of adding a file to a window. This method is advantageous because a window is open and the user can immediately confirm the added state in comparison with a process in which no GUI is opened. When a file is created or added without opening any GUI, the user must designate at least the path name of a file to be newly created or to be added. The path can be designated using a Windows® standard dialog, and a description thereof will be omitted.

Figure 30:
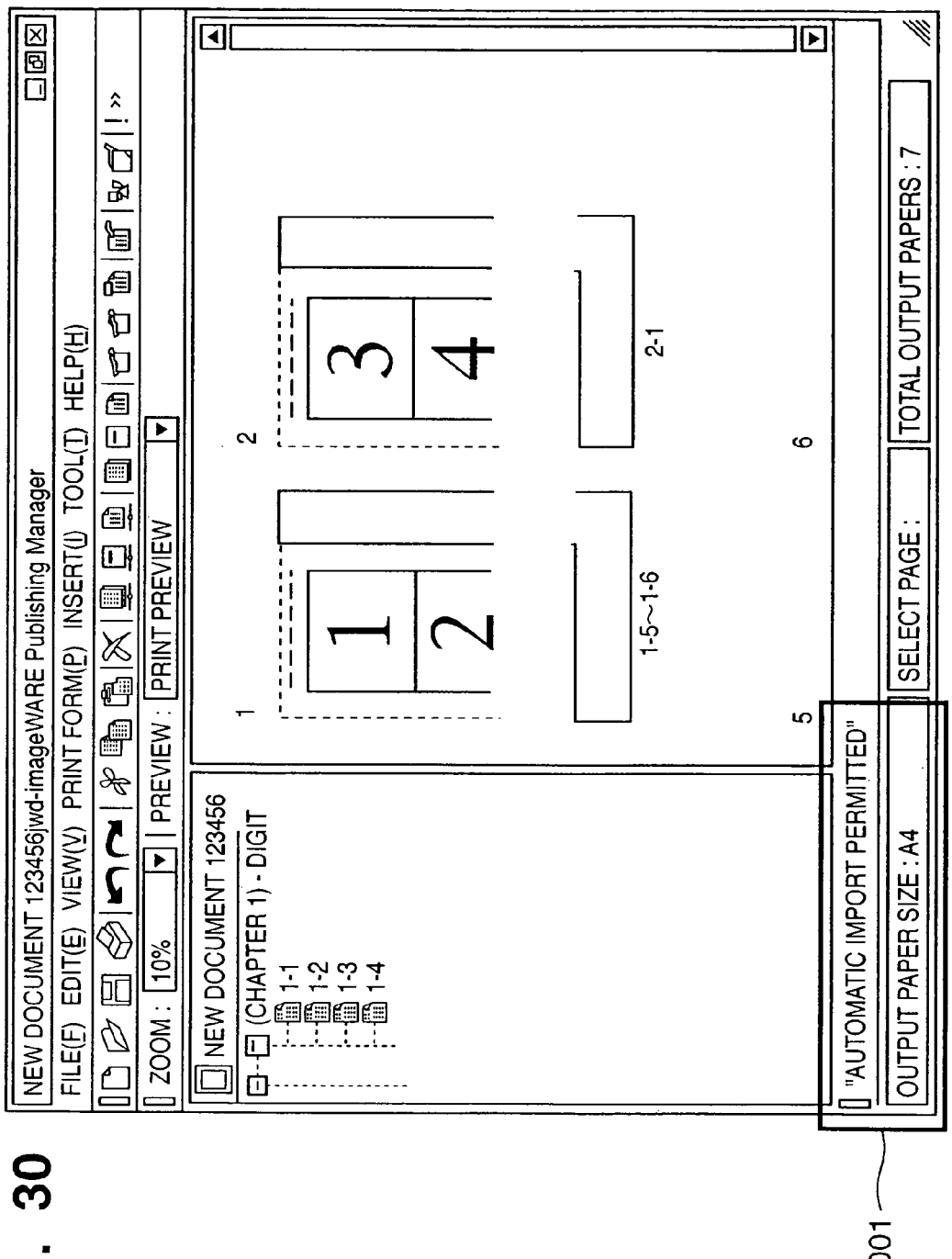
FIG. 30 is a view showing an example of a GUI for setting a mode in which additional read is permitted.

FIG. 30 shows an example of a GUI for setting a mode in which additional read is permitted in the bookbinding application 104.

When a button 3001 in FIG. 30 is clicked, additional read into a book during editing is enabled. When a plurality of windows capable of additional read exist, a window must be selected again. In the first embodiment, to simplify the operation step, the system has only one additional read window. If the button 3001 is clicked in a given bookbinding application window while a plurality of bookbinding application windows are open, the clicked bookbinding application window is preferentially determined as a target to which an electronic document chapter or page generated by the hot folder program is assembled. That is, the process of the flowchart in FIG. 29 described above is executed by the bookbinding application 104 for a window specified by an instruction input via the button 3001.

Figure 31:
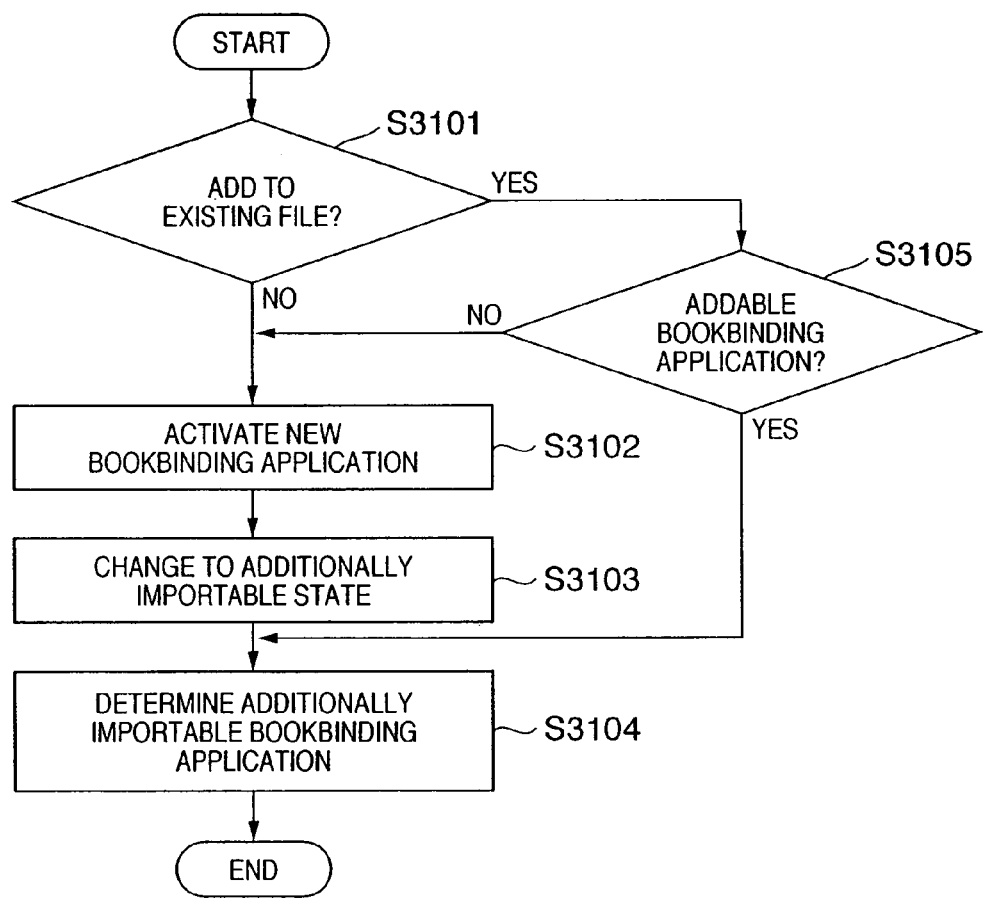
FIG. 31 is a flowchart for explaining a sequence of determining a window to be added by the hot folder program.

FIG. 31 is a flowchart for explaining a sequence of determining a bookbinding application window to be added by the resident application program (hot folder program) of a hot folder.

In step S3101, it is determined whether the folder setting is setting of addition to an existing file. If new creation is set, the process advances to step S3102 to activate a new bookbinding application subjected to addition.

The process then advances to step S3103 to change the bookbinding application activated in step S3102 to an additionally readable setting. In order to implement this function, an interface which permits/inhibits additional read is inserted between the bookbinding application 104 and the resident application (hot folder program).

The process advances to step S3104 to set as an additional import target a bookbinding application window given the additional read setting in step S3103.

If the folder setting is setting of addition to an existing file in step S3101, the process advances to step S3105.

In step S3105, the window handles of running applications are sequentially acquired by using the API of the OS, and each window is inquired of whether permission of additional read of a file is ON. In order to implement this function, an interface which inquires the state of additional read setting is inserted between the bookbinding application and the hot folder program.

If no addable bookbinding application window is found in step S3105, the process is switched to creation of a new file in the first embodiment instead of determining an error. The process advances from step S3105 to step S3102, and merges into the new creation flow.

If an addable bookbinding application window is found in step S3105, the process advances to step S3104 to set the found window as an addition target.

<Attribute Setting to Chapter in Import>

In the first embodiment, attributes are set using a template for a book, as shown in FIG. 24. However, the first embodiment can perform not only designation to a layer "book" but also proper setting of a layer "chapter" different from "book".

Figure 32:
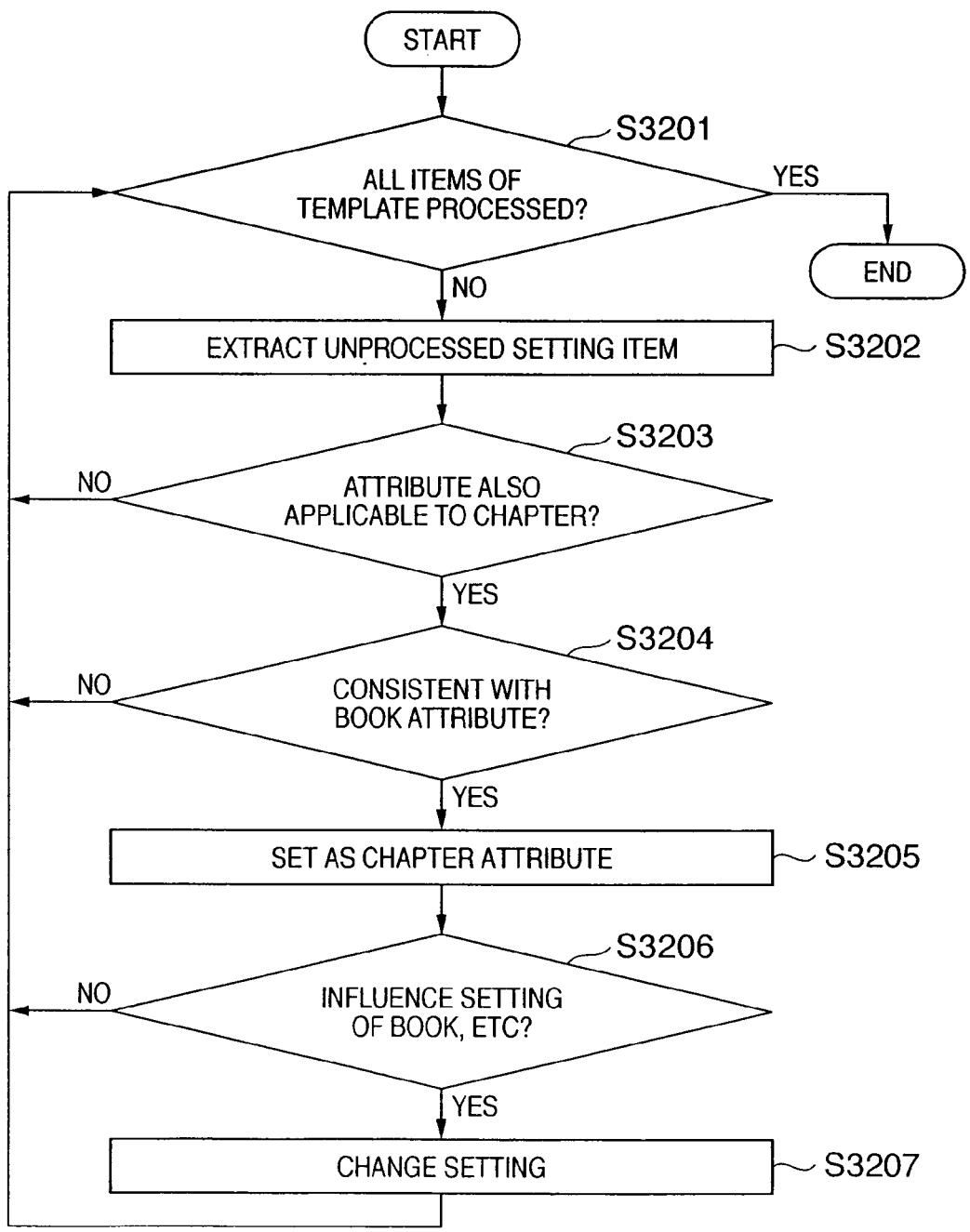
FIG. 32 is a flowchart for explaining details of step S2908 in FIG. 29.

FIG. 32 is a flowchart for explaining details of step S2908 in FIG. 29. FIG. 32 implements a process of employing some of the settings of a folder and setting document data to be added as a chapter when import data is stored into a folder in order to add document data to a book file. The document data is, e.g., chapter data of a book file, and the chapter data contains the attribute settings and page data of the chapter.

Step S3201 is determination of the end of a loop, and it is determined whether all items in the template of a book set via the UI of FIG. 14 have been processed. If all items are determined in step S3201 to have been processed, the process ends. If an unprocessed attribute item is determined in step S3201 to remain, the process advances to step S3202.

An unprocessed setting item is extracted from the template in step S3202, and the process advances to step S3203 to determine whether this item is an attribute item applicable to the chapter. As a determination method, a table which describes whether an item is applicable to the chapter is held, and an item is determined by referring to the table. If the setting item does not exist in chapter attributes shown in FIG. 5, like the printing method setting or index paper setting among book attributes shown in FIGS. 4A and 4B, the setting item cannot be applied to the chapter, and the process returns to step S3201.

If the same setting item such as the paper size or Nup printing designation also exists for the chapter, the process advances to step S3204 to determine whether the attribute is inconsistent with the attribute of the book. For example, when the printing setting of a book is bookbinding printing, the paper size cannot be switched in a chapter, and even if the chapter has this item, the paper size item is determined to be inapplicable. Whether a chapter setting is inconsistent with a book setting is also determined by referring to an internally held table.

If the item is determined in step S3204 not to be inconsistent with the setting of the book, i.e., to be consistent with it, the process advances to step S3205 to set the item as a chapter setting. In this case, when both the book and template have 2UP setting, 2UP may be set for the chapter, or 2UP may not be set because the result is the same for the setting common to the book even if 2UP is not set for the chapter. Control for, when one of the processes is applied or one of the processes is fixed to the system and the setting value is the same as that of an upper layer, designating whether to set this value may be added to the GUI in FIG. 24 so that the user can select the method.

The process advances to step S3206 to determine whether the chapter setting influences the book setting. Assume that one of book attributes is single-sided setting, and the template in the addition process has double-sided setting. In the first embodiment, the book attribute must be double-sided setting in order to switch between single-sided printing and double-sided printing for each chapter. Thus, the book attribute must be changed to double-sided setting, and the settings of all chapters except a chapter to which the template of double-sided setting is applied must be switched to single-sided printing. In this case, the chapter setting is determined to influence book and other settings, and the process advances to step S3207. When the book has 2UP setting and the template has 1UP setting, 1UP is simply applied. In this case, the chapter setting is determined not to influence other settings, and the process returns to step S3201. In step S3207, the settings of the book and chapter are changed, as described above.

The criterion and setting change method in step S3206 also have a table, and determination and a change of the setting are performed in accordance with the contents of the table.

<Replacement with Backup File>

As described above, image quality correction can be automatically applied to a hot folder in file import according to the first embodiment (in the first embodiment, the correction process includes skew correction and black point correction). In some cases, however, the correction parameter is not proper, and a necessary point such as a sonant symbol may be removed by black point removal. For example, characters in a document scanned by the multifunction apparatus 130 are small, and an alphabet "i" or a Japanese sonant symbol may be determined to appear owing to noise and may be removed. In this case, a corresponding page of a book can also be replaced with a page of a file stored in the backup folder 4011.

Replacement with a backup page is achieved by selecting a target page in the bookbinding application and selecting "replace with backup page" (not shown) in a process menu displayed upon right click. Note that the menu item "replace with backup page" is displayed only when a backup page for a target page exists.

Whether a backup page of a target page exists is determined using information which represents the presence of a backup and is stored in the page control information 410 when the hot folder program copies the target page in the backup folder before the image correction process (see the description of FIG. 28).

Figure 33:
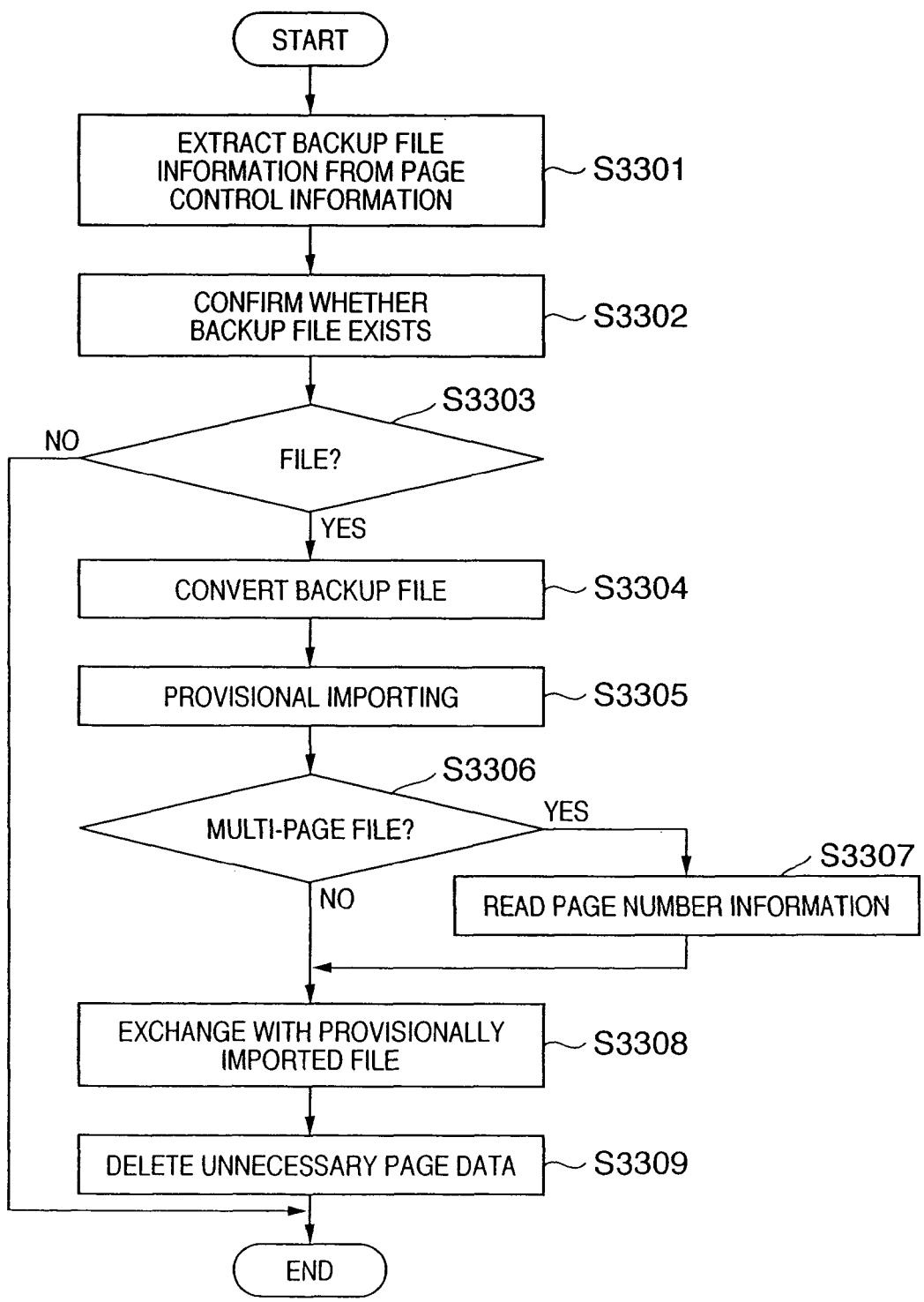
FIG. 33 is a flowchart showing a replacement process with a backup file.

FIG. 33 is a flowchart for explaining the replacement process with a backup file.

In step S3301, the names of a backup folder and file which are written in import are read from the page control information 410 of a page which is designated by the user to be replaced.

The flow advances to step S3302 to confirm whether a target file remains in a path name designated by the backup folder name and file name read in step S3301. If the backup file remains in step S3303, the process advances to step S3304; if NO, an error message is displayed to the user, and the process ends.

If no file exists, it may be additionally determined whether the same data as the file name is contained in another folder such as a Windows® temporary folder.

The backup file is changed into a format importable to the document in step S3304, and the process advances to step S3305 to provisionally import the backup file into the file. When the backup file is a multi-page file and pages can be freely handled, the backup file can be kept unchanged in a state converted in step S3304, and need not be provisionally imported.

In step S3306, it is determined whether the backup file is a multi-page file. This determination can be done on the basis of the number of provisionally imported pages, whether the page control information 410 contains page number information, or the file name of the backup file. If the backup file is determined to be a multi-page file, the process advances to step S3307 to read page number information from the page control information 410.

In step S3308, the provisionally imported file and a page in the target backup file in the replacement-designated backup file are exchanged in the page information list 413. For a multi-page file, a page number is read in step S3307 from provisionally imported pages, and only data corresponding to the page number is exchanged from data of provisionally imported pages.

The process advances to step S3309 to delete the old page data exchanged in step S3308 and for multi-page data, all unreplaced page data.

When a page during editing is replaced with a backup page, a backup file in the backup folder is not deleted. This is because, for a multi-page file, a page replaced with the backup file and an unreplaced page may coexist, and erroneous editing can be coped with when an image is edited in the bookbinding application.

Although not described in detail in the first embodiment, when the user designates replacement of a plurality of pages, the backup file name is checked, and pages using the same backup file are processed at once, reducing the backup file conversion and provisional import process counts.

<Attribute Application Table for Chapter>

In the description of FIG. 32, a table is referred to in applying a book attribute to a chapter. FIG. 34 shows an example of a table referred to when a book attribute is applied to a chapter in import.

Determination (step S3203) of whether an attribute item can also be applied to a chapter uses "applicable to chapter?" in the third column of the table shown in FIG. 34. An item with "○" is applicable, an item with "Δ" is a setting which may be rounded in relation to other settings, and an item with "x" is inapplicable.

The table of FIG. 34 is read into the bookbinding application. When data is read into a folder in order to add an import file (document data) into a book file (document) which has already been read into the bookbinding application, some of the settings of a folder set via the setting window of FIG. 14 are employed as the settings of the import file added as a chapter on the basis of the table of FIG. 34. FIG. 34 provides an example of some of the settings of a folder.

Determination (step S3204) of whether an attribute is inconsistent with a book attribute uses "inconsistency determination" in the fourth column of the table. For the printing method, when the book has "bookbinding printing" setting, it is determined that the attribute cannot be set for the chapter. When the book has single- or double-sided printing setting, the attribute is determined to be applicable.

The criterion and setting change method in step S3206 use "setting change method" in the fifth column of the table.

The chapter attribute setting method can be changed by rewriting the table in accordance with the system specifications.

FIG. 35 is a flowchart for explaining an example of a process when the printing method setting is applied. The flowchart of FIG. 35 corresponds to a more detailed description of processes in steps S3204 to S3208 of FIG. 32 when the item "printing method" in FIG. 34 is exemplified.

In step S3501, a printing method designated by a hot folder is checked. The process advances to step S3502 for single-sided printing, step S3505 for bookbinding printing, and step S3506 for double-sided printing.

In step S3502, the printing method setting currently designated for a book is checked from the document setting information 403. If the printing setting of the book is double-sided printing, the process advances to step S3503; if the printing setting is single-sided or bookbinding printing, to step S3504. In step S3503, single-sided printing is designated as the printing setting of a chapter. With this setting, part of double-sided printing is changed to a printing method which does not use any lower surface. In addition, the single-sided printing part issues a single-sided printing command to the printer, and the printing time can be shortened because the process skips the double-sided printing unit.

If the attribute settings of the book and chapter coincide with each other in single-sided printing or the book exhibits bookbinding printing, no setting is possible in the chapter, and the process ends without doing anything in step S3505.

In step S3505, the setting of the book is preferentially adopted, bookbinding printing cannot be set for the chapter, and the process ends without setting any printing method for the chapter.

In step S3506, the printing method setting of the book is checked. If the printing setting of the book is single-sided printing, the process advances to step S3507; otherwise (double-sided printing or bookbinding printing), to step S3510.

In step S3507, the printing method is set to double-sided printing for only an additionally read chapter and single-sided printing for other chapters. In the first embodiment, the printing method cannot be changed to double-sided printing for a chapter when the setting of a book is single-sided printing. The printing method must be set to double-sided printing for a book, and changed to single-sided printing for a chapter requiring single-sided printing, and double-sided printing for a chapter requiring double-sided printing.

For this reason, in step S3507, the printing setting of the book is changed to double-sided printing. In this case, the entire document is output by double-sided printing, and thus the process advances to step S3508 to set single-sided printing for all chapters. At this time, a state before entering the flow of FIG. 35, i.e., a state in which all pages are output by single-sided printing is obtained. The process then advances to step S3509 to perform double-sided setting for a chapter to be added currently.

In step S3510, the process ends without doing anything because the settings of the book and chapter coincide with each other in double-sided printing or no printing method can be designated for the chapter when the book exhibits bookbinding printing.

By executing the flowchart of FIG. 35 in this way, when storage of data into a supervised folder is detected, new additional data complying with the settings of the folder are generated in a book file. At this time, if the settings of document data to be added to the book file are the same as the attributes of the book file, the settings of the document data to be added are synchronized with a change of the book attributes. If the settings of document data to be added to the book file are different from the book attributes, the settings of the document data to be added are made independent of the book attributes.

In other words, when the settings of document data to be added to a book file are the same as the attributes of the book file, the check boxes 1501 to 1503 are checked upon displaying the setting window of FIG. 15.

When the settings of document data to be added to a book file are different from the book attributes, the settings of the document data to be added are made independent of the book attributes, and the check boxes 1501 to 1503 are not checked upon displaying the setting window of FIG. 15.

<Another Example of Attribute Setting Process for Chapter>

In steps S3504 and S3510 of FIG. 35, a value to be set for a chapter and the current setting value of a book are compared, and when these values are the same, no process is executed. As another example, a process of setting a lower layer even when upper and lower layers have the same setting in import will be explained.

Figure 36:
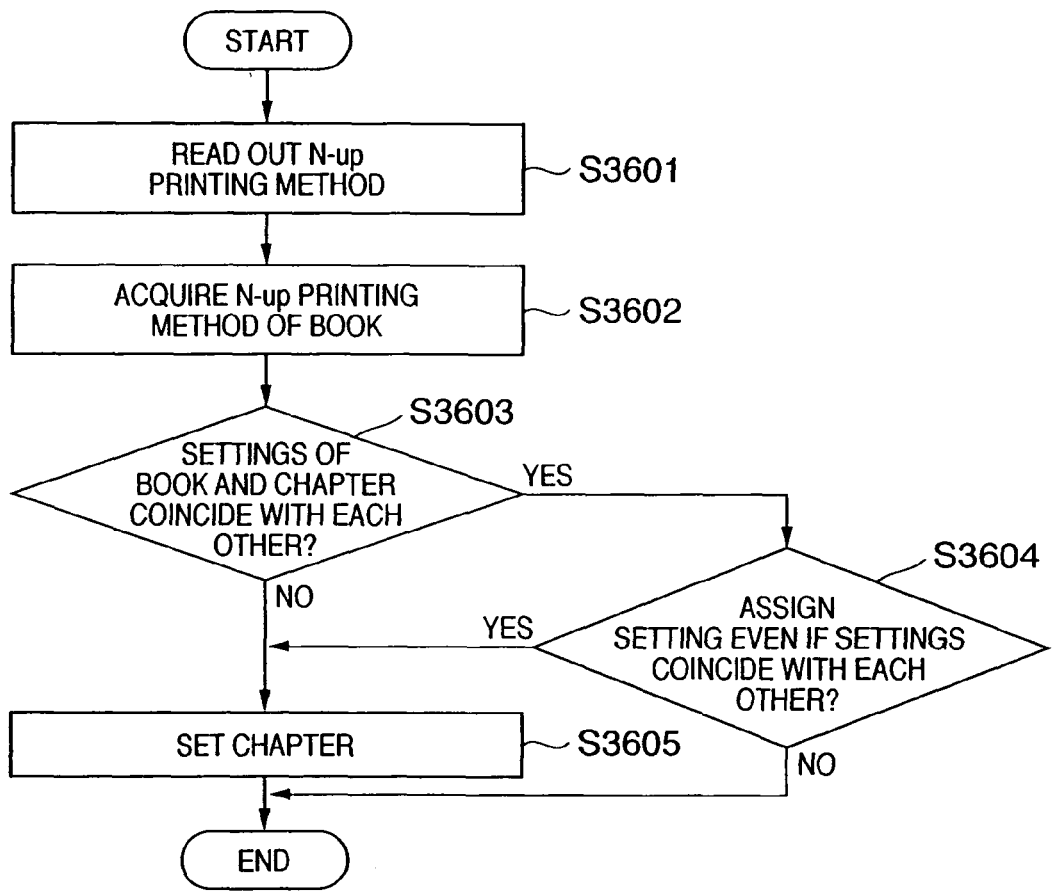
FIG. 36 is a flowchart showing a setting process for a chapter.

FIG. 36 is a flowchart showing a setting process for a chapter.

In step S3601, Nup setting information set for a chapter to be added is read in response to storage of an import file into a folder.

In step S3602, the Nup setting value of the current book file is read out from the document setting information 403.

In step S3603, it is determined whether the results read out in steps S3601 and S3602 are equal to each other. If NO in step S3603, the process advances to step S3605 to set the setting value read out in step S3601 in the chapter setting information 407. If the settings of both the book and chapter coincide with each other, the process advances to step S3604 to determine whether this setting is assigned to the chapter even if the settings coincide with each other. This designation may be executed by the user or a process for either the book or chapter in accordance with the system specifications.

Figure 37:
FIG. 37 is a view showing an example of a GUI when settings are changed to those of a hot folder.

FIG. 37 shows an example of a GUI when settings are changed to those of a hot folder. In FIG. 37, by checking a check box 3701, settings are given to a chapter even when the settings of the chapter and book coincide with each other. To give a setting to the chapter even if the settings of the book and chapter coincide with each other, the process advances to step S3605 to write the setting in the chapter setting information 407. For a setting of not writing any setting when the settings of the book and chapter coincide with each other, the process ends without doing anything.

Consequently, both the book and chapter are set, and even if the book attribute is changed, the attribute setting remains in the chapter, and the intentional attribute setting of the chapter is held.

<Another Example of Determination of Backup Creation>

In the flow of FIG. 28, whether to back up a file is determined by reading contents designated with the radio button 2501 in FIG. 25. As another determination method, a determination process of backing up a file, only as needed will be explained.

In the first embodiment, original data is necessary when data is rewritten by image correction. In this case, the radio button 2501 for designating backup is eliminated from the GUI, and changed to a choice "back up a file when an image is corrected".

Figure 38:
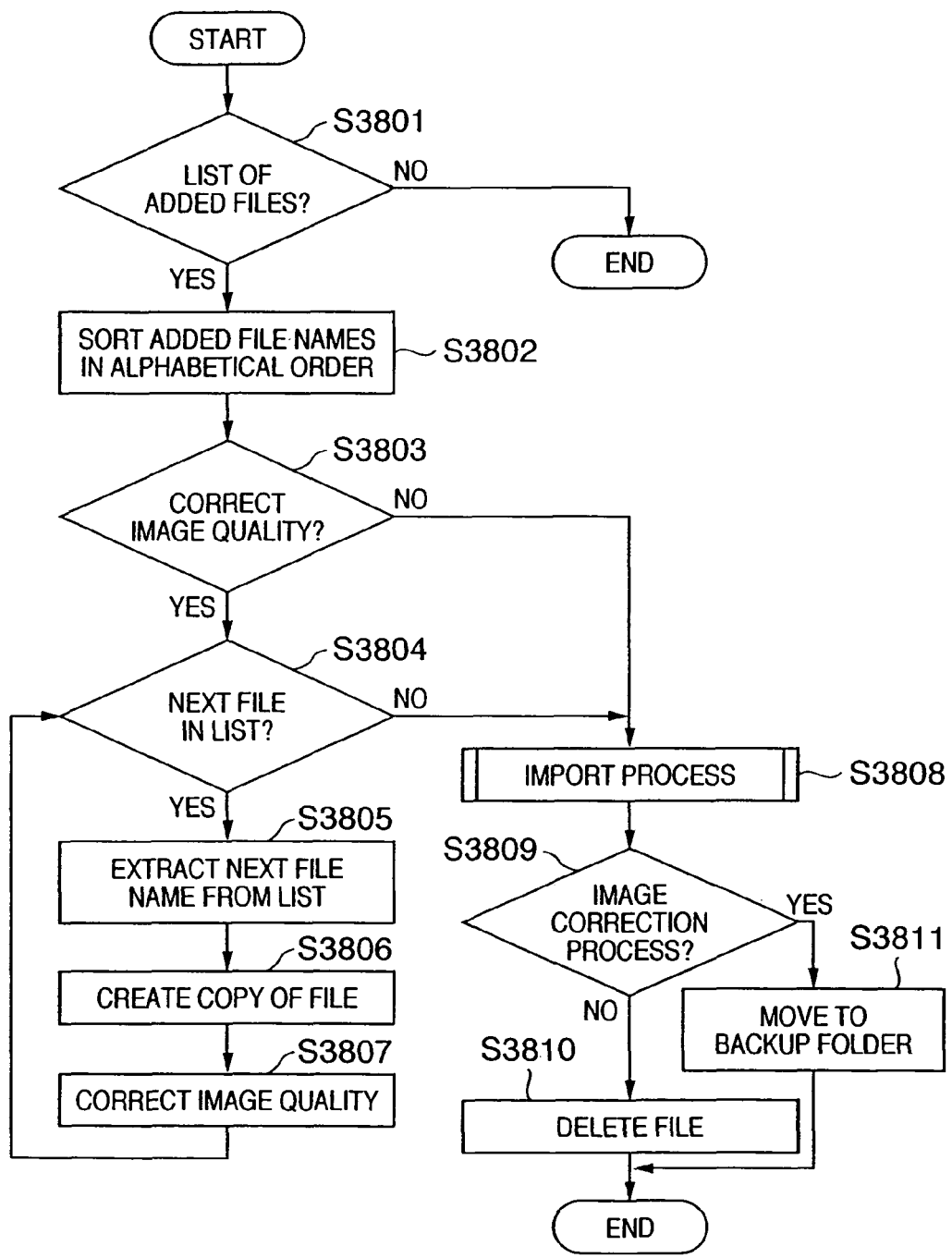
FIG. 38 is a flowchart showing another example of a backup process.

FIG. 38 is a flowchart showing an example of a process when backup determination in the flowchart of FIG. 28 including a backup process is replaced with an image correction process.

In step S3801, it is determined whether a file list created in step S2704 of FIG. 27 is blank. If the file list is blank, the process ends. If the file list is not blank, the process advances to step S3802 to sort files in the list in an order of file name.

In step S3803, it is checked whether image quality correction in import has been set. If the check boxes 2408 and 2409 are checked, the process advances to step S3804 in order to correct the image quality. Copies of files registered in the file list are saved in the backup folder 4011, and then the image quality correction process is performed. If the image quality need not be corrected, the process advances to step S3809 to perform an import process.

Steps S3804 to S3807 describe a loop process of correcting the image quality of each file in the file list.

In step S3804, it is determined whether an unprocessed file remains by advancing the process sequentially from the top of the list. If the image quality correction process has ended for all files in the file list, the process advances to step S3808; if a file which has not undergone the image quality correction process remains, to step S3805.

In step S3805, the names of unprocessed files are extracted sequentially from the top of the file list, and subjected to processes in step S3806 and subsequent steps.

The process advances to step S3806 to copy data before image quality correction.

In step S3807, the image quality is corrected in accordance with the checks in the check boxes 2408 and 2409 to overwrite the file.

Step S3808 is an import process. In step S3809, it is determined whether to back up or delete the file after import. If the user sets delete of a file with the radio button 2501, the process advances to step S3810; if NO, to step S3811.

In step S3810, all files in the file list are deleted. In step S3811, files in the file list are backed up.

<Example of Display when Backup is Possible>

A GUI as shown in FIG. 9 is displayed when a book file is opened in the bookbinding application 104 according to the first embodiment. It is demanded of each page to discriminate on the window whether a backup page of the page exists.

Figure 39:
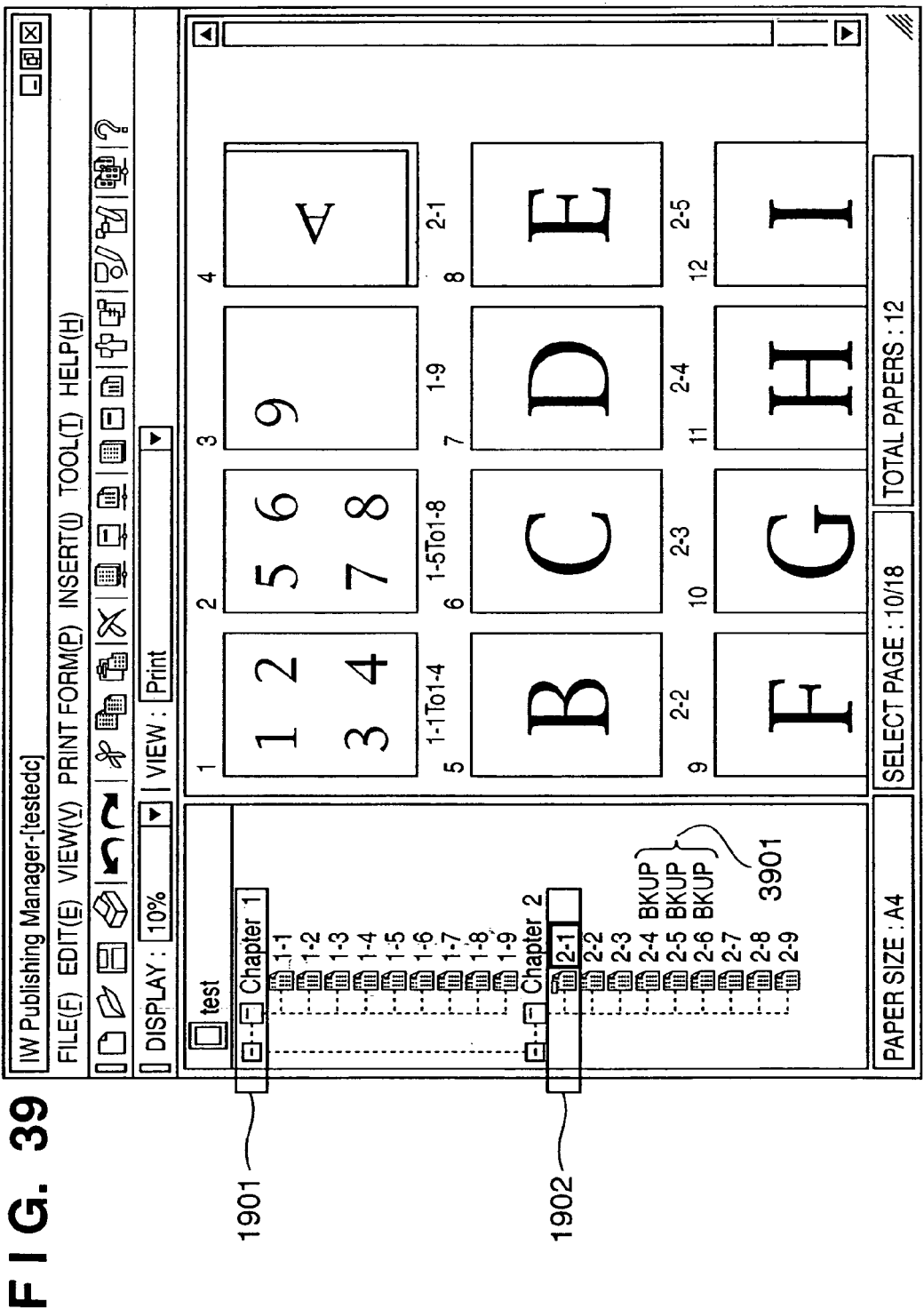
FIG. 39 is a view showing an example of display of a page replaceable with a backup.

As described above, the page control information 410 of each page contains information on whether a backup page exists. As shown in FIG. 39 instead of FIG. 19, for a page 3901 representing that a backup page exists in the backup folder 4011, a character string BKUP is displayed in a corresponding page in the book tree display area. Although the character string is added in FIG. 39, a different form of the page icon may be displayed as far as the presence/absence of a backup can be determined. A mark representing a backup may be added to each page in the page layout area, or displayed in both the tree and layout areas.

As described in the first embodiment, a page is backed up when a document is scanned by the multifunction apparatus 130, an image correction process is executed, and the page actually exists in the backup folder 4011 with a backup folder name and file name described in the page control information 410.

As described above, a backup file is deleted on the basis of the limitations of the file capacity and the number of days. In opening a file, the location of the backup file is confirmed.

As described above, the first embodiment prepares two methods for creation of a new book by the bookbinding application and import of a new chapter or page into an existing book.

First, an application data file created by a general application (the type and manufacturer of the application do not matter) is dragged and dropped to the running bookbinding application. In this case, an electronic document file can be created and imported by the electronic document writer 102, as needed. When the file is an image data file supported by the bookbinding application in the first embodiment, the file can be directly imported.

Second, a document bundle is scanned by a network scanner represented by the multifunction apparatus 130, and the file is imported by designating a hot folder as the transmission destination of the scanned image. According to the first embodiment, a plurality of hot folders can exist, and each hot folder can define the attributes of a chapter and page in import. When a file is actually imported into the bookbinding application, the definition of the file is completed as a page having several attributes, which can simplify work in the bookbinding application.

When a file is imported by the second method, an application used to print a document to be scanned by the multifunction apparatus 130 need not be installed in a PC which executes the bookbinding application. This is preferable when a plurality of users share creation of a document with their PCs.

According to the second method, image correction such as image skew correction or black point removal can also be set, and a page almost equal in quality as a page created by the first method can also be created. As described above in the first embodiment, if the image correction result is not preferable, the corrected page can be replaced with a page before image correction, providing high convenience.

<Second Embodiment>

In the first embodiment, a hot folder is exemplified as a storage destination in import, and an image file scanned by the multifunction apparatus 130 on the network is stored. However, it is demanded to cope with a case in which a data file created by a general application in the PC 100 is stored.

Figure 42:
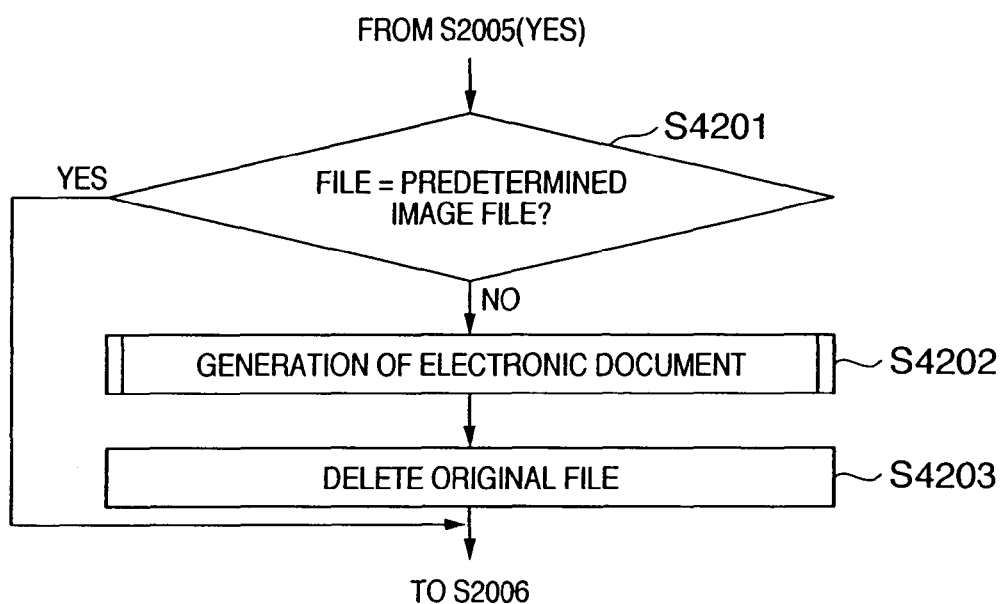
FIG. 42 is a flowchart showing a process added to FIG. 20 according to the second embodiment.

This can be achieved by adding process steps S4201, S4202, and S4203 shown in FIG. 42 between steps S2005 and S2006 in FIG. 20.

That is, the import process shown in FIG. 10 for a data file by a general application is inserted between these steps.

In step S4201, it is determined whether data to be stored as an object into a hot folder is an image file supported by a bookbinding application. If NO in step S4201, the same process as step S803 in FIG. 10 is executed in step S4201. Note that a corresponding hot folder is designated as the output destination of an electronic document writer 102. As a result, an electronic document file is created in the hot folder, and the original file is deleted in step S4203. The process then advances to step S2006.

The hot folder functions not only for an image file scanned by a document scanning apparatus (multifunction apparatus or network scanner) but also for a data file by a general application.

When respective parts (e.g., chapters) of one book are created by a plurality of users with applications running in PCs 100, 110, 120, and 125, it is most effective to install the electronic document writer 102 described in the embodiments in the respective PCs. Hot folders are created for the respective users and set so that the users of the PCs can access the hot folders. Application data files created by the PCs are output to the hot folders created for the respective users by using the electronic document writer 102, and can be imported to the bookbinding application without scanning the document in the PC 100.

A hot folder is set in a PC which executes the bookbinding application in the embodiments, but may be set in a storage device on a network.

In the embodiments, a file may be added as a chapter in import. For example, a page in a specific chapter may be designated to import each page immediately after (or immediately before) the designated page.

In the flowcharts described in the embodiments, preceding and succeeding steps can be exchanged as far as inconsistency occurs in the process.

As described in the embodiments, various settings and changes can be efficiently done for any layer of a document having a hierarchical structure.

Data of a readable format can be generated as a page of a hierarchical structure from an import file (data) stored into a folder on the basis of attributes set for the folder, and a book file to be printed can be created at high productivity.

As has been described above, the present invention can efficiently perform various settings and changes for any layer of a document having a hierarchical structure.

Most features of the embodiments are implemented by a computer program, as shown in FIG. 1, and the program falls within the spirit and scope of the present invention. In general, the computer program can be executed by setting in a computer a computer-readable storage medium such as a CD-ROM which stores the computer program, and copying or installing the computer program in the system. Such computer-readable storage medium also falls within the spirit and scope of the present invention.

As many apparently widely different embodiments of the present invention can be made without departing from the spirit and scope thereof, it is to be understood that the invention is not limited to the specific embodiments thereof except as defined in the claims.

CLAIM OF PRIORITY

This patent application claims priority from Japanese Patent Application No. 2004-122287 filed on Apr. 16, 2004, which is hereby incorporated by reference herein.

What is claimed is:

1. A method of controlling a document processing apparatus which creates a book file formed from at least one chapter, where each chapter includes at least one page, comprising:

a setting step of setting an attribute for a folder;

a detection step of detecting storage of document data into the folder for which the attribute is set in said setting step; and an import step adapted to import document data stored in the folder into a new chapter of the book file which has been created, according to the stored document data in the folder, when said detection step detects storage of document data into the folder; and a comparing step of comparing the attribute which is set for the folder with an attribute of an entire book of the book file which has already been created;

a determining step of determining whether the attribute set for the folder is inconsistent with the attribute of the entire book of the book file which has already been created;

an applying step of the attribute set for the folder to the new chapter into which the document data is imported, if it is determined in said determination step that the attribute set for the folder is not inconsistent with the attribute of the entire book of the book file; and a changing step of, if it is determined in said determination step that the attribute set for the folder is inconsistent with the attribute of the entire book of the book file, (i) not applying an attribute different from the attribute set for the folder to the new chapter into which the document data is imported, or (ii) applying an attribute different from the attribute set for the folder to the new chapter into which the document data is imported and changing the attribute of the entire book of the book file or the attribute set for chapters other than the new chapter into which the document data is imported.

2. A computer program stored on a computer-readable storage medium for executing steps in a method defined in claim 1.

3. The method according to claim 1, wherein, if the attribute set for the folder by said setting step and the attribute of the entire book of the book file are different from each other, said import step applies the attribute to the new chapter independently from the attribute of the entire book.

4. The apparatus (method) according to claim 3, wherein, if the attribute set for the folder by setting step indicates both side printing and the attribute of the entire book indicates one-side printing, said import step changes the attribute of the entire book into both side printing, sets the both side printing to the attribute of the new chapter to which the document data is imported, and sets one-side printing to the attribute of chapters other than the new chapter to which the document data is imported.

5. The apparatus (method) according to claim 1, wherein the attribute set by said setting step includes at least one of a paper size, a number of pages to be printed on one paper, and both side printing.

6. The apparatus (method) according to claim 1, wherein said setting step sets, to a plurality of folders, attributes different from each other.

7. The method according to claim 1, wherein, if the attribute set for the folder by the setting step and the attribute of the entire book of the book file are the same, said import step applies the attribute of the new chapter such that the attribute of the new chapter is synchronized with a change of the attribute of the entire book.

8. The method according to claim 1, wherein the folder for which the attribute is set in said setting step includes a shared folder accessible by a document scanning apparatus connected via a communication line, and stores a document image scanned by the document scanning apparatus.

* * * * *